United States Patent [19]
Yokota et al.

[11] Patent Number: 6,116,257
[45] Date of Patent: Sep. 12, 2000

[54] MICROMOTORS, LINEAR MOTORS, MICROPUMPS, METHODS OF USING THE SAME, MICROACTUATORS, METHODS OF CONTROLLING FLOW PROPERTIES OF FLUIDS, AND APPARATUSES FOR CONTROLLING FLOW PROPERTIES OF FLUIDS

[75] Inventors: Shinichi Yokota, Sagamihara; Yasufumi Otsubo, Chiba; Takeshi Nakada, Yokohama; Kazuya Edamura, Tokyo, all of Japan

[73] Assignee: New Technology Management Co., Ltd., Japan

[21] Appl. No.: 09/020,725

[22] Filed: Feb. 9, 1998

[30] Foreign Application Priority Data

| Mar. 28, 1997 | [JP] | Japan | 9-002201 |
| Sep. 19, 1997 | [JP] | Japan | 9-255557 |
| Oct. 23, 1997 | [JP] | Japan | 9-290826 |

[51] Int. Cl.[7] ..................................... F15C 1/04
[52] U.S. Cl. ............................ 137/1; 137/827; 137/909
[58] Field of Search ........................... 137/827, 909, 137/1; 251/251

[56] References Cited

U.S. PATENT DOCUMENTS

| 3,395,720 | 8/1968 | Brooks | 137/827 |
| 3,599,428 | 8/1971 | Chaney | 137/827 |
| 4,532,853 | 8/1985 | Stangroom | 91/165 |

FOREIGN PATENT DOCUMENTS

| 0695025 A2 | 1/1996 | European Pat. Off. . | |
| 0787792 | 8/1997 | European Pat. Off. . | |
| 630617 | 10/1978 | U.S.S.R. | 137/827 |
| 2118741 A | 12/1983 | United Kingdom . | |

OTHER PUBLICATIONS

Article entitled "Miniature Fluid–Driven Electrostatic Motor", Techno Japan, vol. 29–No. 11, p. 79, Nov. 1996, English text.

Paper entitled "Dielectric Fluid Motor", App. Phys. Lett., vol. 71, No. 3, pp. 318–320, Jul. 1997, English text.

Paper No. 96–252, entitled "A New Electrostatic Device Using Fibers", presented at the 8th Symposium on Dynamics Relating to Electromagnetic Force, pp. 437–438, English abstract.

Paper entitled "A Novel Electrostatic Clutch Using Fibers", present at the 39th Automobile Control Association Lecture Meeting, Oct. 16–18, 1996, pp. 203–206, English abstract.

Paper entitled "A Micromotor Using a Kind of Dielectric Fluids", presented at the 31st Annual Meeting of the IEEE–IAS, Oct. 6–10, 1996, pp. 1749–1754, English abstract.

*Primary Examiner*—A. Michael Chambers
*Attorney, Agent, or Firm*—Webb Ziesenheim Logsdon Orkin & Hanson, P.C.

[57] ABSTRACT

The present invention provides a use of an electro-sensitive movable fluid, that is, a micromotor, a linear motor, a micropump and a method of using the micropump, a microactuator, and an apparatus which these devices are applied to, and a method and an apparatus of controlling flow properties of a fluid.

10 Claims, 48 Drawing Sheets

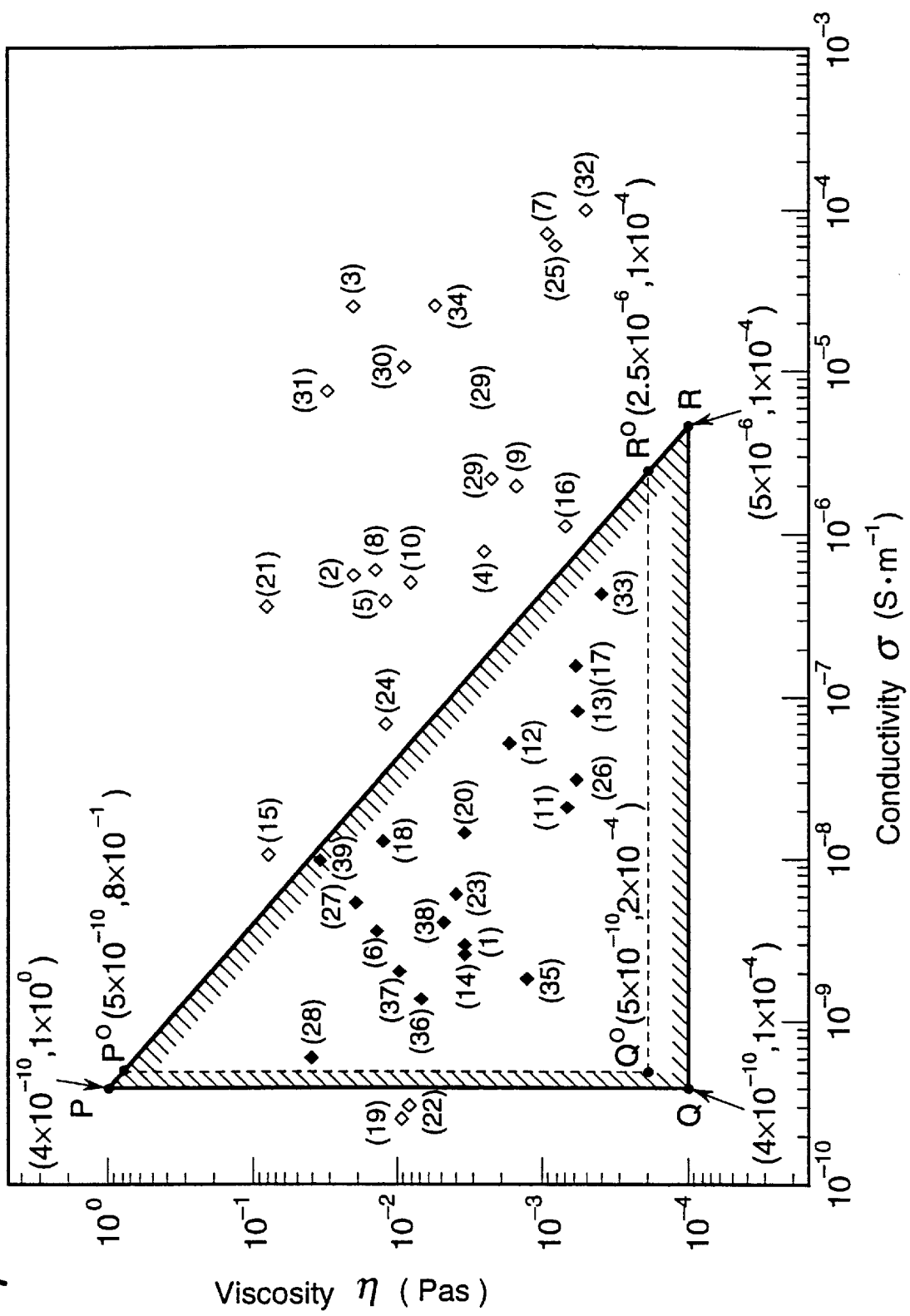

Fig. 2
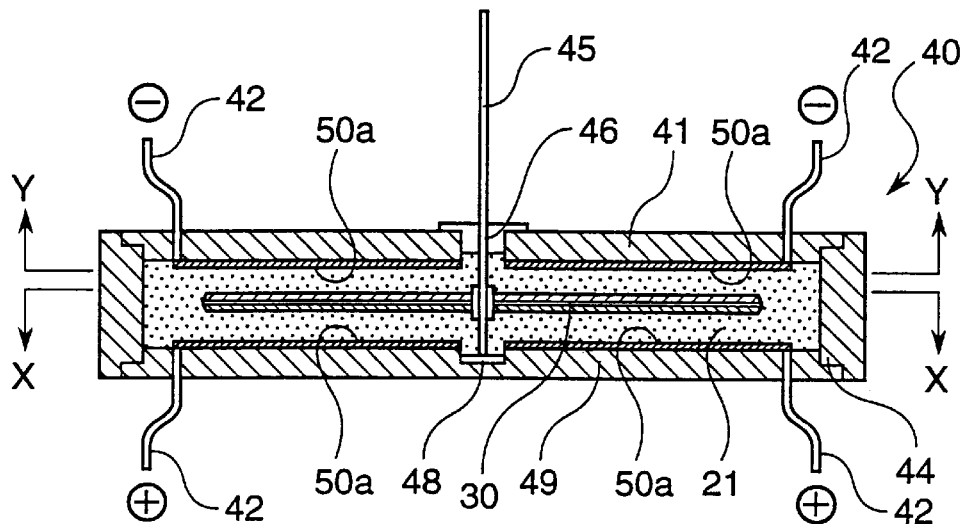
(A)
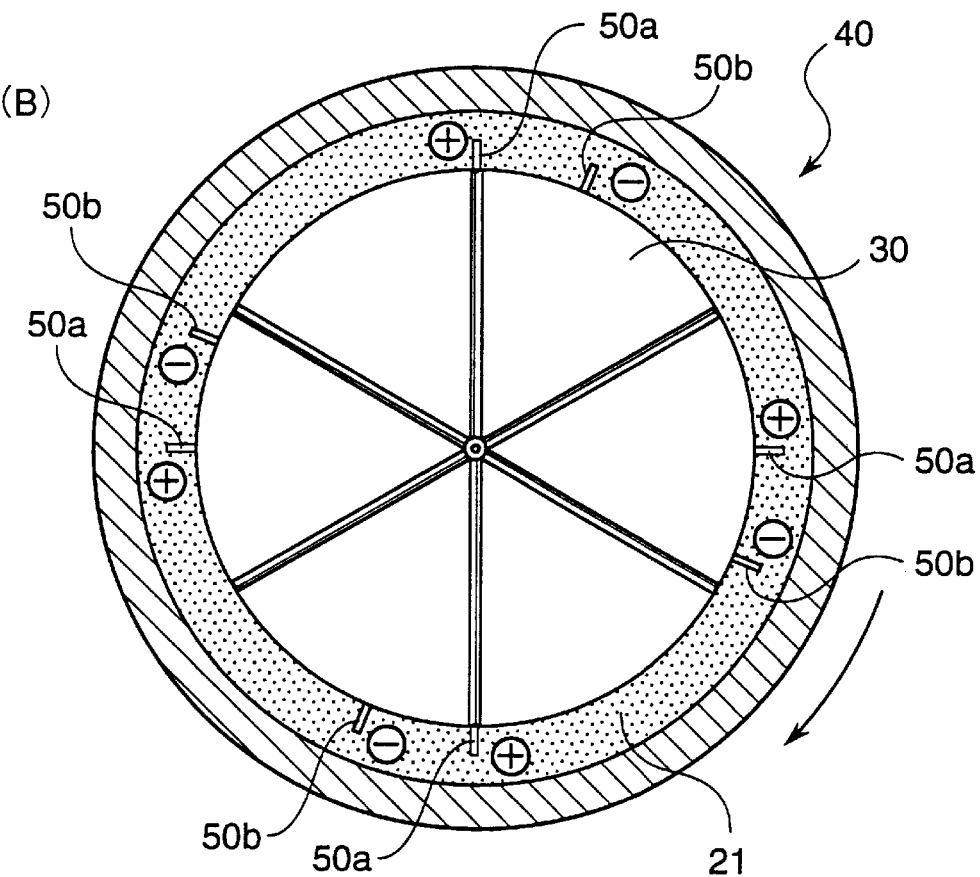
(B)

Fig. 3
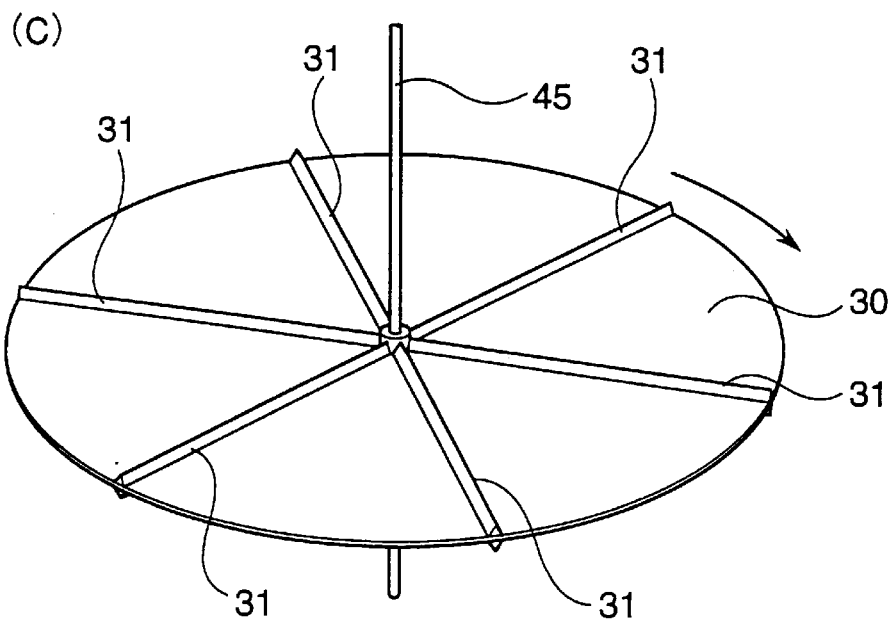
(C)
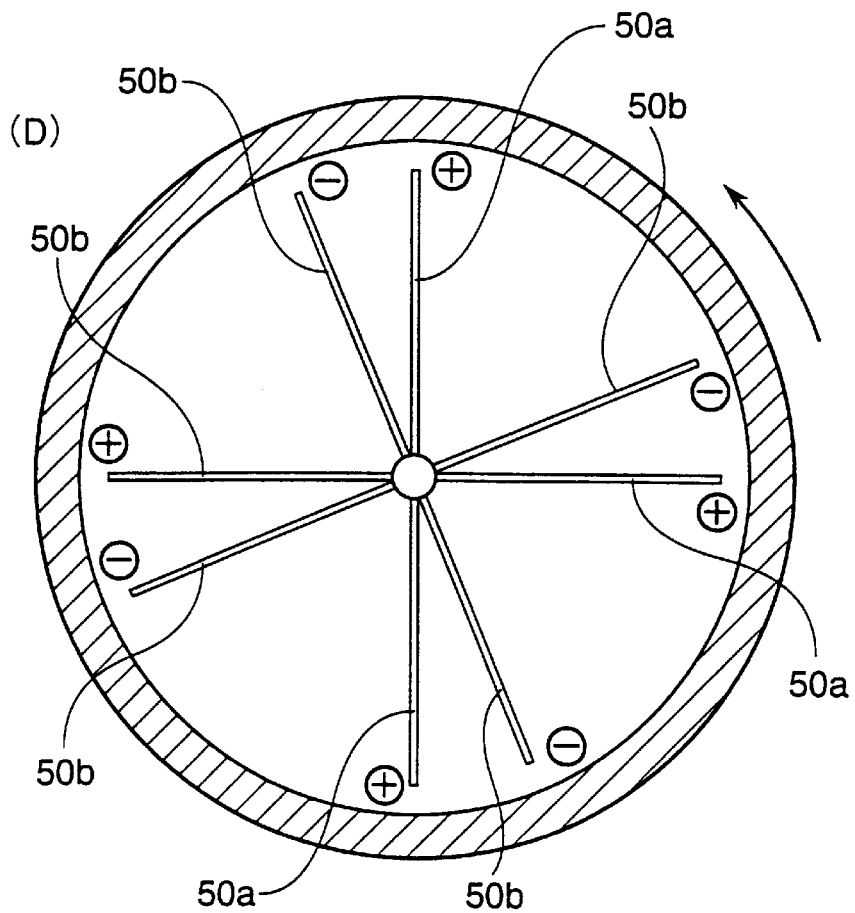
(D)

Fig. 5
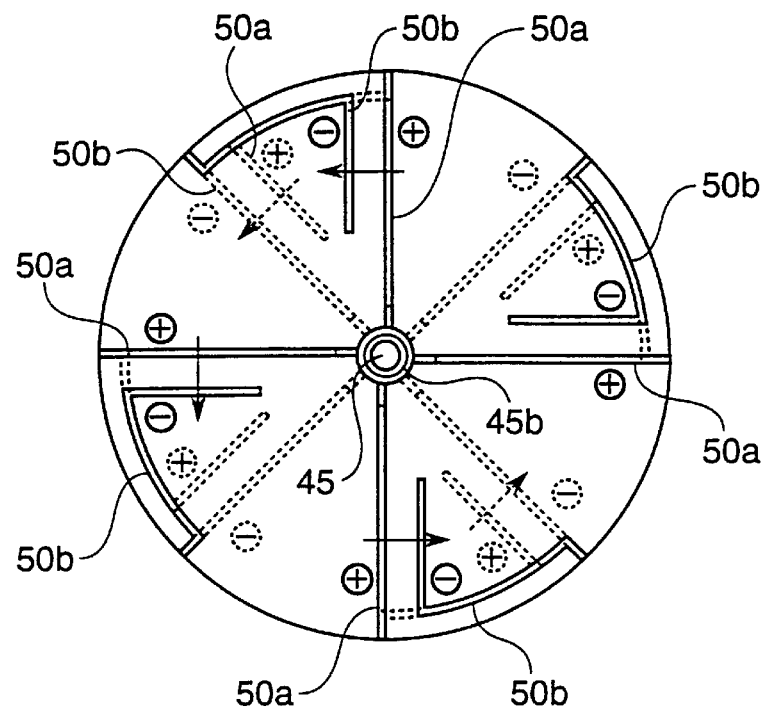
Fig. 6
(A)
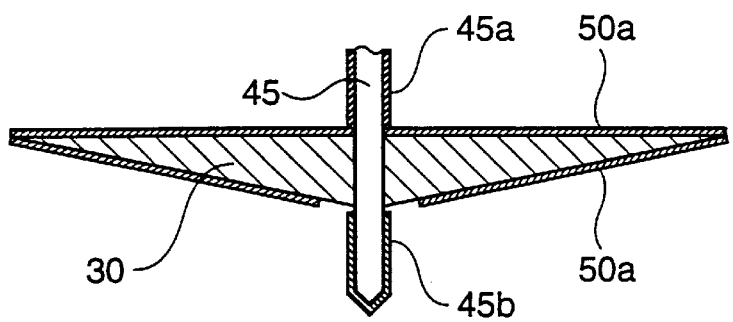
(B)
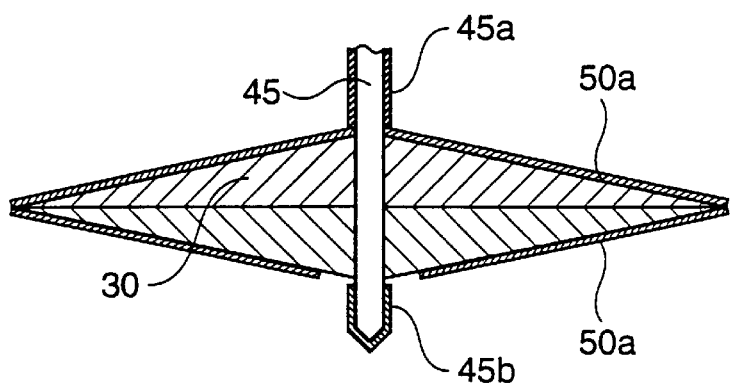

(A)

(B)

Fig. 7-2
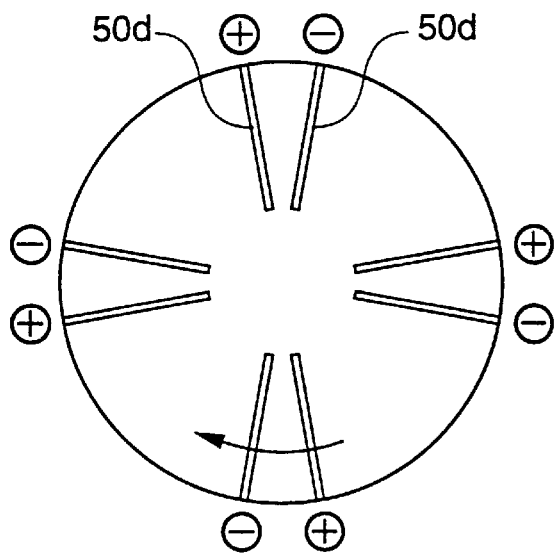
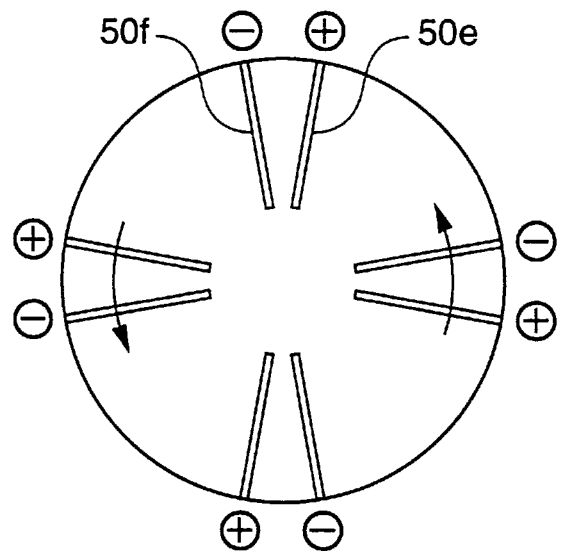
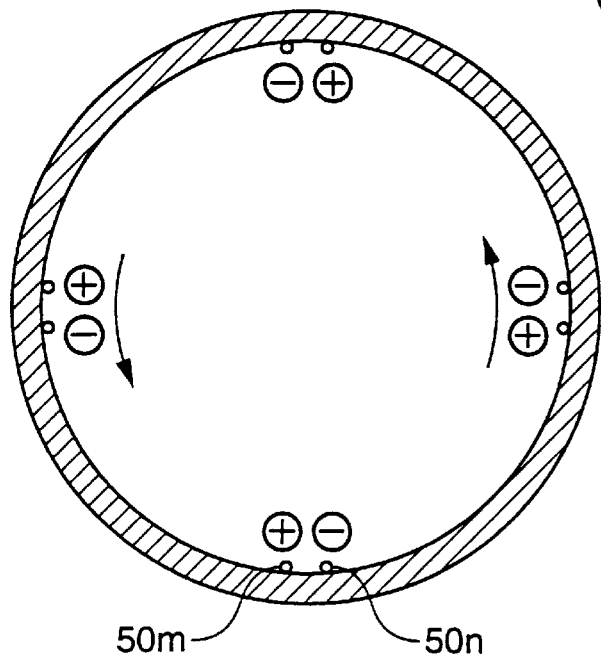

4mm SE type ECF motor

Moving direction of shaft

Fig. 29
(A)
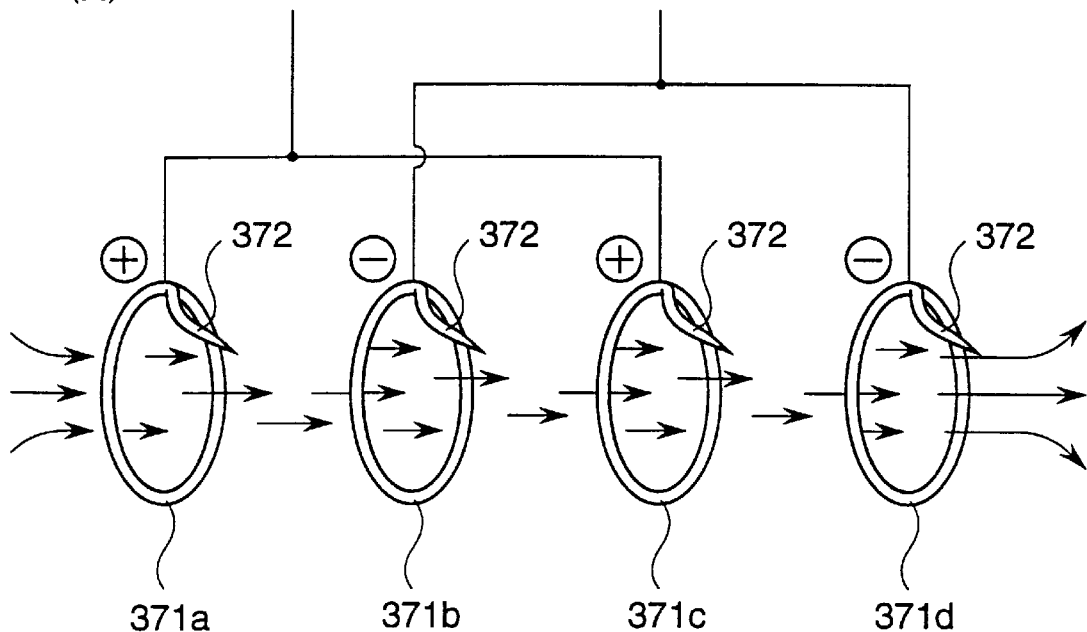
(B)
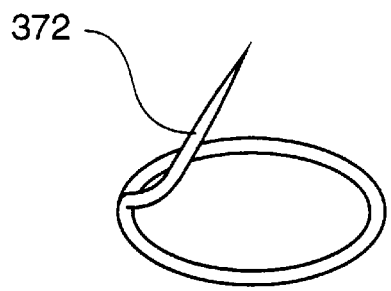
(C)
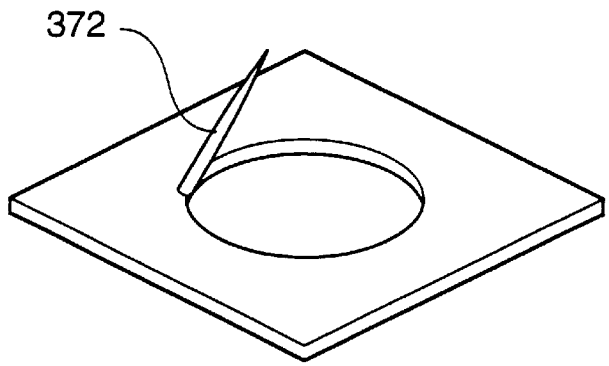

Fig. 31
(A)
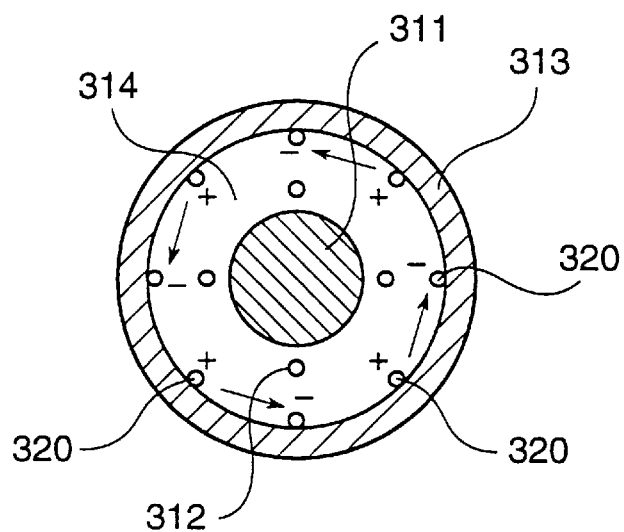
(B)
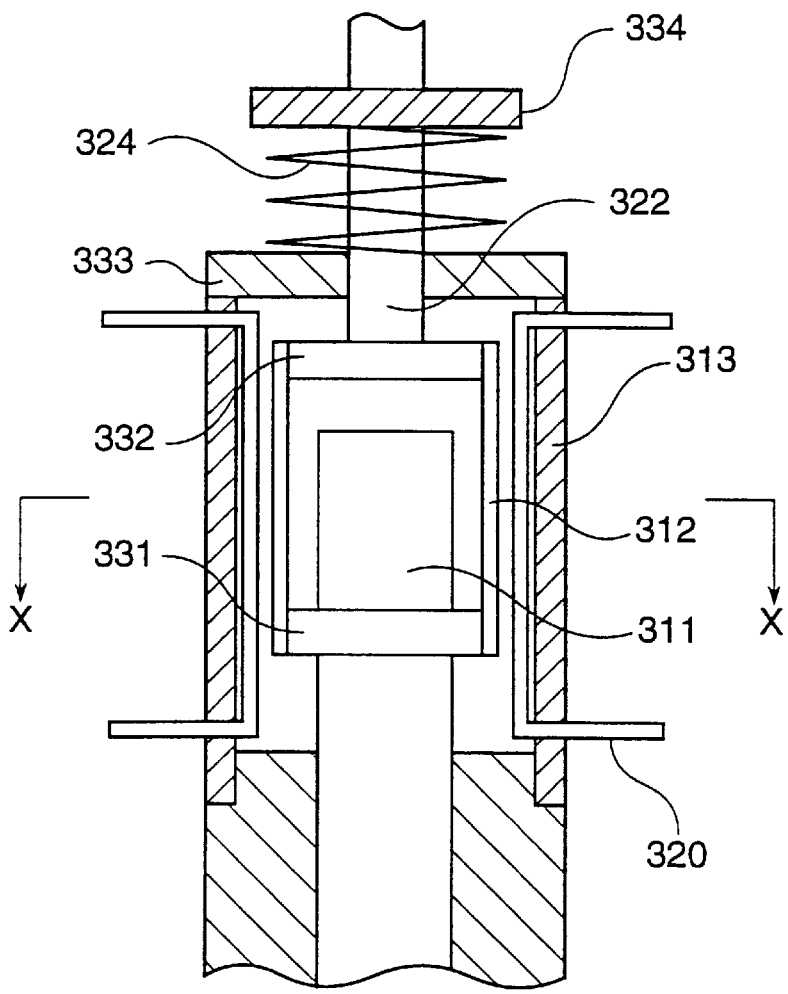

Fig. 32
(A)
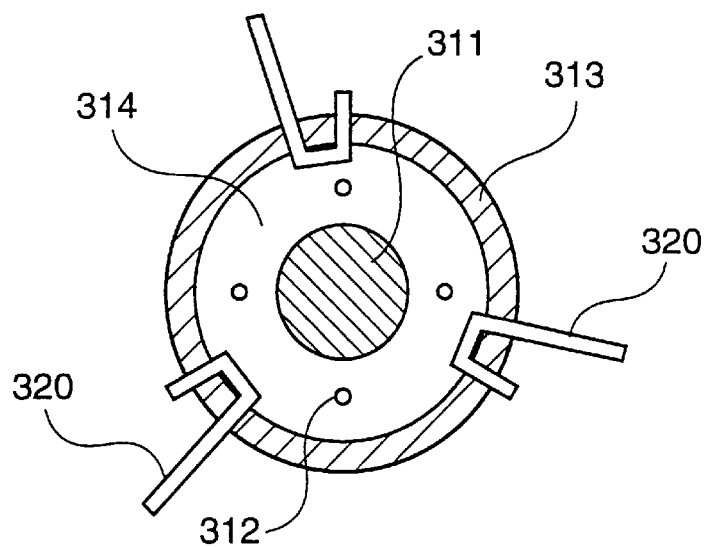
(B)
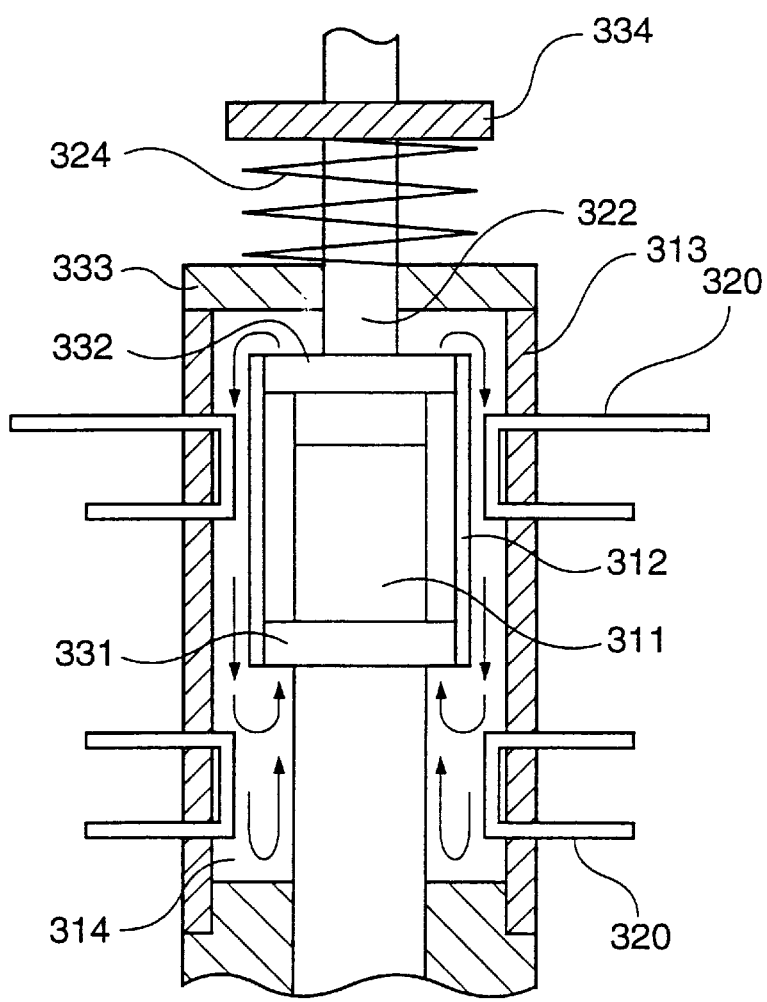

Fig. 39
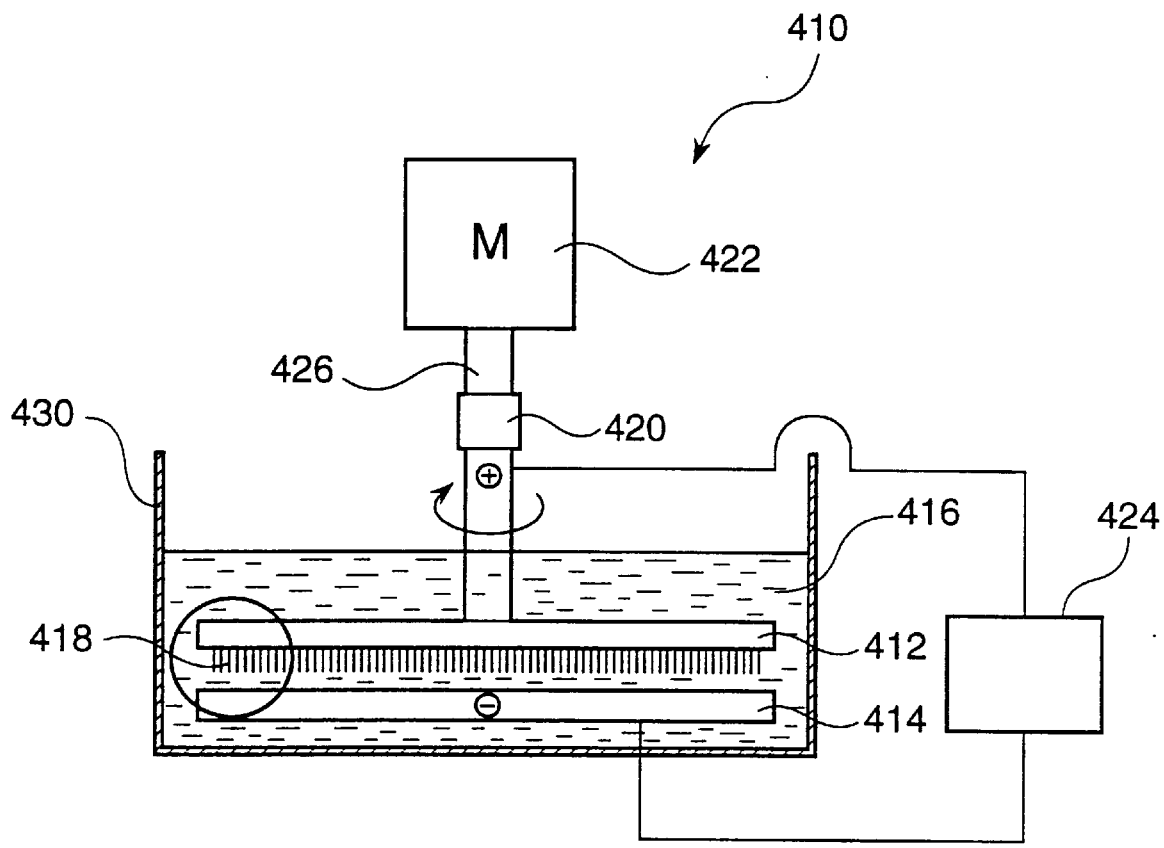
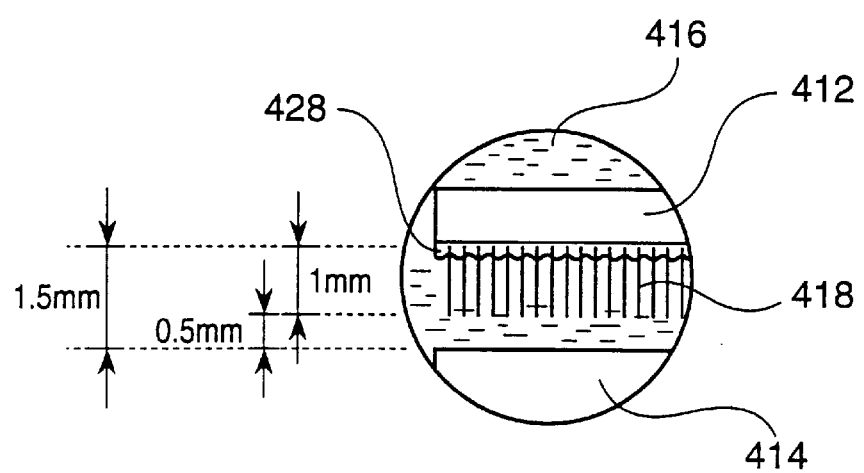

MICROMOTORS, LINEAR MOTORS, MICROPUMPS, METHODS OF USING THE SAME, MICROACTUATORS, METHODS OF CONTROLLING FLOW PROPERTIES OF FLUIDS, AND APPARATUSES FOR CONTROLLING FLOW PROPERTIES OF FLUIDS

FIELD OF THE INVENTION

The present invention relates to micromotors using electro-sensitive movable fluids (electro-conjugate fluid, ECF) which move between electrodes upon application of a voltage, and more particularly to extremely thin micromotors using the electro-sensitive movable fluids. The invention also relates to linear motors using the electro-sensitive movable fluids. The invention further relates to micropumps using the electro-sensitive movable fluids, methods of using the micropumps and microactuators using the micropumps as cooling means. The present invention furthermore relates to methods of controlling flow properties of substantially dielectric fluids by applying a voltage and apparatuses for controlling flow properties of fluids.

BACKGROUND OF THE INVENTION

It is known that the characteristics of certain kinds of dielectric fluids vary when the dielectric fluids are subjected to electric fields. In case of liquid crystals, for example, when a voltage is applied to liquid crystal compounds, orientation properties of the compounds are varied to thereby vary light transmittance of the compounds. It is also known that, when a voltage is applied to heterogeneous fluids containing particles or the like, properties of the fluids such as viscosity are varied by Winslow Effect.

There are, however, problems in the fluids whose properties are varied upon application of a voltage. For example, the liquid crystal compounds are very expensive, or the heterogeneous fluids show poor dispersion stability.

The present inventors have found such a novel effect that some specific fluids move upon application of a voltage, and already applied for patents on the specific fluids (electro-sensitive movable fluids) and micromotors using the electro-sensitive movable fluids (see: Japanese Patent applications No. 16871/1996, No. 16872/1996, No. 76259/1996, No. 248417/1996 and No. 241679/1996) which form the basis of co-pending U.S. Pat. Application Ser. No. 08/792,544, filed Jan. 31, 1997. The micromotors described in these publications show increased output power when they are miniaturized.

In order to more efficiently drive the micromotors disclosed in the above publications, they should be improved for the miniaturization. The motors described in the publications are those of rotor rotation type, and any linear motor which is linearly driven is not described. Further, any pump using the electro-sensitive movable fluid is not described either.

When a voltage is applied to an electro-rheological fluid (ER fluid), its hydrodynamic properties such as viscosity greatly vary reversibly at a high speed correspondingly to the applied voltage. The fluids showing these properties are broadly divided into heterogeneous type (particle dispersion type) and homogeneous type. As the heterogeneous ER fluid, a dispersion obtained by dispersing fine particles such as silica gel in an insulating oil is known.

The heterogeneous ER fluids, however, have a problem in that sedimentation or flotation of particles takes place because of a difference in specific gravity between the particles and the medium. Even if the particles and the medium have the same specific gravity, the same problem of sedimentation or flotation of particles takes place with time because the temperature dependence of the specific gravity of the particles and that of the specific gravity of the medium are different from each other at low or high temperatures. Moreover, the dispersed particles of the heterogeneous ER fluid form a chain structure when a voltage is applied, and therefore, the hydrodynamic properties of the fluid are changed. With the formation of the chain structure, not only increase of viscosity but also development of elasticity takes place, and the fluid exhibits mechanical response approximate to a solid state. For this reason, linear control of the heterogeneous ER fluids is difficult, and in many cases, complicated control means such as feedback control is necessary.

Of the homogeneous ER fluids, a liquid crystal is known as an ER fluid which exhibits no elasticity. The homogeneous ER fluids have ease of controlling because they exhibit no elasticity even when a voltage is applied, and they are free from problems of particle sedimentation and particle flotation because they are homogeneous. However, the homogeneous ER fluids such as liquid crystals are very expensive, so that they are not broadly employed for an industrial use, liquid crystals are only used for, for example, display devices of extremely high value added. Further, the liquid crystals which are the homogeneous ER fluids can be driven only in such a temperature range that the liquid crystals are in the liquid crystal state, so that the temperature range wherein the liquid crystals can be used as the ER fluids is extremely narrow. Though the estimated temperature range wherein the ER fluids are used is from about −30° C. to about 120° C., the liquid crystals cannot be driven in such a wide temperature range.

As described above, the homogeneous ER fluids are advantageous as the ER fluids from the control viewpoint, but they are very expensive and their working temperature range is narrow. On the other hand, the heterogeneous ER fluids are relatively inexpensive, but they are difficult to control and have a problem of fluid stability such as occurrence of particle sedimentation or particle flotation.

In the paper No. 96-252, pp. 437–438, of the 8th symposium on "Dynamics relating to Electromagnetic Force", there is description about "Researches on Electrostatic Devices (New Stress-Transfer System Using Fibers)". The particles dispersed in the heterogeneous ER fluid form a chain structure when a voltage is applied to the heterogeneous ER fluid, as described above. This mechanism is applied to the electrostatic devices of the above paper. That is, instead of the particles, an electrode provided with woven fabric on its surface is used in a silicon oil, and a voltage is applied to the "woven fabric electrode", whereby a chain structure equivalent to the particle chain structure of the heterogeneous ER fluid containing particles is formed by the woven fabric to thereby develop hydrodynamic properties of the ER fluid. In other words, instead of using an ER fluid containing particles, using a silicon oil woven fabric free from sedimentation or flotation is bonded to an electrode material and the woven fabric is used as an electrode. By the application of a voltage, fibers of the woven fabric are allowed to stand up, and dynamic resistance of the upstanding woven fibers is produced to control the fluid. Further, the manuscript collection (pp. 203–206) of the 39th automobile control association lecture meeting (Oct. 16, 17, 18, 1996) discloses "New Torque-Transfer System Using Fibers", and describes that, when fabric is adhesion bonded to a circular plate and the circular plate is rotated in an electric field, the shear stress is increased.

In the above methods, it is explained that the woven fabric has a rigid structure upon application of a voltage and is orientated in the direction of the electric field thereby to increase the shear stress. In the methods, therefore, the woven fibers which are swayed by the fluid when no voltage is applied are made rigid and orientated by applying a voltage, so that the fibers can resist the relative motion of the fluid to the electrodes, whereby increase of shear stress during application of a voltage is accomplished. In the methods, accordingly, only a silicon oil is used, and hydraulic oil constituting a machine part or a working mechanism is never employed, further applicability of the methods to a mechanism.

In the above methods, further, the conductive electrode material is not exposed out at all and is evenly covered with the woven fabric. Moreover, there is no report about production of a jet flow. It is described that the fibers of the woven fabric are swayed in the non-electric field according to the shear rate. Accordingly, flow property control mechanism of the above methods is different from the mechanism of the invention invented by the present inventors, that is, the shear stress is produced by virtue of formation of a jet flow. The shear stress produced in the present invention has hydrodynamic continuity, is free from yield stress which indicates solidification and has ease of controlling, while the above-mentioned fixed electrodes provided with woven fabric do not show these properties.

OBJECT OF THE INVENTION

It is an object of the present invention to provide an extremely small-sized rotary motor and linear motor each of which is driven by a jet flow of an electro-sensitive movable fluid produced upon application of a direct-current-voltage and to provide a micropump using the electro-sensitive movable fluid.

It is another object of the invention to provide a novel method of using the above-mentioned micropump.

It is a further object of the invention to provide a microactuator using the above-mentioned micropump as a cooling means.

It is a still further object of the invention to provide a method of easily controlling flow properties of a dielectric fluid in a wide temperature range, said fluid being a homogeneous fluid free from sedimentation or flotation of particles, and to provide an apparatus employable in the method.

SUMMARY OF THE INVENTION

The micromotor (thin micromotor) according to the invention is a micromotor comprising a container to be filled with an electro-sensitive movable fluid, a lid to close the container by being engaged with the open top of the container, a rotating shaft borne by a shaft hole provided at the center of the lid and a bearing section provided at the center of the bottom of the container, a rotor fixed to the rotating shaft and rotatable together with the rotating shaft, and electrodes which produce a jet flow of the electro-sensitive movable fluid upon application of a voltage, wherein the diameter of the rotator is larger than the maximum thickness of the rotator.

The thin micromotor of the invention is broadly divided into a SE type ECF motor (stator-electrode type electro-conjugate fluid motor) and a RE type ECF motor (rotor-electrode type electro-conjugate fluid motor) with respect to the position of the electrode provided therein. In the SE type ECF motor, the electrodes are provided on the upper surface of the bottom and/or the lower surface of the lid of the container (fluid container) and are in contact with the electro-sensitive movable fluid. In the RE type ECF motor, the electrodes are provided on the upper surface and/or the lower surface of the rotator.

The housing of the micromotor of the invention generally has a maximum diameter of 50 mm and a maximum height of several mm, and the micromotor is extremely small and particularly thin. In spite of such small size, the micromotor of the invention rotates at a high rotational speed of about several hundreds to several tens of thousands rpm.

The other micromotor according to the invention is a micromotor comprising a housing constituted of a container to be filled with an electro-sensitive movable fluid and a lid, an electro-sensitive movable fluid filled in the container, a rotor which rotates by detecting a motion of the electro-sensitive movable fluid that is moved upon application of a voltage, a rotating shaft to rotatably fit the rotor to the housing, and plural electrodes which produce a jet flow of the electro-sensitive movable fluid upon application of a voltage, wherein the rotor is rotatably fitted to the housing through the rotating shaft and at least one bearing means. This micromotor includes the following first to third micromotors.

The first micromotor (SE type ECF motor) of the invention is a micromotor wherein the rotor is a vane rotor having vanes for detecting a motion of the electro-sensitive movable fluid when the electro-sensitive movable fluid is moved.

The second micromotor (RE type ECF motor) of the invention is a micromotor wherein the rotor is a cylindrical rotor whose surface is provided with plural electrodes.

The third micromotor (cup type ECF motor) of the invention is a micromotor wherein the rotor is an open-bottom rotor having a cylindrical body whose bottom is made open so as to allow the electro-sensitive movable fluid to enter, and the plural electrodes are arranged on at least one surface selected from the group consisting of an outer surface of the open-bottom rotor, an inner surface thereof, an inner wall surface of the housing and a wall surface of the protruded bottom of the housing.

In the third micromotor (cup type ECF motor), the electrodes are arranged on at least one surface selected from the group consisting of an outer surface of the open-bottom rotor, an inner surface thereof, an inner wall surface of the housing and a wall surface of the protruded bottom of the housing. Therefore, the electrodes may be provided vertically on the inner wall surface of the housing as in the above-mentioned SE type ECF motor, or may be provided vertically on the side wall of the protruded bottom.

That is, the micromotor of the invention includes the SE type ECF motor, the RE type ECF motor and the cup type ECF motor that is a complex type of the SE type ECF motor and the RE type ECF motor. In the cup type ECF motor, the rotor is in the cylindrical form whose top is closed and whose bottom is open (in the form of a cup placed bottom upward), and hence this rotor is sometimes referred to as "open-bottom rotor" or "cup rotor" hereinafter.

By making the size of the micromotor of the invention smaller, the electric energy can be converted to rotational energy with much higher efficiency. For example, when a SE type ECF motor whose housing has an inner diameter of 4 mm is used, the efficiency indicated by the ratio of output energy/input energy has been confirmed to be at most 40%.

The linear motor according to the invention comprises an electro-sensitive movable fluid, a container which is a closed container containing the electro-sensitive movable fluid, a driving shaft extended from the container, a moving member which is linearly moved together with the driving shaft by virtue of a jet flow of the electro-sensitive movable fluid, and at least one pair of electrodes which produce the jet flow of the electro-sensitive movable fluid upon application of a voltage.

The linear motor of the invention is broadly divided into a SE type ECF linear motor (stator-electrode type electro-conjugate fluid linear motor), a PE type ECF linear motor (piston-electrode type electro-conjugate fluid linear motor) and a CE type ECF linear motor (complex-electrode type electrode-conjugate fluid linear motor), with respect to the position of the electrode provided therein.

In the SE type ECF linear motor, the container (fluid container) has an outer cylinder and an inner cylinder; the electrodes are arranged between the outer cylinder and the inner cylinder and function to form an ununiform electric field in the electro-sensitive movable fluid; and the jet flow of the electro-sensitive movable fluid produced between the outer cylinder and the inner cylinder upon application of a voltage between the electrodes is introduced into the inner cylinder to thereby move the moving member in the inner cylinder.

In the PE type ECF linear motor, the moving member comprises at least one pair of porous members through which the electro-sensitive movable fluid is able to pass; the pair of porous members are electrically insulated from each other and are fixed to the driving shaft; and an ununiform electric field is formed in the electro-sensitive movable fluid by applying a voltage to the porous members to thereby produce a jet flow of the electro-sensitive movable fluid, whereby the porous members are moved together with the driving shaft in the container by virtue of the reaction of the jet flow of the electro-sensitive movable fluid.

The CE type ECF linear motor is a complex type of the SE type ECF linear motor and the PE type ECF linear motor. In the CE type ECF linear motor, for example, the fluid container has an outer cylinder and an inner cylinder; at least one pair of electrodes is arranged in the inner cylinder, and function to form an ununiform electric field in the electro-sensitive movable fluid and further are reversible in their polarities; the moving member which is moved with the jet flow of the electro-sensitive movable fluid produced upon application of a voltage between the electrodes is arranged between the outer cylinder and the inner cylinder; and the moving member is united to the driving shaft extended from the container.

The micropump according to the invention comprises an electro-sensitive movable fluid and at least two electrodes which are arranged in such a manner that the electro-sensitive movable fluid is moved in the direction of one electrode to the other electrode upon application of a voltage.

The method of using a micropump according to the invention comprises the steps of arranging at least two electrodes in such a manner that an electro-sensitive movable fluid is moved in the direction of one electrode to the other electrode upon application of a voltage, applying a voltage to the micropump containing the electro-sensitive movable fluid, and producing a jet flow of the electro-sensitive movable fluid in the direction of a target.

The microactuator of the invention using the above-mentioned micropump as a cooling means comprises an expansion pump chamber, suction and discharge valves to suction and discharge a liquid from and to the outside by expansion and contraction of the expansion pump chamber, an expansion driving member made of a shape-memory alloy which is contracted by electric power supply to expand or contract the expansion pump chamber, and a micropump comprising an electro-sensitive movable fluid and at least two electrodes which are arranged in such a manner that the electro-sensitive movable fluid is moved in the direction of one electrode to the other electrode upon application of a voltage, said microactuator serving to cool the shape-memory alloy with the jet flow of the electro-sensitive movable fluid produced by the micropump.

The micropump of the invention is designed so that the electro-sensitive movable fluid is moved between the electrodes correspondingly to the voltage applied between the electrodes, and serves as a pump by virtue of the self-propelled electro-sensitive movable fluid under application of a voltage. If a jet flow of the electro-sensitive movable fluid in the direction of a target is produced and brought into contact with the target, the micropump of the invention can be used as a means to cool the target when the temperature of the target is higher than the temperature of the electro-sensitive movable fluid.

The method of controlling flow properties of a fluid according to the invention comprises the steps of arranging at least one pair of electrodes capable of forming an ununiform electric field in a fluid, applying a voltage between the electrodes to produce a jet flow of the fluid between the electrodes, and controlling flow properties of the fluid by the jet flow.

The apparatus for controlling flow properties of a fluid according to the invention includes in a fluid at least one pair of electrodes capable of forming an ununiform electric field, said electrodes being arranged in such a manner that a voltage can be applied between the electrodes and that a gap to be filled with the fluid is formed between the electrodes.

At least one of the electrodes is preferably an uneven surface electrode having a non-smooth surface, particularly preferably a flocked electrode.

If a pair of electrodes capable of forming an ununiform electric field in a fluid is arranged in the fluid and if a voltage is applied between the electrodes, a new flow (jet flow) of the fluid, such as a circulating flow, is produced. When the shear direction of the original motion of the fluid is at right angles to the newly produced jet flow of the fluid, it is presumed that resistance to the relative motion of the fluid in the shear direction is produced, that is, shear stress is increased.

When a certain kind of a dielectric fluid (i.e., "electro-sensitive movable fluid" referred to herein) is subjected to an electric field, an electric force is generated in the fluid owing to the ununiformity of electric conductivity and dielectric constant. In the direct-current electric field, the Coulomb force acting on space charge dominates the dielectrophoretic force. This Coulomb force causes hydrodynamic instability, resulting in occurrence of convection of the electro-sensitive movable fluid or a secondary motion of the fluid. These phenomena are known as "electrohydrodynamic (EHD) effects".

The micromotor, the linear motor and the micropump according to the invention use, as driving force, a motion (jet flow) of the electro-sensitive movable fluid produced upon application of a voltage to the fluid. These control the flow properties or a fluid by forming a new jet flow from at least one pair of electrodes capable of forming ununiform electric field in the fluid in a different direction, e.g. vertical and opposite direction, from that of the flowing fluid.

The present inventors consider that the motion of the electro-sensitive movable fluid is probably by virtue of the EHD effects, but they do not conclude that the phenomenon occurring in the invention is owing to the "EHD effects".

The micromotor, the linear motor and the micropump of the invention are apparatuses advantageously used to take out the flow energy of the electro-sensitive movable fluid produced upon application of a voltage as driving force. That is, they are apparatuses to form a jet flow of the dielectric fluid by application of a voltage and to take out the jet flow as driving force. The micromotor of the invention is extremely small, and it can be made thin. Besides, the micromotor can be driven at a high speed.

BRIEF DESCRIPTION OF THE DRAWINGS

FIG. 2(A) is a vertical sectional view of the SE type ECF motor of the invention, and FIG. 2(B) is a sectional view taken on line X—X of FIG. 2(A).

FIG. 3(C) is a perspective view of the rotator, and FIG. 3(D) is a sectional view taken on line Y—Y of FIG. 2(A).

FIG. 5 is a view showing an embodiment of arrangement of the electrodes in the RE type ECF motor.

FIG. 6(A) and FIG. 6(B) are each a sectional view showing another structure of the rotator.

FIGS. 31($a$ & $b$) and FIG. 32($a$ & $b$) are each a view showing an embodiment of the piston driving apparatus using the micropump of the invention as a cooling means.

FIG. 39 is a schematic view showing an embodiment of the control apparatus preferably used in the invention.

DETAILED DESCRIPTION OF THE INVENTION

Figure 4:
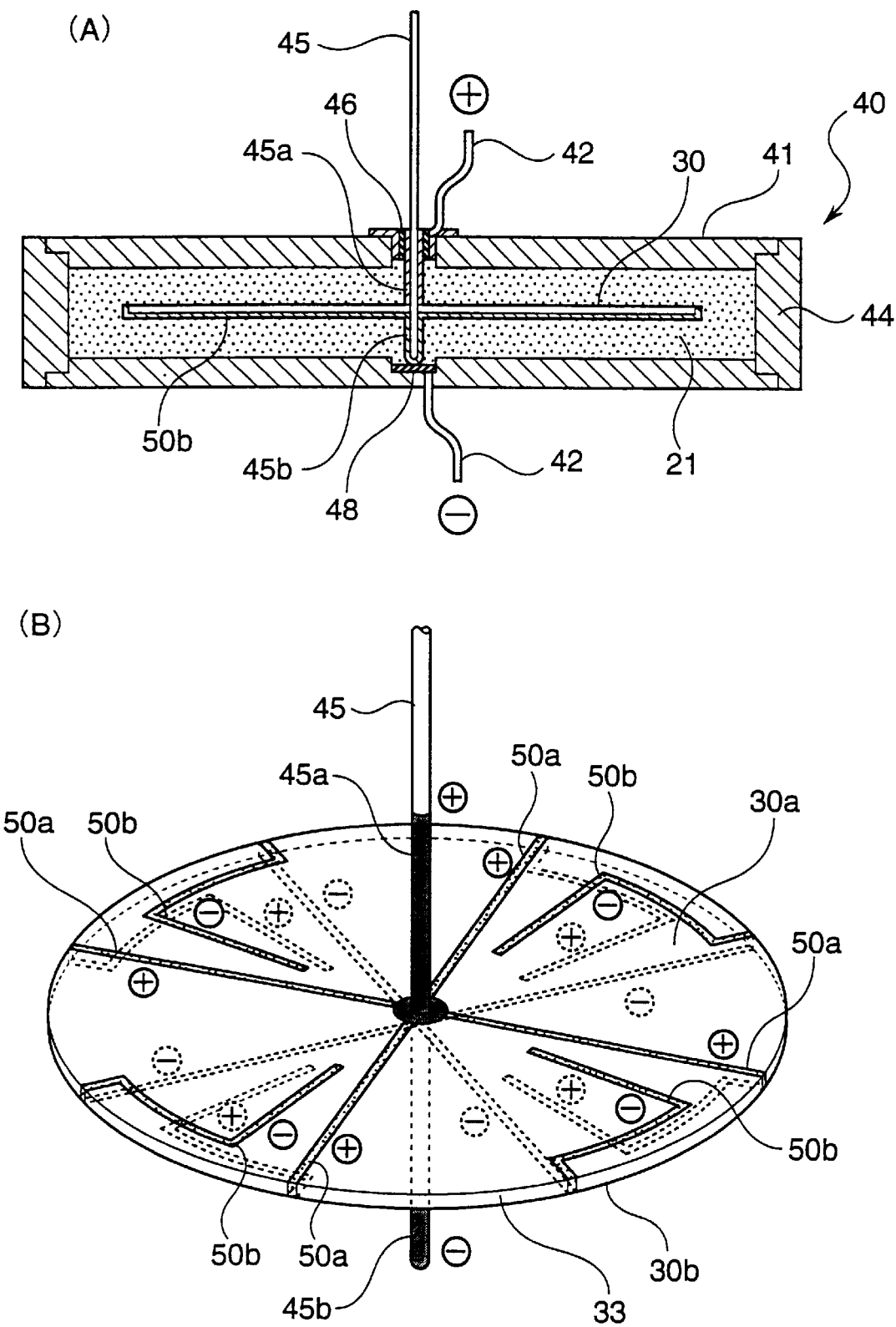
FIG. 4(A) is a vertical sectional view of the RE type ECF motor of the invention.
FIG. 4(B) is a perspective view of the rotator.
Figure 7:
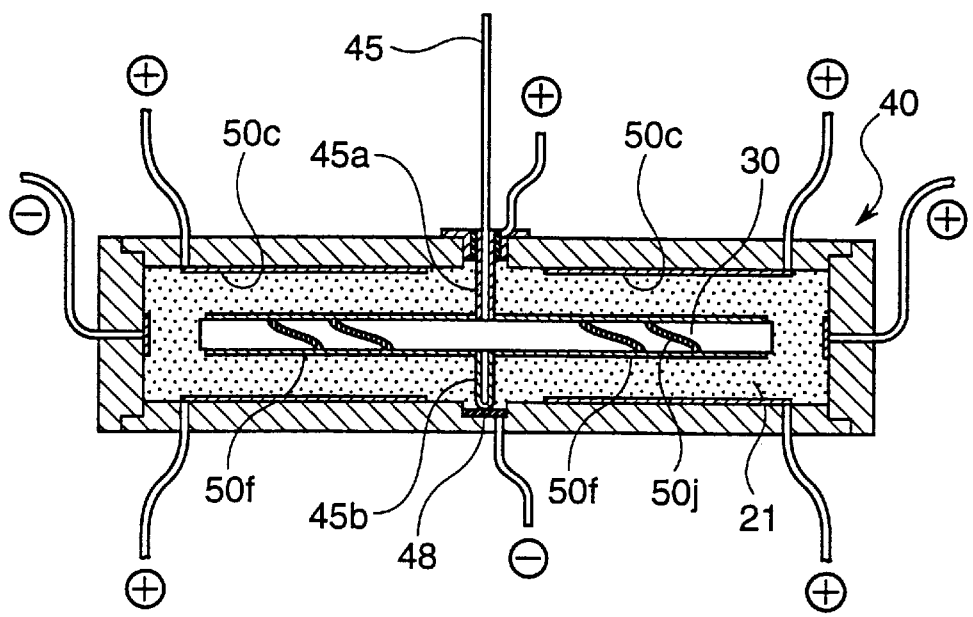
FIGS. 7A–E are a view showing a complex type micromotor of the SE type ECF motor and the RE type ECF motor.

The micropump according to the invention is described in detail hereinafter.

The electro-sensitive movable fluid for use in the invention is an organic compound capable of forming a jet flow between the electrodes correspondingly to the applied voltage, said organic compound being liquid at its working temperature. This organic compound is substantially dielectric.

The organic compound generally has at least one ester linkage in the molecule.

Listed below are examples of the compounds having the above properties and employable as the electro-sensitive movable fluid in the invention.

(1) Dibutyl adipate (DBA)
(2) Tributyl citrate (TBC)
(3) Monobutyl maleate (MBM)
(4) Diallyl maleate (DAM)

(5) Dimethyl phthalate (DMP)

(6) Triacetin

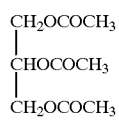

(7) Ethyl cellosolve acetate (8) 2-(2-Ethoxyethoxy)ethyl acetate (9) 1,2-Diacetoxyethane

(10) Triethylene glycol diacetate

(11) Butyl cellosolve acetate

(12) Butyl carbitol acetate

(13) 3-Methoxy-3-methylbutyl acetate (Solfit AC)

(14) Dibutyl fumarate (DBF)

(15) 2-Ethylhexyl benzyl phthalate (trade name: Placizer B-8)

(17) Propylene glycol methyl ether acetate (PMA)

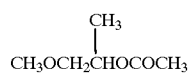

(18) Methyl acetyl ricinoleate (MAR-N)

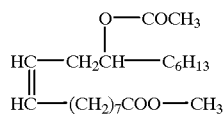

(19) 2-Ethylhexyl palmitate (trade name: Exepal EH-P)

(20) Dibutyl itaconate (DBI)

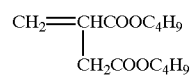

(21) Polyethylene glycol monooleate (trade name: Emanone 4110)

(22) Butyl stearate (trade name: Exepal BS)

(23) 2,2,4-Trimethyl-1,3-pentanediol diisobutyrate (trade name: Kyowanol D)

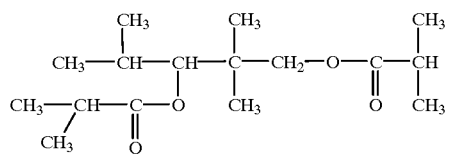

(24) 2,2,4-Trimethyl-1,3-pentanediol monoisobutyrate (trade name: Kyowanol M)

(25) Propylene glycol monoethyl ether

(26) Propylene glycol ethyl ether acetate (trade name: BP-Ethoxypropyl Acetate)

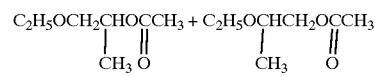

90 wt. %  10 wt. %

(27) 9,10-Epoxy butyl stearate (trade name: Sansocizer E-4030)

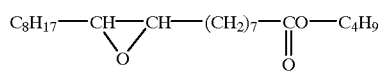

(28) Tetrahydrophthalic acid dioctyl ester (trade name: Sansocizer DOTP)

(29) Tributyl phosphate (TBP)

(30) Tributoxyethyl phosphate (TBXP)

(31) Tris(chloroethyl) phosphate (CLP)

(32) Ethyl 2-methylacetoacetate

(33) 1-Ethoxy-2-acetoxypropane

(34) 2-(2,2-Dichlorovinyl)-3,3-dimethylcyclopropane carboxylic acid methyl ester (DCM-40)

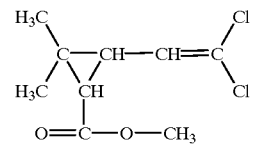

(35) Linalyl acetate

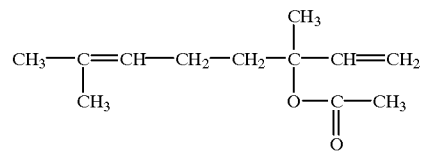

(36) Dibutyl decanedioate

(37) Mixture of Kyowanol M and Exepal EH-P in a mixing ratio of 1:4 by weight
   Kyowanol M (trade name): 2,2,4-trimethyl-1,3-pentanediol monoisobutyrate
   Exepanl EH-P (trade name): 2-ethylhexyl palmitate

(38) Mixture of DAM and Exepal BS in a mixing ratio of 1:4 by weight
   DAM (trade name): diallyl maleate
   Exepal BS (trade name): butyl stearate

(39) Dibutyl dodecanedioate (DBDD)
   Bu-OCO-$(CH_2)_5$-CH(Bu)-COO-Bu

(40) Dibutyl docosanedioate
   Bu-OCO-$(CH_2)_6$-CH($CH_3$)-$(CH_2)_4$-CH($CH_3$)-$(CH_2)_6$-COO-Bu

(41) Daphne Super Hydraulic Fluid 32 (hydraulic oil) (Idemitsu Kosan Co., Ltd.)

The compounds mentioned above can be used singly or in combination.

The conductivity and the viscosity of the above compounds, as measured at 25° C., are set forth in Table 1.

TABLE 1

| Compound (™: trade name) | Conductivity (S/m) | Viscosity (Pa · s) |
|---|---|---|
| (1) DBA | $3.01 \times 10^{-9}$ | $3.5 \times 10^{-3}$ |
| (2) TBC | $5.71 \times 10^{-7}$ | $2.0 \times 10^{-2}$ |
| (3) MBM | $2.60 \times 10^{-5}$ | $2.0 \times 10^{-2}$ |
| (4) DAM | $7.80 \times 10^{-7}$ | $2.5 \times 10^{-3}$ |
| (5) DMP | $3.90 \times 10^{-7}$ | $1.2 \times 10^{-2}$ |
| (6) Triacetin ™ | $3.64 \times 10^{-9}$ | $1.4 \times 10^{-2}$ |
| (7) Ethyl cellosolve acetate | $7.30 \times 10^{-5}$ | $9.0 \times 10^{-4}$ |
| (8) 2-(2-Ethoxyethoxy)ethyl acetate | $6.24 \times 10^{-7}$ | $1.4 \times 10^{-2}$ |
| (9) 1,2-Diacetoxyethane | $2.00 \times 10^{-6}$ | $1.5 \times 10^{-3}$ |
| (10) Triethylene glycol acetate | $5.20 \times 10^{-7}$ | $8.1 \times 10^{-3}$ |
| (1i) Butyl cellosolve acetate | $2.10 \times 10^{-8}$ | $7.0 \times 10^{-4}$ |
| (12) Butyl carbitol acetate | $5.20 \times 10^{-8}$ | $1.7 \times 10^{-3}$ |
| (13) Solfit AC ™ | $8.30 \times 10^{-8}$ | $6.0 \times 10^{-4}$ |
| (14) DBF | $2.65 \times 10^{-9}$ | $3.5 \times 10^{-3}$ |
| (15) Placizer B-8 ™ | $1.10 \times 10^{-8}$ | $7.8 \times 10^{-2}$ |
| (17) PMA | $1.56 \times 10^{-7}$ | $6.0 \times 10^{-4}$ |
| (18) MAR-N ™ | $1.30 \times 10^{-8}$ | $1.4 \times 10^{-2}$ |
| (19) Exepal EH-P ™ | $2.60 \times 10^{-10}$ | $9.5 \times 10^{-3}$ |
| (20) DBI | $1.46 \times 10^{-8}$ | $3.5 \times 10^{-3}$ |
| (21) Emanone 4110 ™ | $3.75 \times 10^{-7}$ | $8.0 \times 10^{-2}$ |
| (22) Expal BS ™ | $3.10 \times 10^{-10}$ | $8.5 \times 10^{-3}$ |
| (23) Kyowanol D ™ | $6.24 \times 10^{-9}$ | $4.0 \times 10^{-3}$ |
| (24) Kyowanol M ™ | $6.80 \times 10^{-8}$ | $1.2 \times 10^{-2}$ |
| (25) MP-Ethoxypropanol ™ | $2.24 \times 10^{-5}$ | $8.0 \times 10^{-4}$ |
| (26) BP-Ethoxypropyl Acetate ™ | $3.10 \times 10^{-8}$ | $6.0 \times 10^{-4}$ |
| (27) Sansocizer E-4030 ™ | $5.46 \times 10^{-9}$ | $2.0 \times 10^{-2}$ |
| (28) Sansocizer DOTP ™ | $6.20 \times 10^{-10}$ | $4.0 \times 10^{-2}$ |
| (29) TBP | $2.20 \times 10^{-6}$ | $2.2 \times 10^{-3}$ |
| (30) TBXP | $1.10 \times 10^{-5}$ | $9.0 \times 10^{-3}$ |
| (31) CLP | $7.80 \times 10^{-6}$ | $3.0 \times 10^{-2}$ |
| (32) Ethyl 2-methylacetoacetate | $1.00 \times 10^{-4}$ | $5.0 \times 10^{-4}$ |
| (33) 1-Ethoxy-2-acetoxypropane | $4.41 \times 10^{-7}$ | $4.0 \times 10^{-4}$ |
| (34) DCM-40 ™ | $2.60 \times 10^{-5}$ | $5.5 \times 10^{-3}$ |
| (35) Linalyl acetate | $1.82 \times 10^{-9}$ | $1.3 \times 10^{-3}$ |
| (36) Dibutyl decanedioate | $1.40 \times 10^{-9}$ | $7.0 \times 10^{-3}$ |
| (39) Dibutyl dodecanedioate | $5.2 \times 10^{-9}$ | $9.3 \times 10^{-3}$ |
| (40) Dibutyl docosanedioate | $1.04 \times 10^{-9}$ | $2.5 \times 10^{-2}$ |
| (41) Daphne Super Hydraulic Fluid 32 ™ | $6.0 \times 10^{-10}$ | $5.9 \times 10^{-2}$ |

The electro-sensitive movable fluid used in the invention is preferably a compound or a mixture each having the following specific conductivity and the following specific viscosity.

Figure 1:
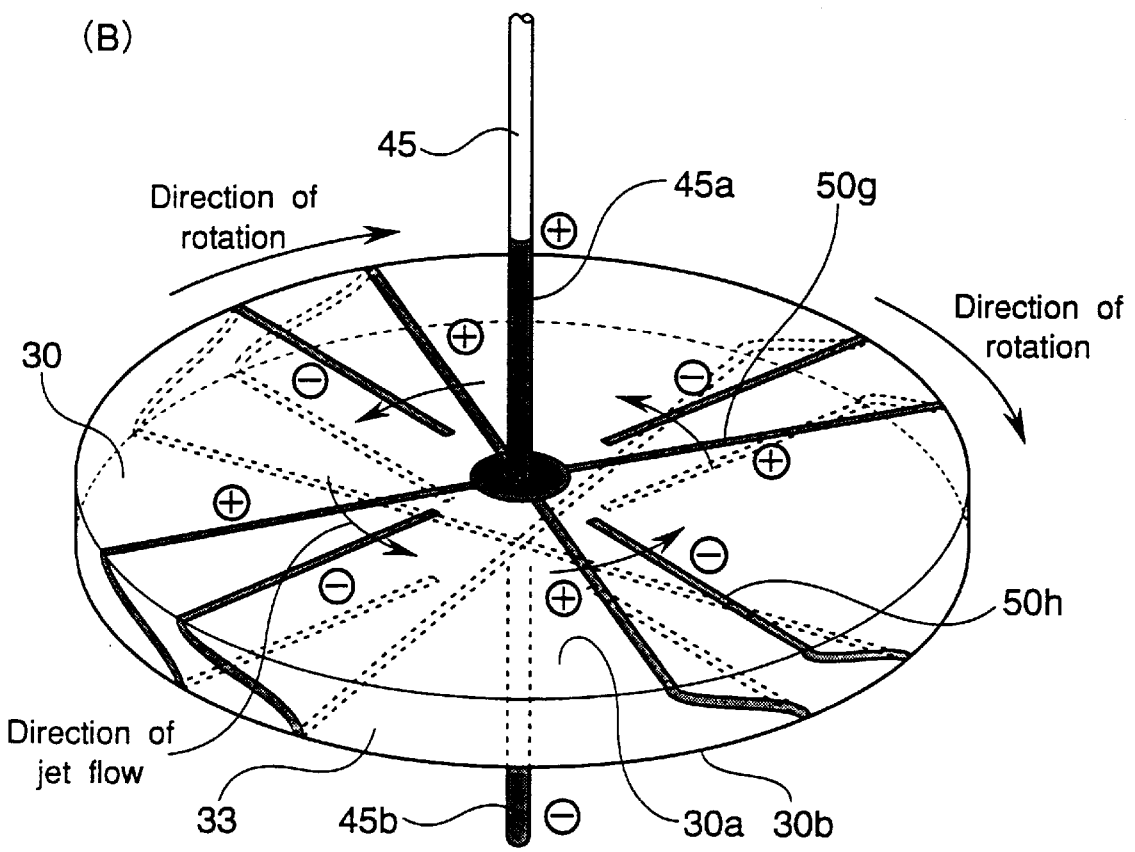
FIG. 1 is a graph showing a relation between conductivity and viscosity of the electro-sensitive movable fluid preferably used in the invention.

That is, when the conductivity σ and the viscosity η of the "dielectric fluids" including the above compounds are measured under the conditions of an electric field intensity of 2 kVmm$^{-1}$ and a temperature of 25° C., the dielectric fluids are distributed as shown in FIG. 1.

The compound used as the electro-sensitive movable fluid in the invention is preferably a compound having, at its working temperature, a conductivity a and a viscosity η located on or inside a triangle in a graph (FIG. 1) wherein the conductivity σ is plotted as abscissa and the viscosity η is plotted as ordinate, said triangle having the following points P, Q and R as vertexes. When a mixture of two or more kinds of compounds is used as the electro-sensitive movable fluid, the mixture is preferably such a mixture as adjusted to have a conductivity σ and a viscosity η located inside the above triangle.

TABLE 2

| | Conductivity (σ) | Viscosity (η) |
|---|---|---|
| Point P (Point P$^0$) | $4 \times 10^{-10}$ S/m preferably $5 \times 10^{-10}$ S/m | $1 \times 10^0$ Pa · S preferably $8 \times 10^{-1}$ Pa · S |
| Point Q (Point Q$^0$) | $4 \times 10^{-10}$ S/m preferably $5 \times 10^{-10}$ S/m | $1 \times 10^{-4}$ Pa · S preferably $2 \times 10^{-4}$ Pa · S |
| Point R (Point R$^0$) | $5 \times 10^{-6}$ S/m preferably $2.5 \times 10^{-6}$ S/m | $1 \times 10^{-4}$ Pa · S preferably $2 \times 10^{-4}$ Pa · S |

In Table 2, the points P$^0$, Q$^0$ and R$^0$ are particularly preferable points as the vertexes of the triangle wherein the electro-sensitive movable fluid of the invention is located.

Some examples of the compounds preferably used as the electro-sensitive movable fluid in the cooling method of the invention are given below.

(1) Dibutyl adipate (DBA)
  (σ=3.01×10$^{-9}$ S/m, η=3.5×10$^{-3}$ Pa·s)

(6) Triacetin
  (σ=3.64×10$^{-9}$ S/m, η=1.4×10$^{-2}$ Pa·s)

(11) Butyl cellosolve acetate
  (σ=2.10×10$^{-8}$ S/m, η=7.0×10$^{-4}$ Pa·s)

(12) Butyl carbitol acetate
  (σ=5.20×10$^{-8}$ S/m, η=1.7×10$^{-3}$ Pa·s)

(13) 3-Methoxy-3-methylbutyl acetate (Solfit AC)
  (σ=8.30×10$^{-8}$ S/m, η=6.0×10$^{-4}$ Pa·s)

(14) Dibutyl fumarate (DBF)
  (σ=2.65×10$^{-9}$ S/m, η=3.5×10$^{-3}$ Pa·s)

(17) Propylene glycol methyl ether acetate (PMA)
  (σ=1.56×10$^{-7}$ S/m, η=6.0×10$^{-4}$ Pa·s)

(18) Methyl acetyl ricinoleate (MAR-N)
  (σ=1.30×10$^{-8}$ S/m, η=1.3×10$^{-2}$ Pa·s)

(20) Dibutyl itaconate (DBI)
  (σ=1.46×10$^{-8}$ S/m, η=3.5×10$^{-3}$ Pa·s)

(23) 2,2,4-Trimethyl-1,3-pentanediol diisobutyrate (trade name: Kyowanol D)
  (σ=6.24×10$^{-9}$ S/m, η=4.0×10$^{-3}$ Pa·s)

(26) Propylene glycol ethyl ether acetate (trade name: BP-Ethoxypropyl Acetate)
  (σ=3.10×10$^{-8}$ S/m, η=6.0×10$^{-4}$ Pa·s)

(27) 9,10-Epoxy butyl stearate (trade name: Sansocizer E-4030)
  (σ=5.46×10$^{-9}$ S/m, η=2.0×10$^{-2}$ Pa·s)

(28) Tetrahydrophthalic acid dioctyl ether (trade name: Sansocizer DOTP)
  (σ=6.20×10$^{-10}$ S/m, η=4.0×10$^{-2}$ Pa·s)

(33) 1-Ethoxy-2-acetoxypropane
  (σ=4.41×10$^{-7}$ S/m, η=4.0×10$^{-4}$ Pa·s)

(35) Linalyl acetate
  (σ=1.82×10$^{-9}$ S/m, η=1.3×10$^{-3}$ Pa·s)

(36) Dibutyl decanedioate
  (σ=1.40×10$^{-9}$ S/m, η=7.0×10$^{-3}$ Pa·s)

(39) Dibutyl dodecanedioate (DBDD)
  (σ=5.2×10$^{-9}$ S/m, η=9.3×10$^{-2}$ Pa·s)

(40) Dibutyl docosanedioate
  (σ=1.04×10$^{-9}$ S/m, η=2.5×10$^{-3}$ Pa·s)

(41) Daphne Super Hydraulic Fluid 32
  (σ=6.0×10$^{-10}$ S/m, η=5.9×10$^{-2}$ Pa·s)

When a mixture of plural compounds is used as the electro-sensitive movable fluid in the invention, the conductivity and the viscosity of the mixture are made to be located inside the triangle defined by the points P, Q and R shown in FIG. 1, whereby the mixture can be preferably used in the invention.

In other words, even if each of the compounds has a conductivity and/or a viscosity out of the above range, a mixture of the compounds can be favorably used as the electro-sensitive movable fluid in the invention, as far as the conductivity and the viscosity of the mixture are within the above range, respectively.

For example, a mixture ($\sigma=2.60\times10^{-9}$ S/m, $\eta=9.8\times10^{-3}$ Pa·s) of 2,2,4-trimethyl-1,3-pentanediol monoisobutyrate (trade name: Kyowanol M, $\sigma=6.80\times10^{-8}$ S/m, $\eta=1.2\times10^{-2}$ Pa·s) and 2-ethylhexyl palmitate (trade name: Exepal EH-P, $\sigma=2.60\times10^{-10}$ S/m, $\eta=9.5\times10^{-3}$ Pa·s) in a mixing ratio of 1:4 by weight, each having a conductivity and a viscosity out of the above range, can be favorably used as the electro-sensitive movable fluid in the invention. Also, a mixture ($\sigma=4.17\times10^{-9}$ S/m, $\eta=5.0\times10^{-3}$ Pa·s) of DAM (diallyl maleate, $\sigma=7.8\times10^{-7}$ S/m, $\eta=2.5\times10^{-3}$ Pa·s) and butyl stearate (trade name: Exepal BS, $\sigma=3.1\times10^{-10}$ S/m, $\eta=8.5\times10^{-3}$ Pa·s) in a mixing ratio of 1:4 by weight, each having a conductivity and a viscosity out of the above range, can be favorably used as the electro-sensitive movable fluid in the invention.

The requisite of the electro-sensitive movable fluid is that the movable fluid has the above-defined conductivity and viscosity at its working temperature in the invention. That is, even the compounds having a conductivity and a viscosity out of the above range at 25° C. are employable as the electro-sensitive movable fluids, as long as the conductivity and the viscosity of the compounds are within the above range at their working temperatures.

The electro-sensitive movable fluid does not particularly need to contain other substances, but additives such as stabilizer, high-molecular weight dispersant, surface active agent and high-molecular weight viscosity increasing agent may be added. Further, compounds having no ester linkage can be used as the electro-sensitive movable fluid, with the proviso that the conductivity and the viscosity of the compounds are located inside the above triangle.

Next, the thin SE type ECF motor using the electro-sensitive movable fluid is described.

FIG. 2(A) schematically shows a section of the thin SE type ECF motor of the invention. FIG. 2(B) is a sectional view taken on line X—X of FIG. 2(A). FIG. 3(D) is a sectional view taken on line Y—Y of FIG. 2(A). FIG. 3(C) is a schematic perspective view of a rotator.

The thin SE type ECF motor of the invention has a container 44 (bottomed fluid container) to be filled with an electro-sensitive movable fluid and a lid 41 which is engaged with the open top to close the fluid container 44. When the lid 41 is engaged with the upper open part of the fluid container 44, the lid 41 and the fluid container 44 constitute a closed housing 40.

The fluid container 44 for constituting the housing 40 has a bottom and is generally made of a material which is corrosion resistant to the electro-sensitive movable fluid filled therein. Examples of such materials include synthetic resins, such as polyolefins (e.g., polyethylene and polypropylene), Teflon™, polycarbonate, acrylic resin and other engineering plastics; ceramics; woods; metals; and glasses. The fluid container 44 can be formed from a conductive material such as metal (e.g., stainless steel). The fluid container 44 formed from a conductive material is preferably subjected to electrical insulation treatment so as not to mar the insulated state between the electrodes, or the fluid container 44 is preferably formed from an insulating material.

The lid 41 is provided so as to close the open top of the medium container 44. The center of the lid 41 is provided with an upper bearing section 46 by which a rotating shaft 45 is rotatably borne.

A lower bearing section 48 is provided at the center of a bottom 49 of the housing 40 to bear the lower end of the rotating shaft.

In the housing 40, a rotator 30 is incorporated. The rotator 30 is arranged so as to be rotated in the housing 40 together with the rotating shaft 45. The rotator 30 is rotated by virtue of a jet flow of the electro-sensitive movable fluid 21 filled in the housing 40.

In the present invention, the rotator 30 is formed from a material which is corrosion resistant to the electro-sensitive movable fluid filled in the fluid container. Examples of such materials include synthetic resins, such as polyolefins (e.g., polyethylene and polypropylene), Teflon™, polycarbonate, acrylic resin and other engineering plastics; ceramics; woods; metals; and glasses.

In the SE type ECF motor, electrodes 50a,b are provided on the lower surface of the lid 41 for constituting the housing 40 and/or the inner surface of the bottom of the fluid container 44. In FIGS. 2(A), 2(B) and 3(D), a SE type ECF motor wherein the electrodes 50a,b are provided on both of the lower surface of the lid 41 and the upper surface of the bottom of the medium container 44 is shown. The electrodes 50a,b may be provided on both of those surfaces as described above, or they may be provided on one of the lower surface of the lid 41 and the upper surface of the bottom of the fluid container 44.

When the electrodes are arranged in such a manner that an ununiform electric field is formed in the electro-sensitive movable fluid and a voltage is applied between the electrodes, a jet flow of the electro-sensitive movable fluid is produced. Each of FIG. 2(B) and FIG. 3(D) shows an embodiment wherein four positive electrodes 50a are arranged radially from the center of the housing in such a manner that the angle between the adjacent positive electrodes becomes 90° and four negative electrodes 50b are arranged in such a manner the angle between the negative electrode and the adjacent positive electrode becomes 22.5°.

The electrodes 50a,b may be formed by stretching conductor wires, but it is preferable that the electrodes 50a,b are formed by utilizing plating technique adopted in the preparation of printed circuit boards because the SE type ECF motor of the invention is extremely thin (e.g., height of housing: 2 mm or less). By the use of the plating technique, the thickness of the electrode 50a,b can be made not more than 100 $\mu$m, preferably 0.1 to 50 $\mu$m.

As described above, the electrodes 50a,b are arranged in such a manner that an ununiform electric field is formed in the electro-sensitive movable fluid 21. There is no specific limitation on the number of the electrodes. The number thereof (total of positive electrodes and negative electrodes) is in the range of usually 2 to 48, preferably 2 to 36. The electrode 50a,b is electrically connected to one end of a conductor 42 so that a voltage can be applied from the outside, and the other end of the conductor 42 is extended from the housing 40.

When the electrodes 50a,b are provided on both the lower surface of the lid 41 and the upper surface of the bottom of the fluid container 44, a jet flow of the electro-sensitive movable fluid 21 is produced between the adjacent electrodes, because the rotator 30 is present between the upper electrode and the lower electrode and therefore a jet flow of the electro-sensitive movable fluid is hardly produced between the upper electrode and the lower electrode.

That is, a jet flow of the electro-sensitive movable fluid is produced in the direction of an arrow as shown in each of FIGS. 2(A), 2(B), 3(C) and 3(D).

In the thin SE type ECF motor of the invention, the rotator 30 is rotated by the jet flow of the electro-sensitive movable fluid produced as above to thereby convert the electric energy applied to the electrodes to rotational energy which can be taken out.

The rotator 30 is a circular plate fixed to the rotating shaft 45, and the surface of the circular plate is provided with a flow receiving member 31 to receive the jet flow of the electro-sensitive movable fluid and thereby rotate the circular plate. There is no specific limitation on the shape and the number of the flow receiving member 31, as far as the jet flow of the electro-sensitive movable fluid can be received. Each of FIGS. 2(A), 2(B) and 3(C) shows an embodiment wherein six convex bars having a section of right-angled triangle are radially provided on each of the front and the back surfaces of the circular plate. In general, flow receiving members 31 of usually 2 to 30, preferably 3 to 20, are provided on the surface of the rotator 30, said surface facing the surface of the housing 40 where the electrodes 50a,b are arranged. The convex bars each having a section of right-angled triangle are arranged in such a manner that a side of the triangle, which is at right angles to the jet flow of the electro-sensitive movable fluid 21, is at right angles to the rotator. The flow receiving member 31 can be provided so that this member protrudes from the circular plate (rotator 30) as described above, or it can be provided in the concave form if the circular plate has an appropriate thickness. The flow receiving member 31 functions as resistance to the jet flow of the electro-sensitive movable fluid 21 and rotates the rotator 30 together with the jet flow. Therefore, the flow receiving member 31 is not always a linear member such as the above-mentioned convex bar or concave line. For example, the member 31 may be a simple protrusion or a simple depression, or the surface of the circular plate can be processed to have high surface roughness.

In each of FIGS. 2(A), 2(B), 3(C) and 3(D), an embodiment wherein the rotator 30 is a flat circular plate is shown, but the rotator 30 can be modified to have a vertical section of any of various shapes such as inverse triangle, rhombus and circle.

The center of the rotator 30 is fixed to the rotating shaft 45, and the rotating shaft 45 is rotatably fitted to housing 40. The rotator 30, the rotating shaft 45 and the optionally provided flow receiving member 31 are formed from materials which are corrosion resistant to the electro-sensitive movable fluid. Examples of such materials include synthetic resins, such as polyolefins (e.g., polyethylene and polypropylene), Teflon™, polycarbonate, acrylic resin and other engineering plastics; ceramics; woods; metals; and glasses.

The rotator 30 is rotated in non-contact with the inner surface of the wall of the housing 40, and the ratio between the diameter of the housing 40 and the diameter of the rotator 30 can be appropriately determined. The electro-sensitive movable fluid between the outer periphery of the rotator 30 and the inner surface of the wall of the housing 40 is considered not to directly act on the rotational motion of the rotator 30, and hence the ratio between the diameter of the fluid container 44 for constituting the housing 40 and the diameter of the rotator 30 is in the range of preferably 100:99 to 100:50, particularly preferably 100:95 to 100:75. In FIGS. 2(A) and 2(B), the diameter of the rotator is relatively small for convenience sake, but in the SE type ECF motor of extremely high efficiency, the diameter of the housing 40 and the diameter of the rotator 30 are so approximate that the rotator 30 is nearly in contact with the inner wall surface of the fluid container 41.

The thickness of the rotator 30 (including a case where the flow receiving member is provided) is in the range of usually about 0.05 to 5 mm, preferably about 0.1 to 2 mm; the depth (i.e., distance between the upper surface of the bottom and the lower surface of the lid) of the housing 40 to be filled with the electro-sensitive movable fluid 21 is in the range of usually about 0.5 to 10 mm, preferably about 1 to 2 mm; and the ratio between the height of the fluid container 44 and the diameter of the rotator 30 is in the range of usually 1:1 to 1:500, preferably 1:2 to 1:50.

The diameter of the housing 40 is in the range of usually about 3 to 50 mm, preferably about 5 to 25 mm, and the SE type ECF motor of the invention can be made extremely thin. Since the SE type ECF motor of the invention is extremely thin, the amount of the electro-sensitive movable fluid contained therein is about 0.05 to 10 ml and is very small.

In the thin SE type ECF motor of the invention, the height of the housing can be made usually not more than 20 mm, preferably not more than 2 mm. In the thin SE type ECF motor, the height up to the tip of the rotating shaft can be made about 10 mm. Though the SE type ECF motor of the invention is extremely thin, the output power density represented by the ratio of torque/volume of the container is usually not less than $1 \times 10^2$ W/m$^3$, and the SE type ECF motor can be driven with much higher efficiency by making the size smaller.

Next, the thin RE type ECF motor is described.

FIG. 4(A) is a sectional view of the RE type ECF motor, and FIG. 4(B) is a perspective view showing arrangement of the electrodes provided on the rotator. FIG. 5 shows another embodiment of the electrodes provided on the rotator. In the RE type ECF motor and the above-described SE type ECF motor, the elements in common are given the same reference numerals.

In the thin RE type ECF motor of the invention, the basic constituents are the same as those of the SE type ECF motor, but in the RE type ECF motor, the electrodes are arranged on the rotator, differently from the SE type ECF motor. When a voltage is applied between the electrodes, a jet flow of the electro-sensitive movable fluid is produced, and by virtue of the reaction of the jet flow, the rotator is rotated.

In the RE type ECF motor, a housing 40 is constituted of a fluid container 44 to be filled with an electro-sensitive movable fluid 21 and a lid 41. In the housing 40, a rotator 30 is arranged. The rotator 30 is fixed to a rotating shaft 45, and the rotating shaft 45 is rotatably fitted to the housing 40.

In the RE type ECF motor, the electrodes are not provided on the inner surface of the housing 40 but provided on the surface of the rotator 30 as shown in FIG. 4(B).

In more detail, in the RE type ECF motor, the rotating shaft 45 and the rotator 30 are united in one body, and the rotating shaft above the rotator 30 is coated with a conductive film 45a of a conductive metal. The conductive film 45a continues to the joint to the rotator 30 and is further extended radially and linearly on an upper surface 30a of the rotator 30 toward a rim 33 of the rotator 30 to form electrode 50a on the upper surface 30a of the rotator 30. The electrode 50a which has reached the rim 33 of the rotator 30 is then extended downward along the rim wall and reaches the lower surface (back surface) 30b of the rotator 30. The electrode 50a is further extended along the circumferential direction, then is bent before an electrode 50b on the back surface and is linearly extended in the axial direction, to form electrode 50a on the lower surface (back surface) 30b.

On the other hand, the rotating shaft below the rotator 30 is coated with a conductive film 45b. The conductive film 45b continues to the joint to the rotator 30 and is further extended radially and linearly on the lower surface 30b of the rotator 30 toward a rim 33 of the rotator 30 to form electrode 50b on the lower surface 30b of the rotator 30. The electrode 50b which has reached the rim 33 of the rotator 30 is then extended upward along the rim wall and reaches the upper surface 30a of the rotator 30. The electrode 50b is further extended along the circumferential direction, then is bent before the linear electrode 50a on the upper surface and is linearly extended in the axial direction, to form electrode 50b on the upper surface 30a.

The electrodes 50a and 50b are a positive electrode and a negative electrode, respectively, and they are electrically insulated from each other.

FIG. 4(B) shows an embodiment wherein the positive electrodes 50a and the negative electrodes 50b are extended radially from the center of the rotator. In this RE type ECF motor, the electrodes are arranged in such a manner that an ununiform electric field is formed in the electro-sensitive movable fluid, whereby a jet flow of the fluid is produced. Therefore, there is no specific limitation on the arrangement of the electrodes and the shape thereof, as far as an ununiform electric field can be formed in the electro-sensitive movable fluid. For example, the positive electrodes 50a and the negative electrodes 50b can be arranged so that a pair of the electrodes 50a, 50b is nearly in parallel to each other as shown in FIG. 5. In this case, if a fluid which forms a jet flow in the direction of one electrode to the other electrode (direction of the positive electrode 50a to the negative electrode 50b in FIG. 5) is used as the electro-sensitive movable fluid, the electro-sensitive movable fluid forms a jet flow in the circumferential direction on the upper surface or the lower surface of the rotator 30 in the RE type ECF motor, and the rotator 30 is rotated in the direction of the reaction of the jet flow (i.e., opposite direction to the direction of the jet flow).

In the housing 40 of the RE type ECF motor of the invention, the rotating shaft 45 is borne by the upper bearing section 46 and the lower bearing section 48. Portions of the upper bearing section and the lower bearing section, which are brought into contact with the conductive film 45a and the conductive film 45b provided on the surface of the rotating shaft 45, are formed from a conductive material. These conductive material portions are connected to the conductors 42, 42 so that a voltage can be applied from the outside.

Though the electrodes 50a, 50b and the conductive films 45a, 45b can be formed from various conductive materials, it is preferable that they are formed by utilizing plating technique adopted in the preparation of printed circuit boards in view of the RE type ECF motor of the invention being extremely thin and small. The electrodes 50a, 50b and the conductive film 45a, 45b are all extremely thin, and they have a thickness of usually 0.01 to 30 $\mu$m, preferably 0.1 to 15 $\mu$m. The upper bearing section 46 and the lower bearing section 48 both can be formed by bonding a conductive metal, or can be formed by utilizing plating technique similarly to the above. The bearing sections 46, 48 and the conductive films 45a, 45b formed on the surface of the rotational shaft 45 serve as contact points to supply a voltage. The bearing sections also serve as sliding points to rotate the rotator 30, and therefore they are preferably provided with friction reducing means such as ball bearing to inhibit decrease of rotational speed caused by friction between the bearing sections and the rotating shaft. In case of using plating technique, solid components such as graphite, molybdenum disulfide particles, Teflon™ particles and boron nitride (BN) particles, particularly solid lubricating components, are preferably added to the conductive materials containing gold, silver, copper or nickel, to reduce friction therebetween. When the conductive material has lubricating function or the solid lubricating component has conductivity, both conducting properties and lubricating properties can be obtained by plating only one component out of the above.

In FIGS. 4(A) and 4(B), the rotator 30 is in the shape of a flat plate. However, the shape of the rotator is not specifically limited and can be appropriately determined. For example, the rotator may have a vertical section of inverse triangle as shown in FIG. 6(A), a vertical section of rhombus as shown in FIG. 6(B), or a vertical section of circle.

The rotator 30 is rotated in non-contact with the inner wall surface of the housing 40, and the diametric ratio between the housing 40 and the rotator 30 can be appropriately determined. The electro-sensitive movable fluid 21 present between the outer periphery of the rotator 30 and the inner wall surface of the housing 40 is considered not to directly act on the rotational motion of the rotator 30, and hence the ratio between the diameter of the fluid container 44 for constituting the housing 40 and the diameter of the rotator 30 is in the range of preferably 100:99 to 100:50, particularly preferably 100:95 to 100:75. In FIG. 4(A), the diameter of the rotator 30 is relatively small for convenience sake, but in the RE type ECF motor of extremely high efficiency, the inner diameter of the fluid container 44 and the diameter of the rotator 30 are so approximate that the rotator 30 is nearly in contact with the inner wall surface of the fluid container 44.

The thickness of the rotator 30 is in the range of usually about 0.05 to 5.0 mm, preferably about 0.1 to 1.0 mm, and the depth (i.e., distance between the upper surface of the bottom and the lower surface of the lid) of the housing 40 to be filled with the electro-sensitive movable fluid 21 is in the range of usually about 0.05 to 5.0 mm, preferably about 0.1 to 1.0 mm.

In the thin RE type ECF motor of the invention, the ratio between the height of the rotator and the diameter of the rotator can be appropriately determined, and the ratio therebetween is in the range of usually 1:1 to 1:500, preferably 1:2 to 1:50.

The RE type ECF motor of the invention can be made extremely thin.

In the thin RE type ECF motor of the invention, the height of the housing 40 can be made usually not more than 20 mm, preferably not more than 2 mm, and the height up to the tip of the rotating shaft can be made about 10 mm. Though the RE type ECF motor of the invention is extremely thin, the output power density represented by the ratio of torque/volume of the container is usually not less than $1 \times 10^2$ W/m$^3$, and the RE type ECF motor can be driven with much higher efficiency by making the size smaller.

The thin micromotor of the invention may be the SE type ECF motor wherein the electrodes are arranged on the housing 40, the RE type ECF motor wherein the electrodes are arranged on the rotator 30, or a complex type thereof. As shown in FIGS. 7(A), 7(B), 7(C), 7(D) and 7(E), the lower surface of the lid 41 of the housing 40 is provided with positive electrodes 50c and negative electrodes 50d, and the surface of the bottom of the housing 40 is provided with positive electrodes 50e and negative electrodes 50f. When the electrodes 50c,d,e,f are arranged in the above way, a jet flow of the electro-sensitive movable fluid is produced predominantly between the adjacent positive and negative electrodes having a smaller distance. For example, if four positive electrodes are provided at an angle of 90° and if negative electrodes are each provided at an angle of 22.5° to the adjacent positive electrode, a jet flow of the electro-sensitive movable fluid 21 in the direction of the positive electrode to the negative electrode is generally produced. In this micromotor, a conductive film 45a is formed on the surface of the rotating shaft 45 above the upper surface 30a of the rotator 30 and a conductive film 45b is formed on the surface of the rotating shaft below the lower surface 30b of the rotator 30, similarly in the above-mentioned RE type ECF motor. Further, positive electrodes 50g and negative electrodes 50h extending from the rotating shaft 45 to the rim 33 are provided on the surfaces of the rotator 30, similarly in the above-mentioned RE type ECF motor. Since the angle between the positive electrode 50g and its negative electrode 50h is 22.5°, a jet flow of the electro-sensitive movable fluid 21 in the direction of the positive electrode 50g to the negative electrode 51h is produced between those electrodes. The thickness of the rotator 30 is relatively large, and rim electrodes 50j to connect the upper surface 30a of the rotator 30 to the lower surface 30b thereof are provided obliquely on the surface of the rim wall of the roator 30. Therefore, a jet flow of the electro-sensitive movable fluid is produced also by the rim electrodes 50j. In this micromotor, electrodes 50m and 50n which are adjacent to each other are provided also on the inner wall surface of the housing 40, so that a jet flow of the electro-sensitive movable fluid is produced also by the electrodes 50m and 50n. When the polarities of these electrodes are set in such a manner that the resulting jet flows of the electro-sensitive movable fluid are in one direction, the fluid can be moved at a higher velocity because of the resulting jet flows in one direction, and thereby the rotator 30 may be rotated at a higher rotational speed.

Figure 8:
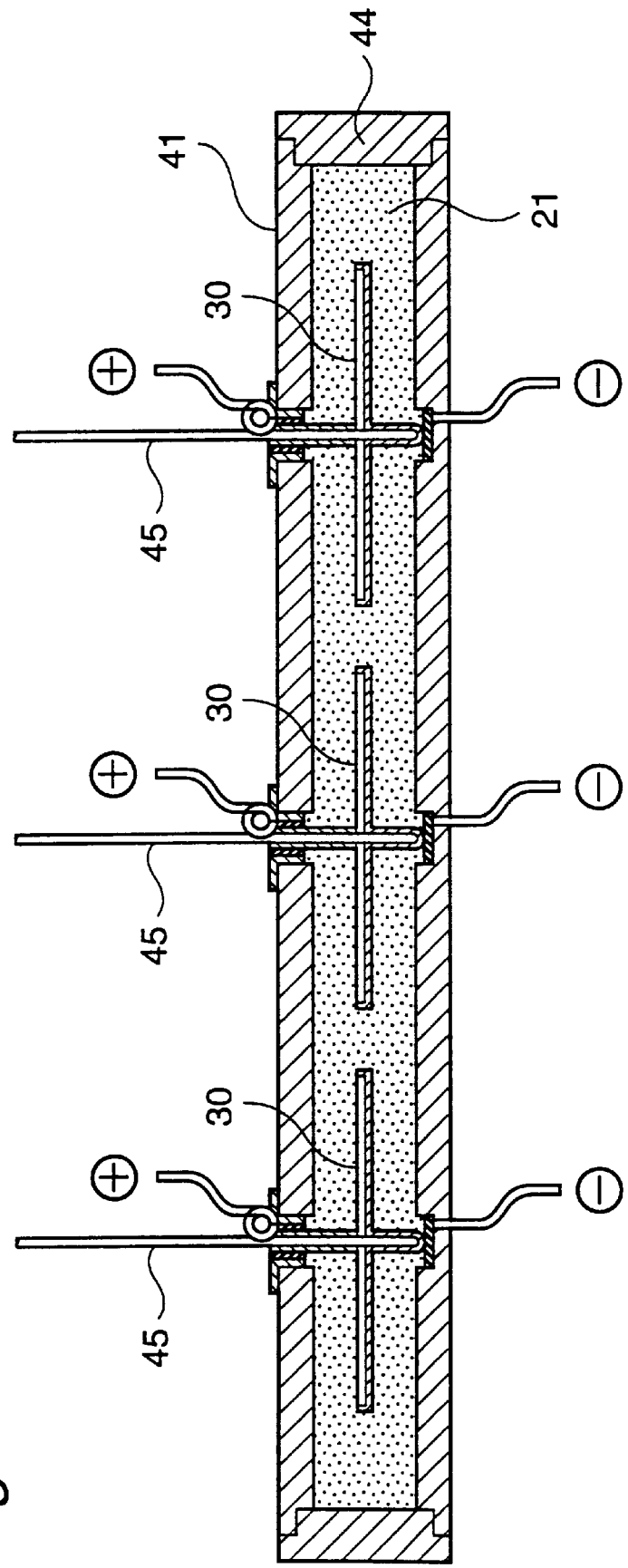
FIG. 8 is a sectional view of the micromotor having plural rotators.

As shown in FIG. 8, the micromotor of the invention can include plural rotators 30 in the fluid container 44. FIG. 8 shows an embodiment of the RE type ECF motor wherein three rotators 30 are fixed to the rotating shaft 45 and are rotatable in the housing 44.

The micromotor of the invention has a housing height of usually not more than 20 mm and is extremely thin. By properly selecting arrangement of the electrodes, a material of the rotator, etc., the height of the housing can be decreased to not more than 2 mm. Though the micromotor of the invention is extremely thin, it can be stably driven at a high rotational speed of about several hundreds to several tens of thousands rpm.

Next, the other micromotor according to the invention is described.

Figure 9:
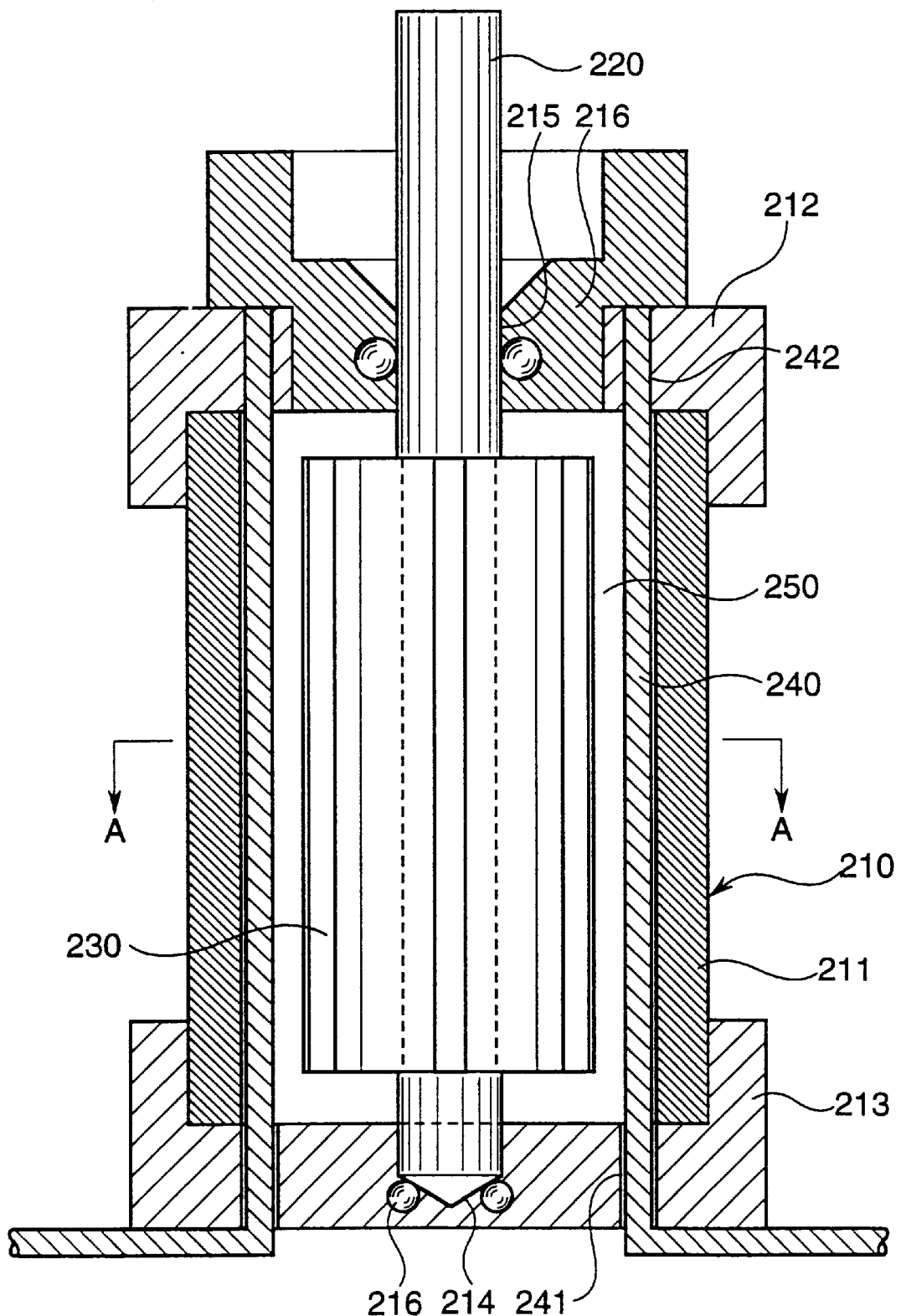
FIG. 9 is a vertical sectional view of the SE type ECF motor.
Figure 10:
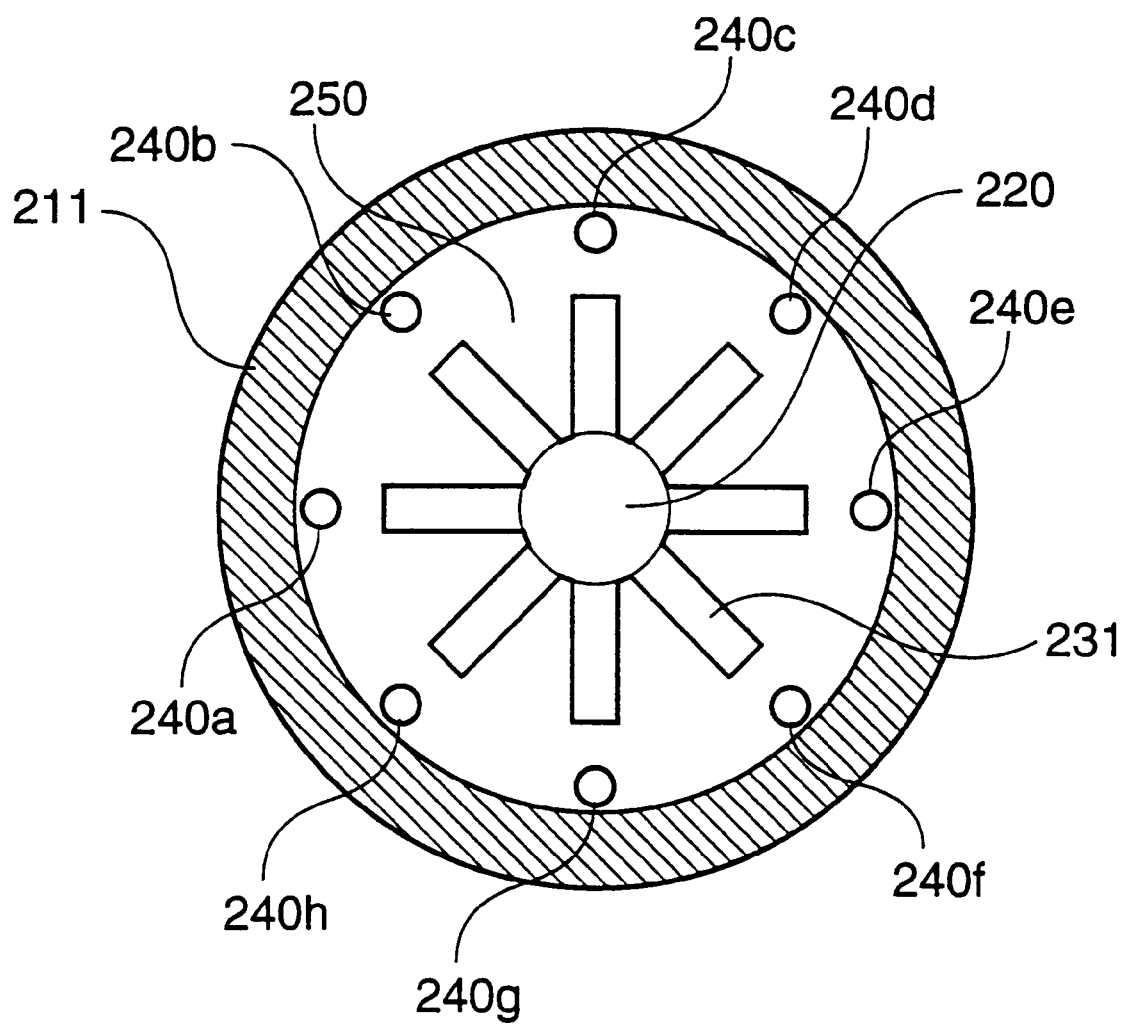
FIG. 10 is a sectional view taken on line A—A of FIG. 9.

FIG. 9 and FIG. 10 show an embodiment of a SE type ECF motor (stator-electrode type electro-conjugate fluid motor) that is the first micromotor of the invention.

The SE type ECF motor shown in FIG. 9 and FIG. 10 includes a container (bottomed cylindrical fluid container) 211 to be filled with an electro-sensitive movable fluid 250, a lid 212 for the fluid container 211, and a vane rotor 230 which rotates by detecting a motion of the electro-sensitive movable fluid 250 with the vanes 231 when the fluid is moved upon application of a voltage. A bottom 213 of the cylindrical fluid container 211 is provided with electrode insertion holes 241 to introduce electrodes 240a–240h from the outside. The lid 212 is provided with electrode fixing holes 242 to fix the electrodes 240a–240h inserted through the electrode insertion holes 241 onto the inner wall surface of the housing 210.

At the center of the lid 212, an upper bearing section 215 to bear a rotating shaft 220 of the vane rotor 230 is provided.

The vane rotor 230 has plural vanes 231 arranged radially from the rotating shaft 220, and the vane rotor 230 is fixed to the rotating shaft 220 which is rotatably fitted to the housing 210 by the upper bearing section 215 and a concave bearing section 214 provided at the center of the bottom 213 of the fluid container 211. The vane 231 is usually in the shape of a flat plate, but it may be in any shape as far as it can efficiently detect a motion of the electro-sensitive movable fluid. For example, the vane can be in the curved shape in the flow direction or in the shape of a ratchet.

The electrodes 240a–240h are introduced into the fluid container 211 through the electrode insertion holes 241 and extended upward along the inner wall surface of the fluid container 211 so as not to inhibit the rotation of the vane rotor 230. The tips of the electrodes are inserted into the electrode fixing holes 242 and fixed therein.

The electro-sensitive movable fluid 250 is contained in the fluid container 211 in such an amount that most of the vane rotor 230 is immersed in the fluid, and a direct-current voltage is applied to the electrodes 240a–240h. Dummy electrodes where no voltage is applied may be provided.

In the SE type ECF motor shown FIG. 9 and FIG. 10, the vane rotor 230 having 8 vanes 231 is arranged in the cylindrical fluid container 211, and the electro-sensitive movable fluid 250 is filled in the fluid container 211. When a voltage is applied between the electrodes 240a–240h which are arranged as shown in FIG. 10, the rotor 230 begins to rotate. As the number of the vanes of the vane rotor 230 is increased, the rotational speed tends to be increased. Further, as the distance between the electrodes becomes narrower, or as the number of the pairs of the electrodes is increased, the rotational speed 231 tends to be increased. The rotational speed of the vane rotor 230 is increased or decreased proportionally to the applied voltage.

Figure 11:
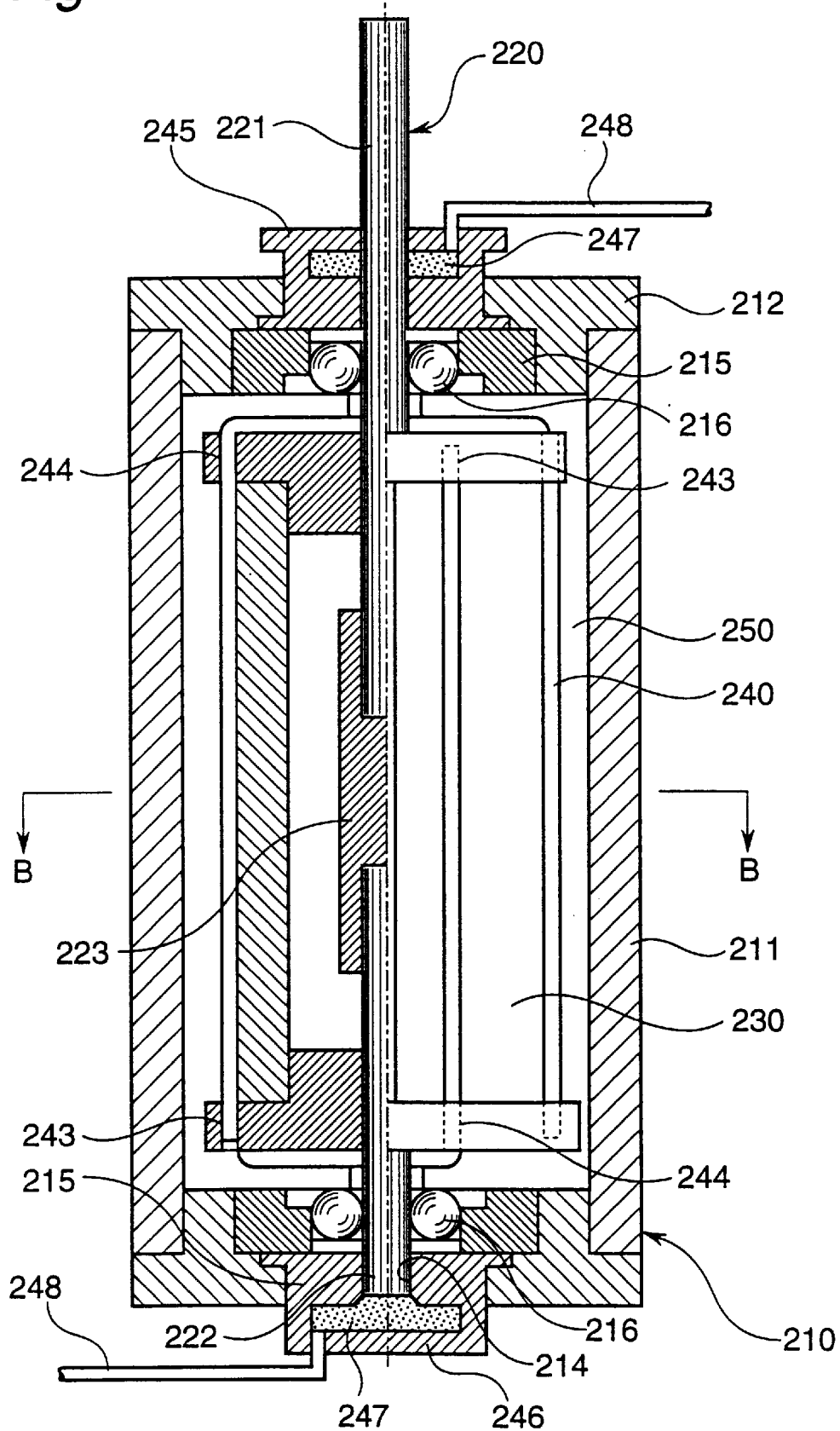
FIG. 11 is a vertical sectional view of the RE type ECF motor.
Figure 12:
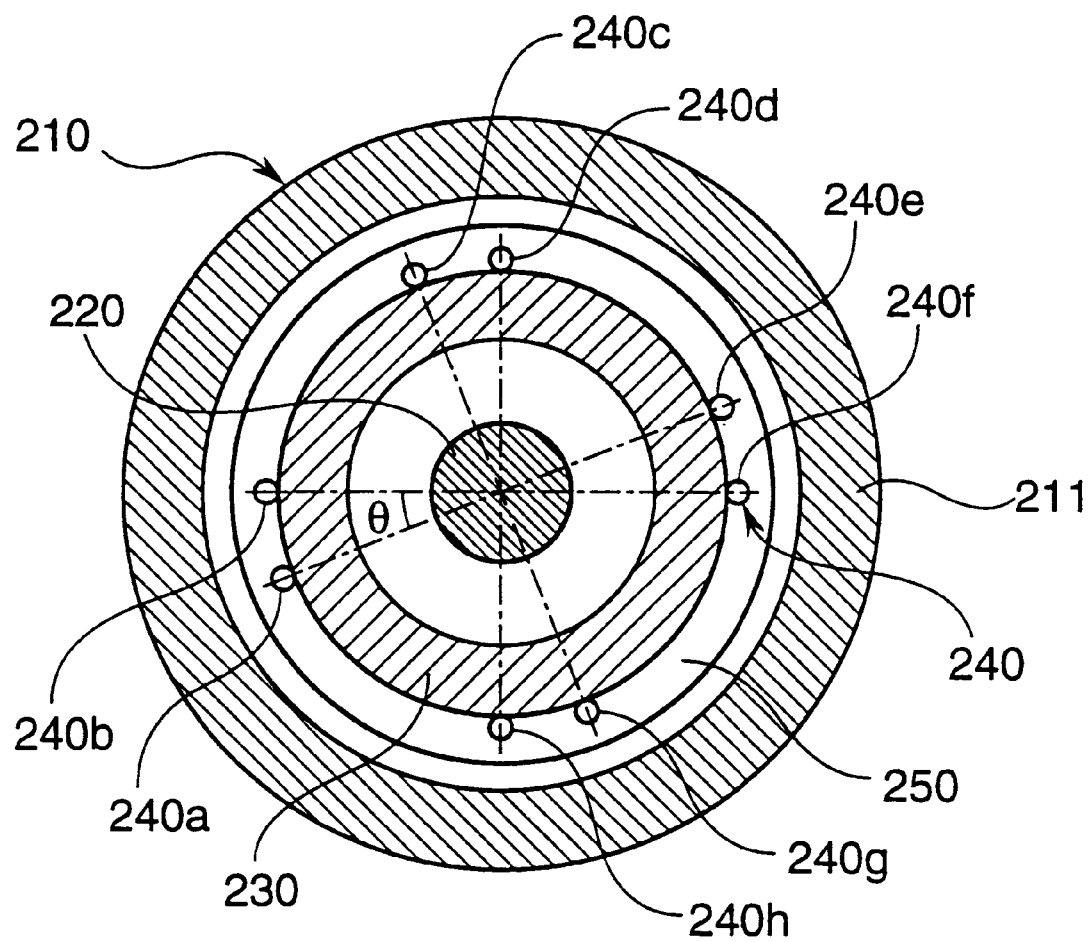
FIG. 12 is a sectional view taken on line A—A of FIG. 11.

FIG. 11 and FIG. 12 are each a schematic sectional view of an embodiment of a RE type ECF motor (rotor-electrode type electro-conjugate fluid motor) that is the second micromotor of the invention.

Referring to FIG. 11 and FIG. 12, the RE type ECF motor includes a housing 210 constituted of a container (bottomed fluid container) 211 to be filled with an electro-sensitive movable fluid 250 and a lid 212 which is engaged with the open top of the fluid container 211 to close the container 211. The lid 212 has a bearing means 216 and is engaged with the open top of the fluid container 211 to constitute a closed housing 210 together with the fluid container 211.

The center of the bottom of the fluid container 211 is provided with a concave bearing section 214 to bear the lower end of a rotating shaft 220. The concave bearing section 214 is provided with a rotational contact point means 246 for electrically connecting an external terminal 248 to electrodes 240a, 240c, 240e, 240g. The rotational contact point means 246 is in contact with the lower part of the rotating shaft 220 (lower rotating shaft 222). The rotational contact point means 246 is filled with mercury 247 and sealed. The mercury 247 is brought into contact with the lower rotating shaft 222. The concave bearing section 214 is provided with a bearing means 216 to reduce friction between the concave bearing section 214 and the lower rotating shaft 222.

The top of the fluid container 211 is made open to introduce the electro-sensitive movable fluid 250 into the container.

After the fluid container 211 is filled with the electro-sensitive movable fluid 250, the lid 212 is engaged with the open top of the fluid container 211 to constitute the closed housing 210.

The center of the lid 212 is provided with an upper bearing section 215 having a shaft hole through which the upper part of the rotating shaft 220 (upper rotating shaft 221) penetrates. The upper bearing section 215 is provided with a rotational contact point means 245 for supplying power to electrodes 240b, 240d, 240f, 240h. In the upper bearing section 215, a bearing means 216 is incorporated to reduce friction to the rotating shaft 220. From the rotational contact point means 245, a conductor is extended outside to form an external terminal 248. Also in the rotational contact point means 245, mercury is filled as a conductive material.

Though the lid 212 is engaged with the fluid container 211 in FIG. 11, the lid 212 can be screwed on the container 211 to close the housing 210 more firmly, or packing or the like can be inserted between the fluid container 211 and the lid 212 to close the housing 210 more firmly.

The rotating shaft 220 is divided into the upper part (upper rotating shaft 221) and the lower part (lower rotating shaft 222) by the cylindrical rotor 230 provided in the fluid container 211. The upper rotating shaft 221 and the lower rotating shaft 222 are electrically insulated from each other by means of an insulating material 223. The upper rotating shaft 221, which penetrates the lid 212, is rotatably borne by the upper bearing section 215 provided on the lid 212, while the lower end of the lower rotating shaft 222 is borne by the concave bearing section 214 provided at the center of the bottom of the fluid container 211. Between the upper rotating shaft 221 and the lower rotating shaft 222, the cylindrical rotor 230 rotatable together with the rotating shaft 220 in the container 211 is arranged. The cylindrical rotor 230 is in the form of a cylinder having the rotating shaft 220 as its center axis of the rotation, and is arranged so that the rotor 230 is not in contact with the inner surface of the fluid container 211 and that a gap is formed between the rotor 230 and the fluid container 211. The ratio of the inner diameter of the fluid container 211 to the diameter of the cylindrical rotor 230 (inner diameter of fluid container 211/diameter of rotor 230) is usually not less than 1.01, preferably 1.05 to 10.0. For example, when the inner diameter of the fluid container 211 is not more than 30 mm and the ratio of the inner diameter of the fluid container 211 to the diameter of the cylindrical rotor 230 is in the range of 1.5 to 3.0, the rotor 230 is miniaturized so that the rotational torque at the same rotational speed can be increased. That is, the efficiency of the RE type ECF motor can be increased by making the motor size smaller.

The shape of the rotor 230 is not limited to a cylindrical one, and various shapes such as a rectangular parallelepiped shape, a shape having a number of protrusions on the surface and a shape having star-like sections are employable according to the intended use. The cylindrical rotor 230 may be hollow. In this case, the hollow portion can be made vacuum or can be filled with air, gas, liquid or solid so that the weight of the rotor is able to be optionally adjusted. By adjusting the weight of the cylindrical rotor 230, the specific gravity of the rotor 230 in the electro-sensitive movable fluid 250 can be adjusted, whereby motion or balance of the rotor 230 can be controlled.

On the surface of the cylindrical rotor 230, electrodes 240a, 240c, 240e and 240g connected to the upper rotating shaft 221 and electrodes 240b, 240d, 240f and 240h connected to the lower rotating shaft 222 are provided. The electrodes 240a, 240c, 240e, 240g and the electrodes 240b, 240d, 240f, 240h can be formed by stretching conductor wires on the surface of the cylindrical rotor 230. The electrodes 240a, 240c, 240e, 240g and the electrodes 240b, 240d, 240f, 240h can be arranged at appropriate positions.

FIG. 11 shows an embodiment of arrangement of the electrodes when the cylindrical rotor 230 is seen from above. The electrodes 240a, 240c, 240e, 240g and the electrodes 240b, 240d, 240f, 240h are arranged in such a manner that the interval angle θ between the electrodes is usually 1.0° to 180°, preferably 3.0° to 90.0°. The interval angle θ varies depending on the number of the electrodes arranged. Therefore, in order to set the interval angle θ within the above range, the number of the electrodes 240a–240h is 2 to 120.

In FIG. 11 and FIG. 12, the electrode is extended from the electrode fixing hole 244 onto the surface of the cylindrical rotor 230, and the tip of the electrode is inserted into the electrode fixing hole 243 and is fixed therein.

The housing 210 having the above structure is filled with the electro-sensitive movable fluid 250.

FIG. 11 and FIG. 12 show an embodiment of the RE type ECF motor wherein the cylindrical rotor 230 formed from a tubular material is arranged in the housing 210. The cylindrical rotor 230 is provided with a rotating shaft 220 made of, for example, a metal bar.

A positive terminal and a negative terminal of a direct-current power source are connected to external terminals 248, 248 in such a manner that a direct-current-voltage can be applied between the electrodes 240a, 240c, 240e, 240g and the electrodes 240b, 240d, 240f, 240h of the RE type ECF motor. In this case, any one group of the electrodes 240a, 240c, 240e, 240g and the electrodes 240b, 240d, 240f, 240h is set to be positive and the other is set to be negative. It is appropriately determined. Upon application of a direct-current-voltage, the electro-sensitive movable fluid 250 begins to flow, and with the flow (jet flow) of the electro-sensitive movable fluid 250, the cylindrical rotor 230 begins to rotate. The current given by application of the direct-current-voltage is very small and is usually not more than 0.5 mA, in many cases not more than 20 μA, because the electro-sensitive movable fluid is substantially non-conductive.

Figure 13:
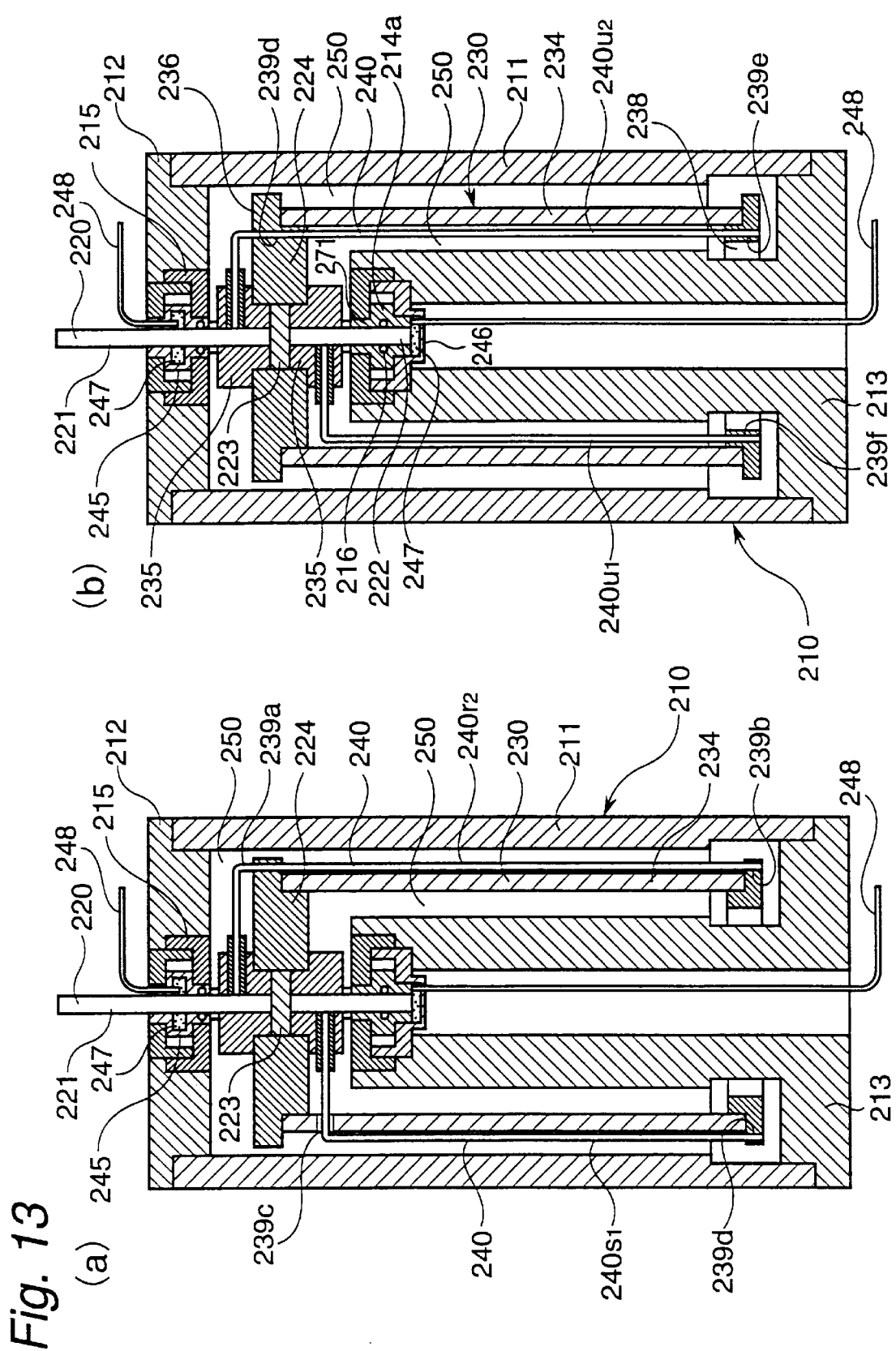
FIG. 13($a$) is a vertical sectional view of the cup type ECF motor, taken on line C—C of FIG. 14, and FIG. 13($b$) is a vertical sectional view of the cup type ECF motor, taken on line D—D of FIG. 14.
Figure 14:
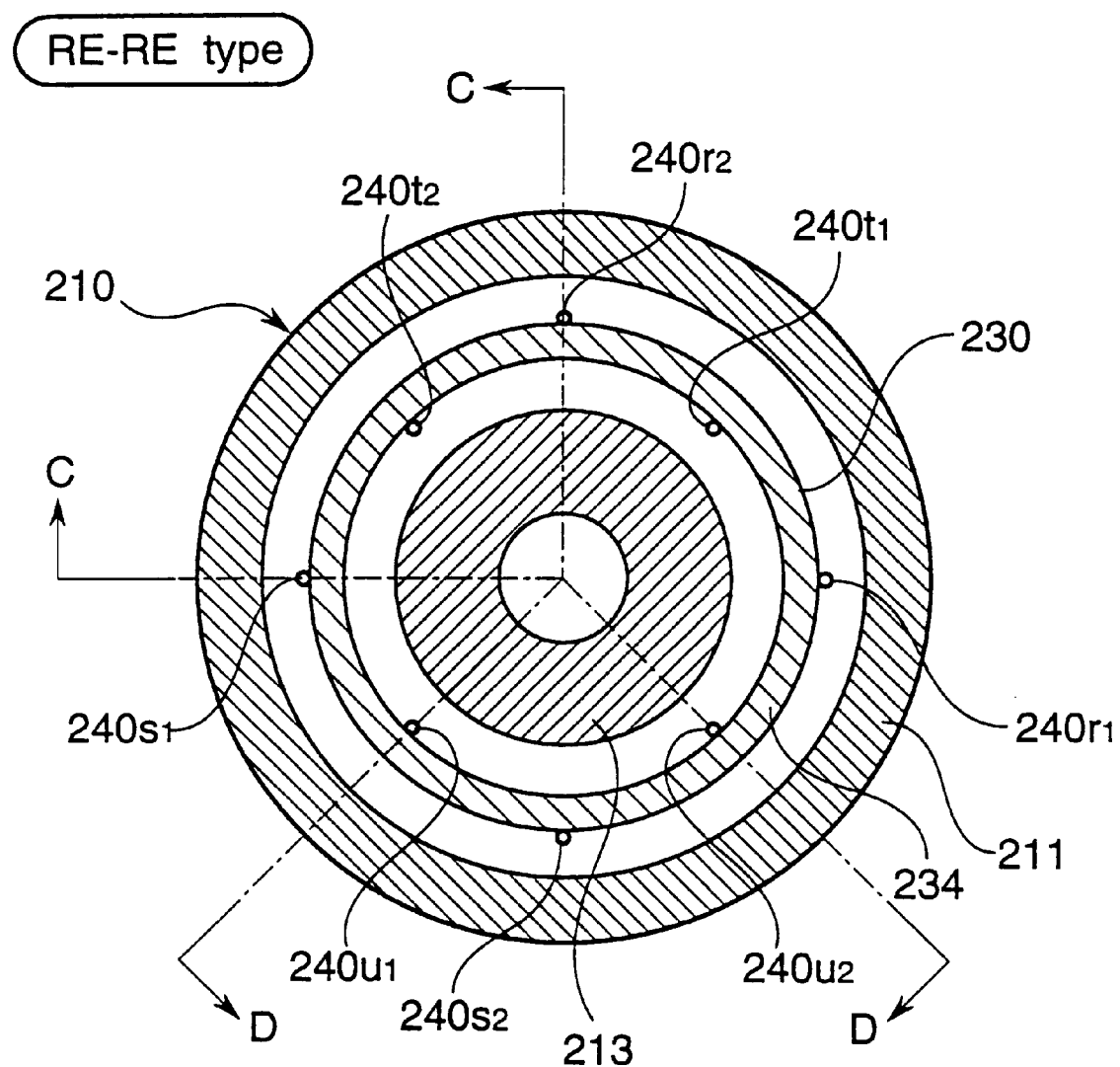
FIG. 14 is a transverse sectional view of the cup type ECF motor (RE-RE type).

FIGS. 13(a), 13(b), 14, 15, 16 and 17 are each a schematic sectional view showing an embodiment of a cup type ECF motor that is the third micromotor of the invention. FIG. 13(a) is a schematic sectional view taken on line C—C of FIG. 14, and FIG. 13(b) is a schematic sectional view taken on line D—D of FIG. 14.

Referring to FIGS. 13(a), 13(b) and 14, the cup type ECF motor includes a housing 210 to be filled with an electro-sensitive movable fluid 250 and a cup rotor 230 which is rotatably fitted to the housing 210. The housing 210 is constituted of a fluid container 211 and a lid 212. The fluid container 211 has a bottom 213 protruding upward inside the cup rotor 230. In the housing 210, the cup rotor 230, which covers the protruded bottom 213 and is not in contact therewith, is rotatably fitted to the housing 210 through a rotating shaft 220. On the outer surface and the inner surface of the cup rotor 230, electrodes 240, 240 are provided so that they are brought into contact with the electro-sensitive movable fluid 250 to be filled in the housing 210.

The fluid container 211 is constituted of a cylindrical body to form a side wall of the housing 210 and the bottom 213. The bottom 213 functions to close the cylindrical body, and the central portion of the bottom 213 protrudes upward. The upper end of the protruded bottom is provided with a lower bearing section 214a. By the lower bearing section 214a, a lower part of the rotating shaft 220 (lower rotating shaft 222) is rotatably borne. The lower bearing section 214a is provided with a rotational contact point means 246 which is filled with mercury 247 as a conductive material. The rotational contact point means 246 is in contact with the lower rotating shaft 222. From the rotational contact point means 246, a conductor 248 for supplying power from the outside power supply is extended. The lower bearing section 214a is provided with a bearing means 216 to reduce friction between the rotating shaft 220 and the lower bearing section 214a.

The top of the fluid container 211 is made open, and the lid 212 is engaged with the open top to close the housing 210. The center of the lid 212 is provided with an upper bearing section 215. By the upper bearing section 215, an upper part of the rotating shaft 220 (upper rotating shaft 221) is rotatably borne. The upper bearing section 215 is provided with a rotational contact point means 245 which is filled with mercury 247 as a conductive material. From the rotational contact point means 245, a conductor 248 for supplying power from the outside power supply is extended. The upper bearing section 215 is provided with a bearing means 216 to reduce friction between the rotating shaft 220 and the upper bearing section 215.

The rotating shaft 220 is composed of the upper rotating shaft 221 and the lower rotating shaft 222 which are electrically insulated from each other by means of an insulating material 223. To the upper rotating shaft 221, power can be supplied from the outside power source through the rotational contact point means 245 provided on the lid 212, while to the lower rotational shaft 222, power can be supplied from the outside power source through the rotational contact point means 246 provided on the lower bearing section 214a.

The cup rotor 230 includes a rotor cylindrical body 234 with open bottom and a rotor lid 235. The rotor lid 235 serves to engage the rotor cylindrical body 234 with the rotating shaft 220 and functions as a conductor unit which is joined to the upper rotating shaft 221 and the lower rotating shaft 222 separately to supply power to electrodes 240. On the outer surface of the rotor cylindrical body 234, external first electrodes 240r2—connected electrically to the upper rotating shaft 221 and external second electrodes 240s1—connected electrically to the lower rotating shaft 222 are provided. On the inner surface of the rotor cylindrical body 234, internal first electrodes 240u2—connected electrically to the upper rotating shaft 221 and internal second electrodes 240u1—connected electrically to the lower rotating shaft 222 are provided. In other words, the external first electrode 240r2 is connected to the upper rotating shaft 221, passes through the electrode fixing hole 239a provided at the rim of the rotor lid 235, then is extended vertically on the outer surface of the rotor cylindrical body 234, and the tip thereof is inserted into the electrode fixing hole 239b provided at the lower rim of the rotor cylindrical body 234 and is fixed therein. The external second electrode 240s1 is connected to the lower rotating shaft 222, passes through the electrode fixing hole 239c provided near the upper end of the rotor cylindrical body 234, then is extended vertically on the outer surface of the rotor cylindrical body 234, and the tip thereof is inserted into the electrode fixing hole 239d provided at the lower rim of the rotor cylindrical body 234 and is fixed therein. On the other hand, the internal first electrode 240u2 is connected to the upper rotating shaft 221, passes through the electrode fixing hole 239d provided in the rotor lid 235, then is extended vertically on the inner surface of the rotor cylindrical body 234, and the tip thereof is inserted into the electrode fixing hole 239e provided at the lower rim of the rotor cylindrical body 234 and is fixed therein. The internal second electrode 240u1 is connected to the lower rotating shaft 222, then is extended downward on the inner surface of the rotor cylindrical body 234, and the tip thereof is inserted into the electrode fixing hole 239f provided at the lower end of the rotor cylindrical body 234 and is fixed therein.

Accordingly, the external first electrodes 240r2—and the internal first electrodes 240u2—have the same polarity, and the external second electrodes 240s1—and the internal second electrodes 240u1—have the same polarity. The external electrodes are arranged in the circumferential direction and generally in such a manner that a positive electrode and a negative electrode are alternately positioned. The internal electrodes are arranged in the circumferential direction and generally in such a manner that a positive electrode and a negative electrode are alternately positioned.

In the fluid container 211 having the cup rotor 230 therein, the electro-sensitive movable fluid 250 is contained in at least such an amount that the cup rotor is immersed in the fluid, and the fluid container 211 is closed with the lid 212. Then, the conductors 248, 248 are connected to the outside power source, and a direct-current-voltage is applied. As a result, a jet flow of the electro-sensitive movable fluid 250 is produced, and thereby the cup rotor is rotated.

The cup type ECF motor (third micromotor of the invention) is described above with reference to the cup type ECF motor of RE-RE type wherein both of the inner surface and the outer surface of the rotor cylindrical body 234 are provided with electrodes, and this cup type ECF motor is a complex one of the aforesaid SE type ECF motor and RE type ECF motor. With respect to the position of the electrodes arranged, the cup type ECF motor is divided into the following four types.

RE-RE Complex Type

As shown in FIG. 13 and FIG. 14, electrodes are provided on the inner wall surface and the outer wall surface of the cup rotor.

SE-SE Complex Type

Figure 15:
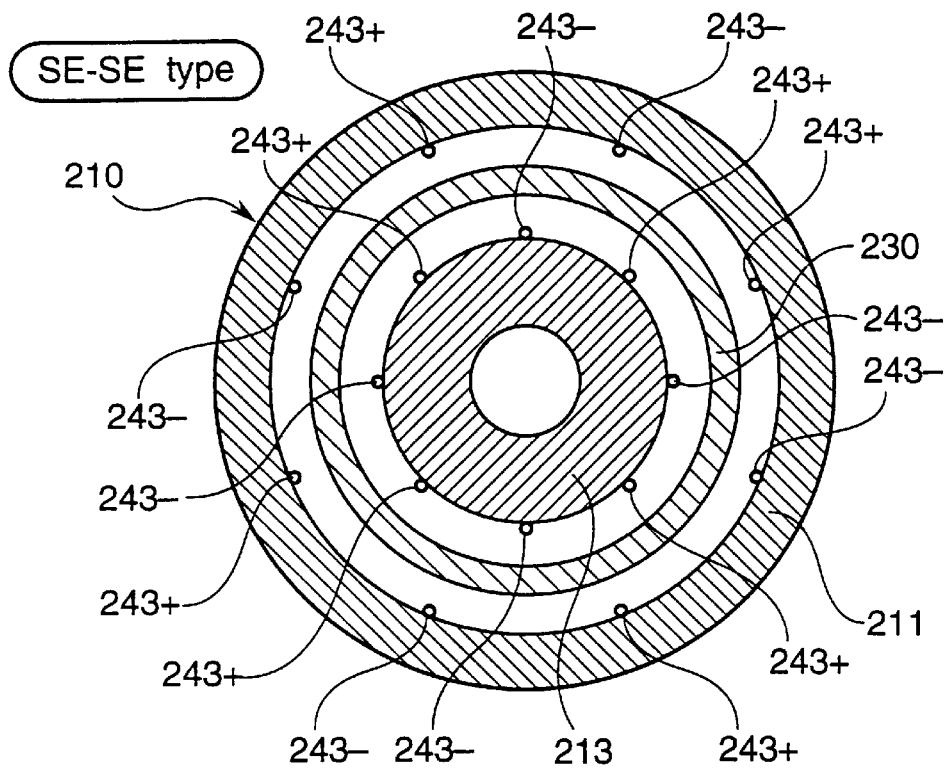
FIG. 15 is a schematic sectional view showing an embodiment of arrangement of the electrodes in the cup type ECF motor of SE-SE type.

As shown in FIG. 15, fixed electrodes are provided on the inner surface of the housing so as to be brought into contact with the electro-sensitive movable fluid present outside the cup rotor, and fixed electrodes are provided on the protruded bottom so as to be brought into contact with the electro-sensitive movable fluid present inside the cup rotor.

RE-SE Complex Type

Figure 16:
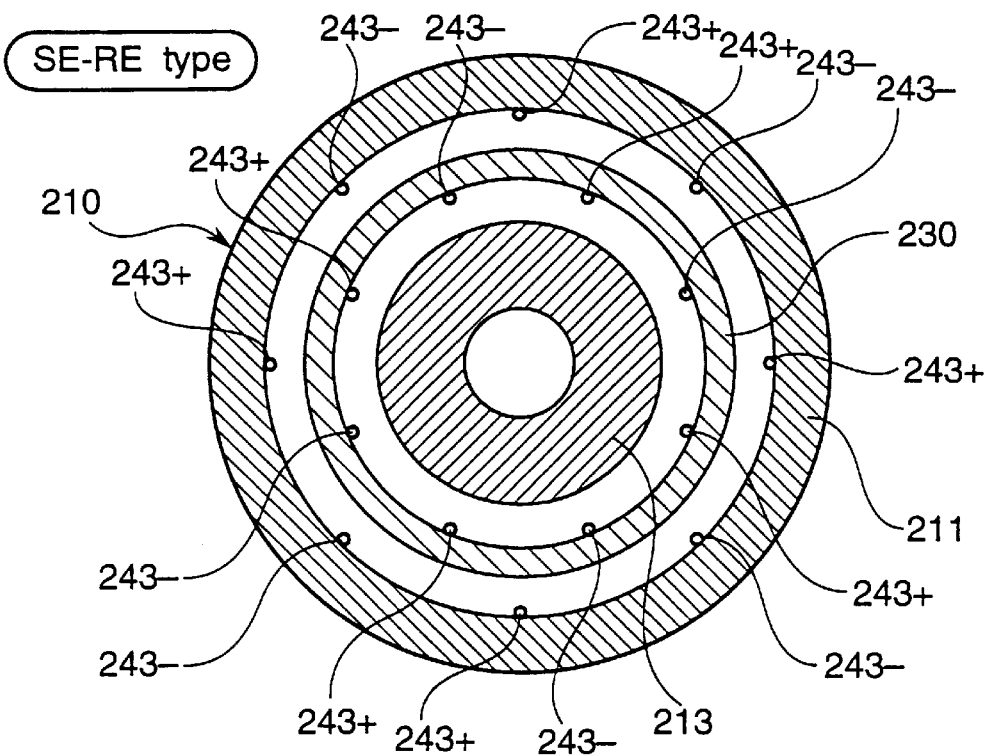
FIG. 16 is a schematic sectional view showing an embodiment of arrangement of the electrodes in the cup type ECF motor of SE-RE type.

As shown in FIG. 16, RE electrodes are provided on the outer wall surface of the cup rotor, and fixed electrodes are provided on the protruded bottom so as to be brought into contact with the electro-sensitive movable fluid present inside the cup rotor.

SE-RE Complex Type

Figure 17:
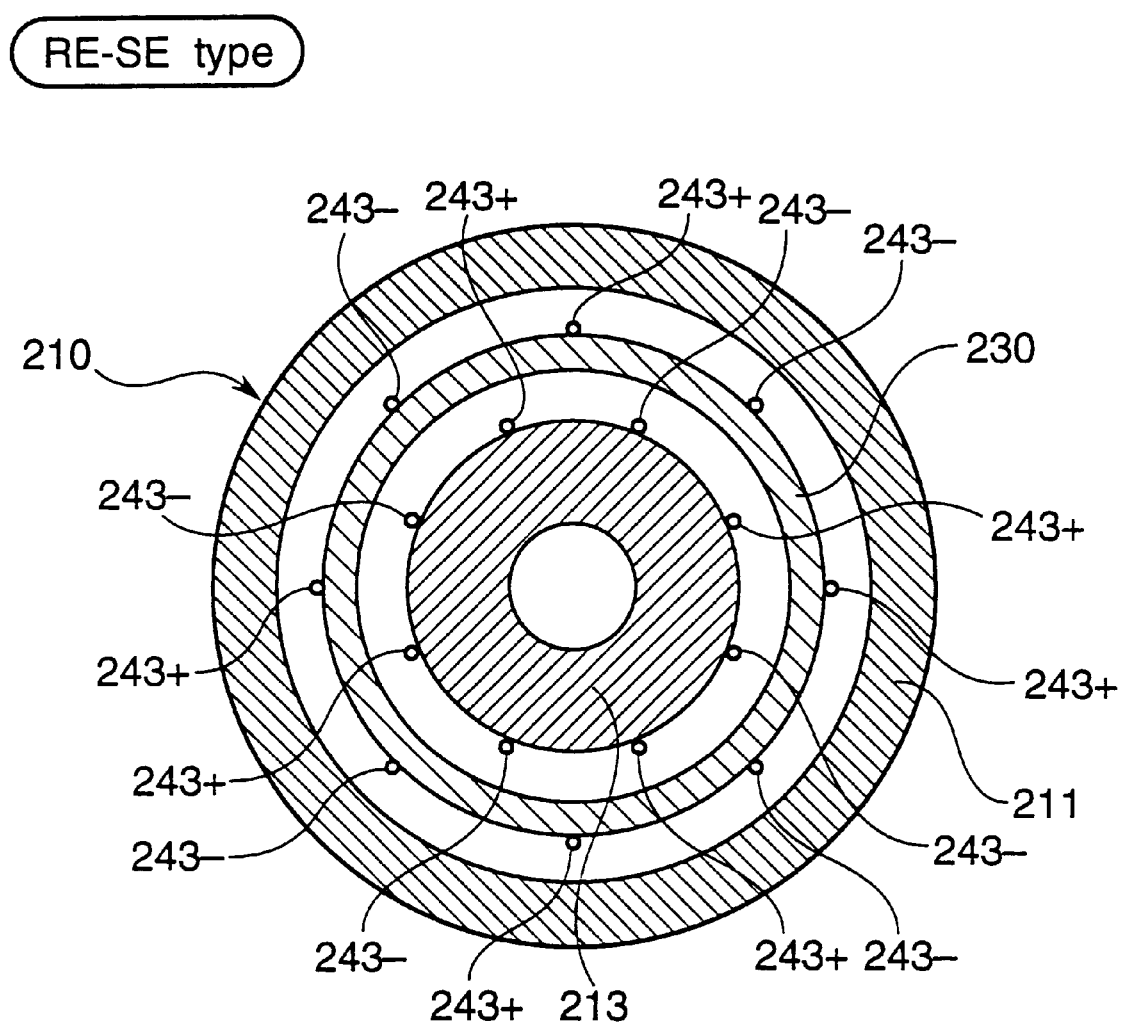
FIG. 17 is a schematic sectional view showing an embodiment of arrangement of the electrodes in the cup type ECF motor of RE-SE type.

As shown in FIG. 17, fixed electrodes are provided on the inner surface of the housing so as to be brought into contact with the electro-sensitive movable fluid present outside the cup rotor, and RE electrodes are provided on the inner wall surface of the cup rotor.

In FIGS. 15 to 17, like elements are given like reference numerals. In FIG. 15 to 17, the electrodes are indicated by numeral 243, and symbols "+" and "−" mean positive electrode and negative electrode, respectively. The arrangements of the electrodes described above are only embodiments, and the present invention is not limited to those arrangements.

The above-mentioned SE type ECF motor, RE type ECF motor and cup type ECF motor are only embodiments of the invention. The micromotor of the invention can be variously modified.

As the size of the micromotor of the invention is smaller, the output power density becomes higher.

Next, the linear motor according to the invention is described.

In the linear motor of the invention, the aforesaid electro-sensitive movable fluid is used.

Figure 20:
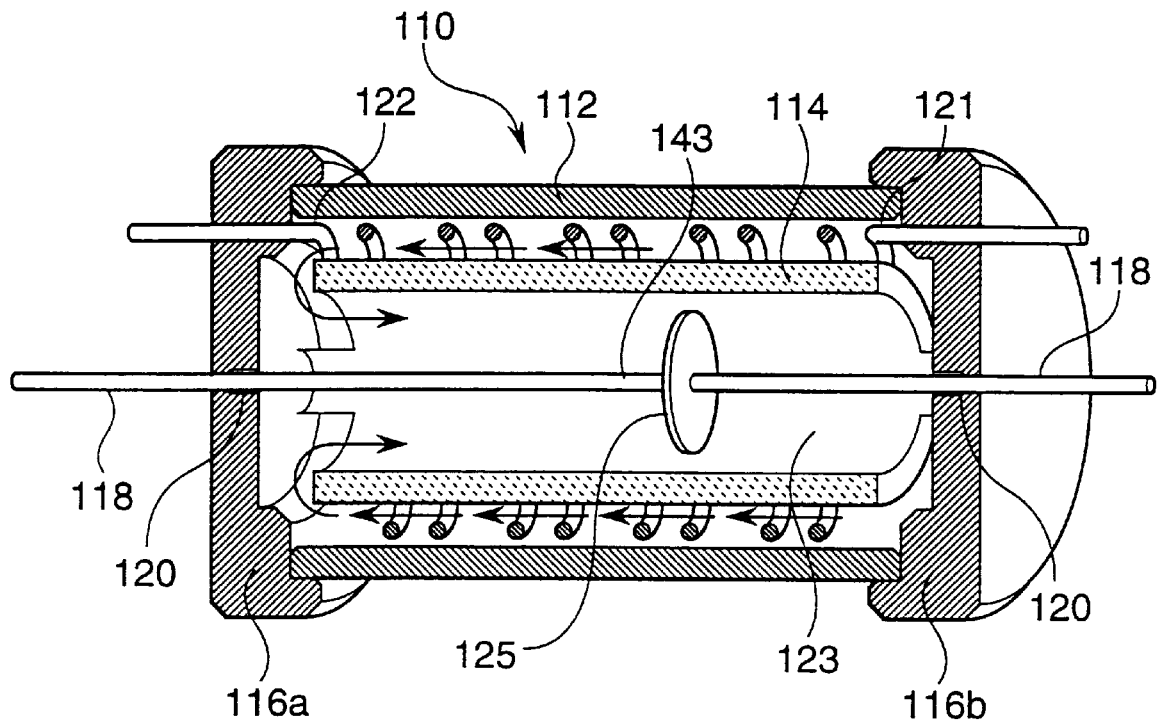
FIG. 20 is a vertical sectional view showing an embodiment of the SE type ECF linear motor of the invention.
Figure 21:
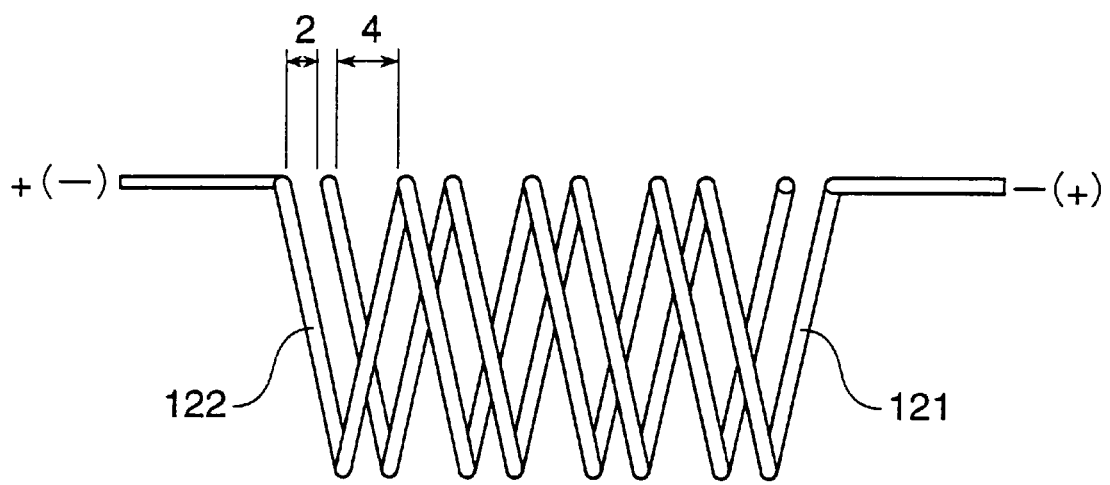
FIG. 21 is a view showing an embodiment of coil electrodes used in the SE type ECF linear motor.

FIG. 20 schematically shows a section of the SE type ECF linear motor of the invention. FIG. 21 schematically shows an embodiment of coil electrodes used in the SE type ECF linear motor.

In the SE type ECF linear motor of the invention, electrodes are arranged in such a manner that an ununiform electric field is formed in the electro-sensitive movable fluid. Upon application of a voltage, a jet flow of the electro-sensitive movable fluid is produced, and the jet flow is received by a moving member (piston) and is taken out as a linear motion.

The SE type ECF linear motor includes a fluid container 110 consisting of an outer cylinder 112 and an inner cylinder 114 provided in the outer cylinder 112. The outer cylinder 112 has lids 116a, 116b at both ends, and the center of each lid 116a, 116b is provided with a shaft hole 120 through which a driving shaft 118 penetrates. Between both ends of the inner cylinder 112 and the inner surfaces of the lids 116a, 116b, a gap is formed so that the electro-sensitive movable fluid is able to flow therein.

Coil electrodes 121, 122 shown in FIG. 21 are provided between the outer cylinder 112 and the inner cylinder 114. The coil electrodes 121, 122 are wound around the inner cylinder 114, and these electrodes 121, 121 are insulated from each other. The coil electrodes 121, 122 are arranged in such a manner that an ununiform electric field can be formed in the electro-sensitive movable fluid 123. For forming an ununiform electric field in the electro-sensitive movable fluid 123, it is advantageous that the coil electrodes are arranged ununiformly, that is, as shown in FIG. 21, one electrode 121 and one electrode 122 are arranged at a short distance to give a pair, and the distance between one pair and the next pair is made long. In FIG. 21, the distance between the pair of electrodes is 2 mm, and the distance between the electrodes which do not give a pair is 4 mm, whereby an ununiform electric field is formed in the electro-sensitive movable fluid. One end of each electrode thus arranged is extended out of the fluid container 110 so that a voltage can be applied from the outside.

A moving member (piston) 125 is fixed to almost the center of a driving shaft 118, and the moving member 125 receives a jet flow of the electro-sensitive movable fluid 12 and is moved horizontally together with the driving shaft 118 in the inner cylinder 114.

If the electrode 121 and the electrode 122 are set to be positive and negative, respectively, and if dibutyl decanedioate is used as the electro-sensitive movable fluid 123, the electro-sensitive movable fluid 123 between the outer cylinder 112 and the inner cylinder 114 forms a jet flow in the direction of the arrow (in the left direction). Since a gap wherein the electro-sensitive movable fluid 123 is able to flow is formed between the inner cylinder 114 and the lid 116a, the electro-sensitive movable fluid 123 flowing in the left direction between the outer cylinder 112 and the inner cylinder 114 is changed in its direction by the lid 116a and then flows in the right direction in the inner cylinder 114, to thereby move the moving member 125 in the right direction.

Then, the electrode 121 and the electrode 122 are set to be negative and positive, respectively. The electro-sensitive movable fluid 123 flows in the right direction between the outer cylinder 112 and the inner cylinder 114, then the fluid 123 is changed in its direction by the lid 116b and flows in the left direction in the inner cylinder 114, to thereby move the moving member 125 in the left direction.

By the repetition of the above operations, the SE type ECF linear motor of the invention is linearly driven.

Figure 22:
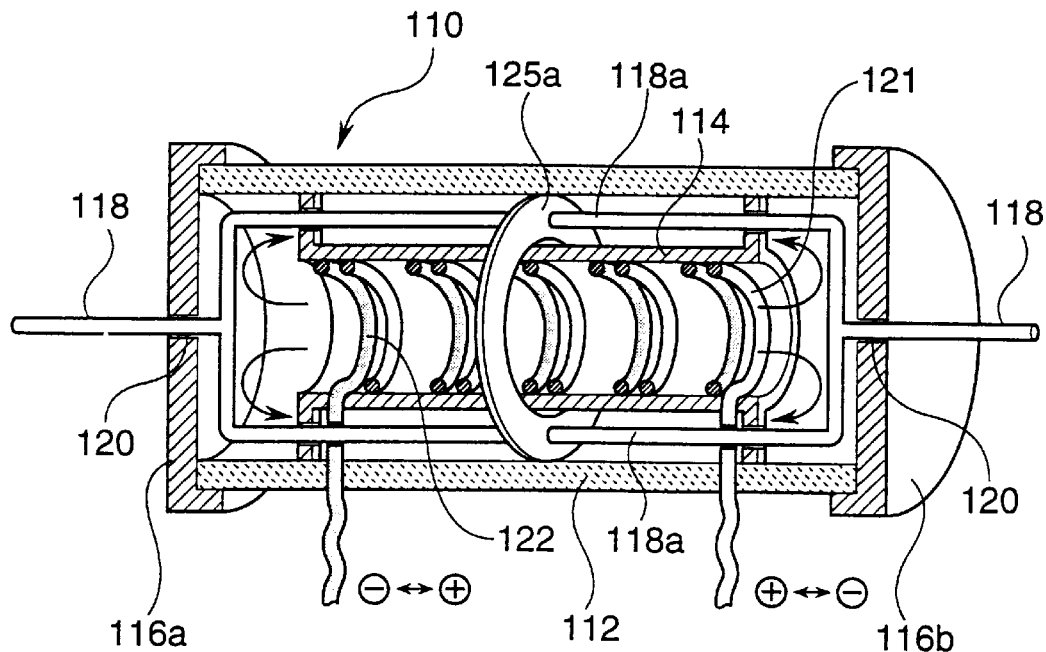
FIG. 22 is a sectional view showing another embodiment of the SE type ECF linear motor.

In the SE type ECF linear motor, positions of the coil electrodes and the moving member can be reversed as shown in FIG. 22.

In the SE type ECF linear motor shown in FIG. 22, a fluid container 110 is constituted of an outer cylinder 12, an inner cylinder 114, and lids 116a, a lid 116b. On the inner surface of the inner cylinder 114, coil electrodes 121, 122 are provided. Between the inner cylinder 113 and the outer cylinder 112, a ring moving member 125a is arranged, and the ring moving member 125a is supported by auxiliary driving shafts 118a, 118a branched from a driving shaft 118.

In the SE type ECF linear motors shown in FIG. 22 and FIG. 20, like elements are given like reference numerals.

The SE type ECF linear motor shown in FIG. 22 is filled with the electro-sensitive movable fluid 123 such as dibutyl decanedioate, and a direct-current-voltage is applied between the coil electrode 121 as a positive electrode and the coil electrode 122 as a negative electrode. As a result, a jet flow of the electro-sensitive movable fluid 123 in the direction of right to left is produced in the inner cylinder 114. The jet flow impinges upon the lid 116a, is changed in its direction, and enters into the gap between the outer cylinder 112 and the inner cylinder 114, whereby the ring moving member 125a is moved in the right direction. The motion of the ring moving member 125a is transferred to the driving shaft 118 through the auxiliary driving shafts 118a, 118a, and thereby the driving shaft 118 is moved in the right direction.

If the polarities of the coil electrodes are reversed, a jet flow of the electro-sensitive movable fluid 123 in the opposite direction is produced, and the ring moving member 125a is moved in the left direction. As a result, the driving shaft 118 is moved in the left direction.

The linear motor of the invention may be a PE type ECF linear motor not using the coil electrodes but using a pair of moving members as electrodes. In this case, a jet flow of the electro-sensitive movable fluid is produced between the pair of moving members, and by virtue of the reaction of the jet flow, the PE type ECF linear motor is driven.

Figure 23:
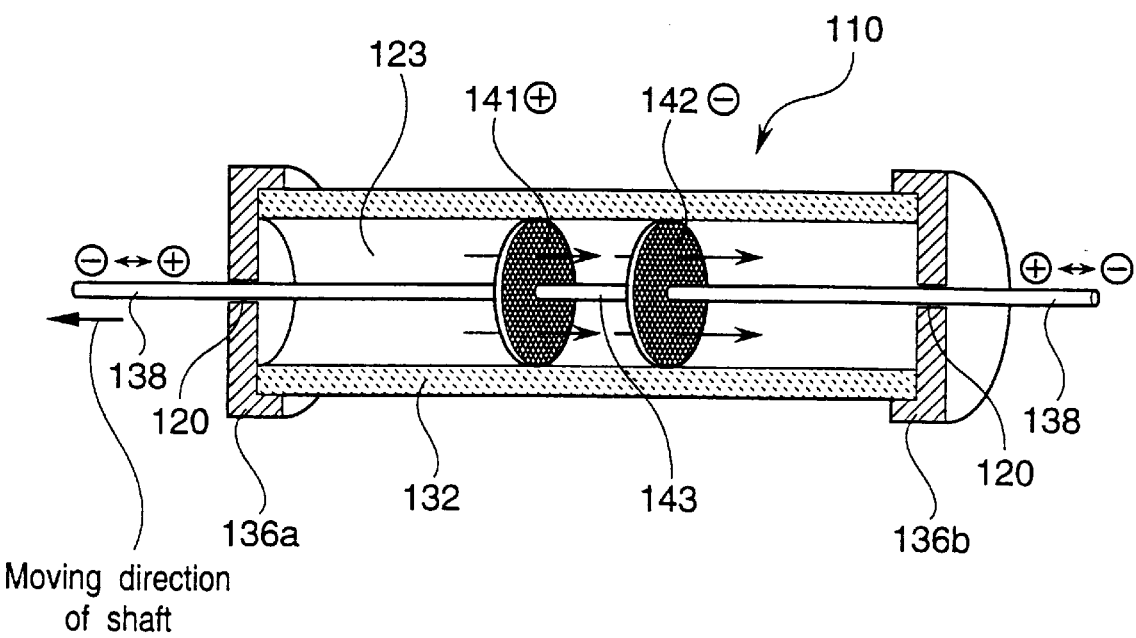
FIG. 23 is a sectional view showing an embodiment of the PE type ECF linear motor.

FIG. 23 shows an embodiment of the PE type ECF linear motor.

As shown in FIG. 23, the PE type ECF linear motor includes a cylinder 132 for constituting a fluid container 110 and lids 136a, 136b which are engaged with both ends of the cylinder 132 to close the cylinder 132. The center of each lid 116a, 116b is provided with a shaft hole 120 through which a driving shaft 118 penetrates and is horizontally moved. To the driving shaft 118, a pair of moving members 141, 142 through which the electro-sensitive movable fluid is able to pass are fixed in the vicinity of the center of the driving shaft. In FIG. 23, the pair of moving members 141, 142 (electrodes) through which the electro-sensitive movable fluid is able to pass are made of metal wire cloth. Between the pair of moving members 141, 142, an insulating member 143 is arranged, so that the moving members 141, 142 are insulated from each other.

When the electro-sensitive movable fluid 123 such as dibutyl decanedioate is subjected to an ununiform electric field, a jet flow of the movable fluid is produced in the direction of a positive electrode to a negative electrode.

In FIG. 23, the driving shaft 138 is connected to an external terminal (not shown), and the moving member 141 and the moving member 142 are set to be a positive electrode and a negative electrode, respectively. As a result, a jet flow of the electro-sensitive movable fluid 123 is produced in the direction of the moving member 141 to the moving member 142. In the PE type ECF linear motor shown in FIG. 23, the electro-sensitive movable fluid 123 is able to pass through the moving members 141, 142, so that the moving members 141, 142 are moved in the opposite direction to the direction of the jet flow by virtue of the reaction of the jet flow produced upon application of a voltage. When the moving member 141 and the moving member 142 in FIG. 23 are a positive electrode and a negative electrode, respectively, the moving members 141, 142 are moved in the left direction. Since the moving members 141, 142 are fixed to the driving shaft 138, the driving shaft 138 is driven in the left direction with the motion of the moving members 141, 142.

There is no specific limitation on the shape, etc. of the moving members 141, 142 serving as electrodes and as driving source of the PE type ECF linear motor, as far as the moving members can be moved by the reaction of the jet flow of the electro-sensitive movable fluid 123 produced upon application of a voltage. For example, a mesh moving member made of metal wire cloth shown in FIG. 23, a nozzle moving member and a ring moving member are available. As the mesh moving member, metal wire cloth having a mesh size of 0.05 to 5.0 mm, preferably 0.3 to 2.0 mm, is desirable.

The linear motor of the invention may be a complex type of the SE type ECF linear motor shown in FIG. 20 and the PE type ECF linear motor shown in FIG. 23. The linear motor of complex type is referred to as "CE type ECF linear motor" hereinafter.

Figure 24:
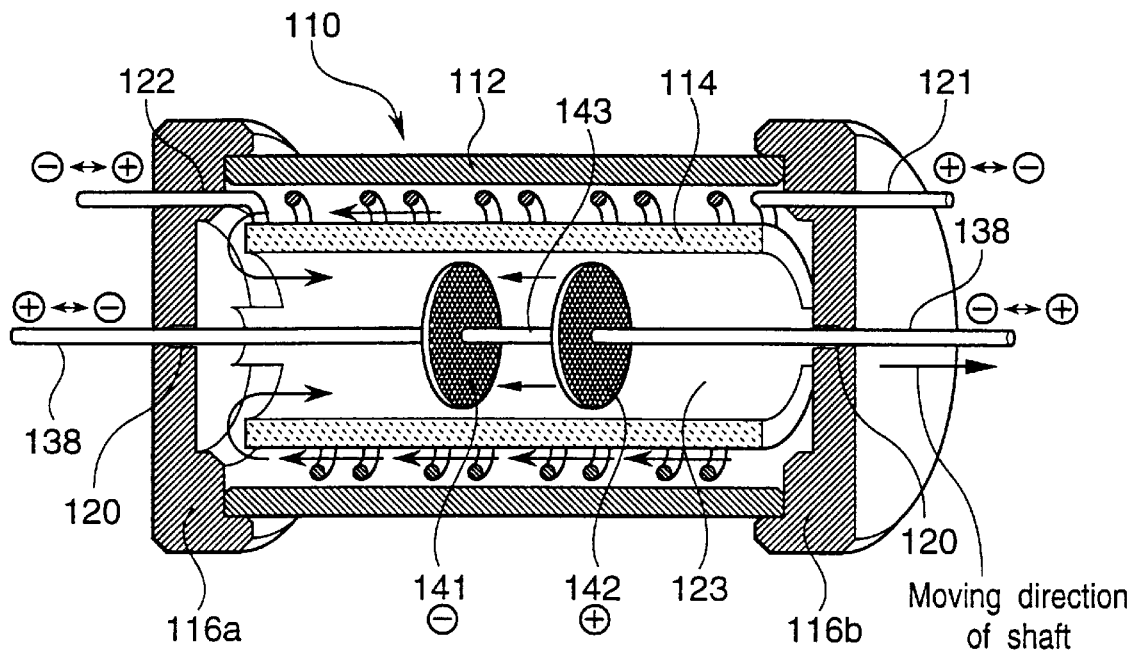
FIG. 24 is a sectional view showing an embodiment of the CE type ECF linear motor.

FIG. 24 shows an embodiment of the CE type ECF linear motor.

The CE type ECF linear motor shown in FIG. 24 has a fluid container 110 similarly to the SE type ECF linear motor shown in FIG. 20. The fluid container 110 is constituted of an outer cylinder 112, an inner cylinder 114 arranged in the outer cylinder 112, and lids 116a, 116b engaged with both ends of the outer cylinder 112. The center of each lid 116a, 116b is provided with a shaft hole 120 through which a driving shaft 118 penetrates. Between both ends of the inner cylinder 112 and the inner surfaces of the lids 116a, 116b, a gap is formed so that the electro-sensitive movable fluid is able to flow therein.

Coil electrodes 121, 122 shown in FIG. 21 are provided between the outer cylinder 112 and the inner cylinder 114 in such a manner that an ununiform electric field is formed in the electro-sensitive movable fluid 123. By virtue of the coil electrodes 121, 122, a jet flow of the electro-sensitive movable fluid 123 is produced between the outer cylinder 122 and the inner cylinder 124. In FIG. 24, the electrode 121 is a positive electrode and the electrode 122 is a negative electrode, so that the electro-sensitive movable fluid 123 such as dibutyl decanedioate forms a jet flow in the left direction between the outer cylinder 112 and the inner cylinder 114. The electro-sensitive movable fluid 123 which flows in the left direction between the outer cylinder 112 and the inner cylinder 114 is changed in its direction by the lid 116a and then flows in the right direction in the inner cylinder 114.

To the driving shaft 118, a pair of moving members 141, 142 (electrodes) are fixed in the vicinity of the center of the driving shaft. In FIG. 24, the pair of moving members 141 and 142 through which the electro-sensitive movable fluid is able to pass are made of metal wire cloth. Between the pair of moving members 141, 142, an insulating member 143 is arranged, so that the moving members 141, 142 are insulated from each other.

When a direct-current-voltage is applied to the driving shaft 138 in such a manner that the moving member 142 becomes a positive electrode and the moving member 141 becomes a negative electrode, a jet flow of the electro-sensitive movable fluid 123 is produced in the inner cylinder 114. By virtue of the reaction of the jet flow, the moving members 141, 142 are moved in the right direction. At the same time, the jet flow of the electro-sensitive movable fluid produced between the outer cylinder and the inner cylinder is introduced into the inner cylinder and moves the moving members 141, 142 in the right direction.

When the polarities of the electrodes are reversed, the moving members 141, 142 are moved in the left direction.

The linear motor of the invention is advantageous in miniaturization and is not specifically limited in its size. The linear motor of the invention has a diameter of usually not more than 60 mm, preferably not more than 30 mm, and a length of usually not more than 300 mm, preferably not more than 100 mm. From the studies of the rotary type motors using the electro-sensitive movable fluid, it has been confirmed that the liner motor of the invention can be driven with much higher efficiency by making the size smaller.

There is no specific limitation on the material for producing the linear motor of the invention. Examples of the materials for the fluid container and the moving member include synthetic resins (e.g., teflon, polycarbonate, acrylic resin), ceramics, woods, metals and glasses. If these members are formed from a metal, the surface of the metal members may be subjected to insulating treatment if desired. The electrodes can be formed from conductive metal wires or the like. The electrodes may be formed by plating used for printed board wiring.

The linear motor of the invention can be made to undergo reciprocating motion by changing the applied voltage. In the case where an external force is given to the moving member (piston), the linear motor can be used as a shock absorber to relax the external force by applying a voltage in such a manner that the piston is moved to resist the external force. The linear motor can be variously modified.

Figure 26:
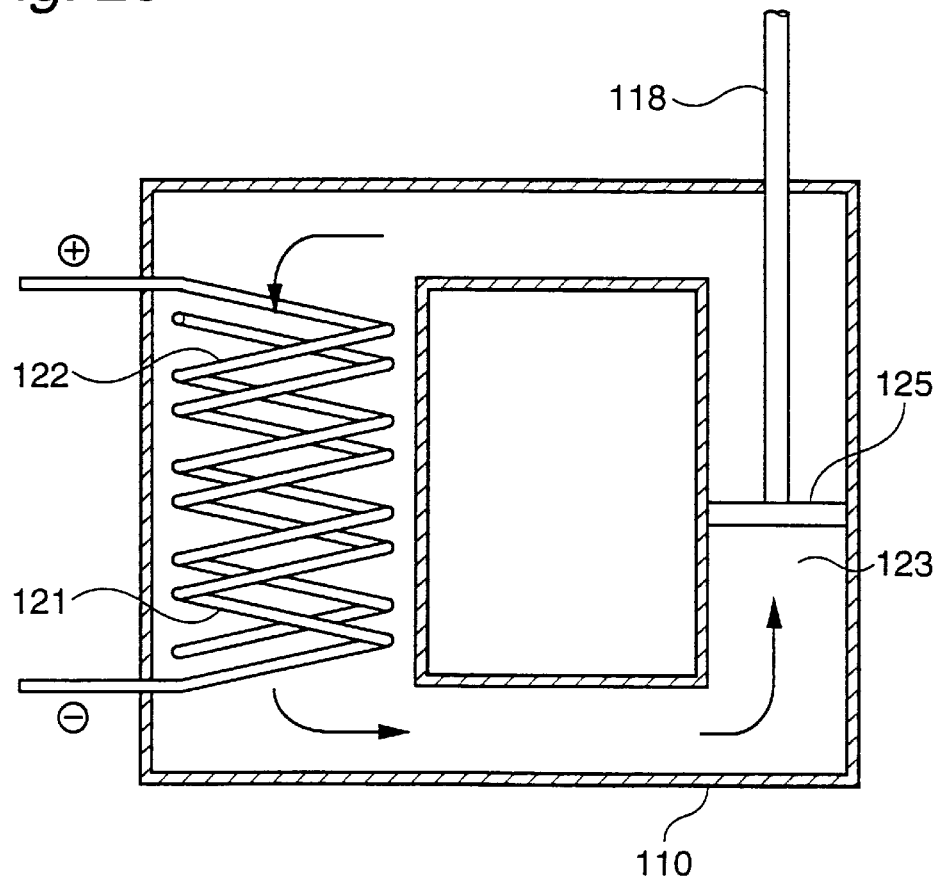
FIG. 26 is a view showing another embodiment of the linear motor of the invention.

In FIG. 26, the fluid container 110 is in the form of a loop, and the loop fluid container 110 is provided with electrodes 121, 122. When a voltage is applied between the electrodes 121, 122 to produce a circulating flow of the electro-sensitive movable fluid 123, the circulating flow of the movable fluid 123 is received by a moving member 125, whereby the moving member 125 is moved upward. On one surface of the moving member 125, a driving shaft 118 is provided, so that the driving shaft 118 is vertically driven with the motion of the moving member 125.

The micromotor and the linear motor according to the invention are driven by filling an electro-sensitive movable fluid in a fluid container and applying a direct-current-voltage of usually 50 V to 15 kV, preferably 100 V to 10 kV, more preferably 100 V to 6 kV. The current given by application of a voltage is usually not more than 100 $\mu$A, preferably 0.1 to 50 $\mu$A, particularly preferably 0.5 to 10 $\mu$A, so that the power consumption is extremely small. Further, since the current is extremely small, heat is hardly generated from the micromotor or the linear motor. Furthermore, since the micromotor and the linear motor do not utilize magnetic force or magnetic field but utilize a jet flow of the electro-sensitive movable fluid produced in an electric field, they are normally driven even in a strong magnetic field and generate none of magnetism, driving noise and electromagnetic noise.

Next, the micropump according to the invention is described.

The micropump of the invention has at least two electrodes. These electrodes are arranged in such a manner that an electro-sensitive movable fluid flows in the direction of one electrode to the other electrode. That is, the electrodes (jet flow-producing electrodes) are arranged in such a manner that an ununiform electric field can be formed in the electro-sensitive movable fluid. The ununiform electric field can be formed by arranging the jet flow-producing electrodes, for example, in the following manner.

Figure 27:
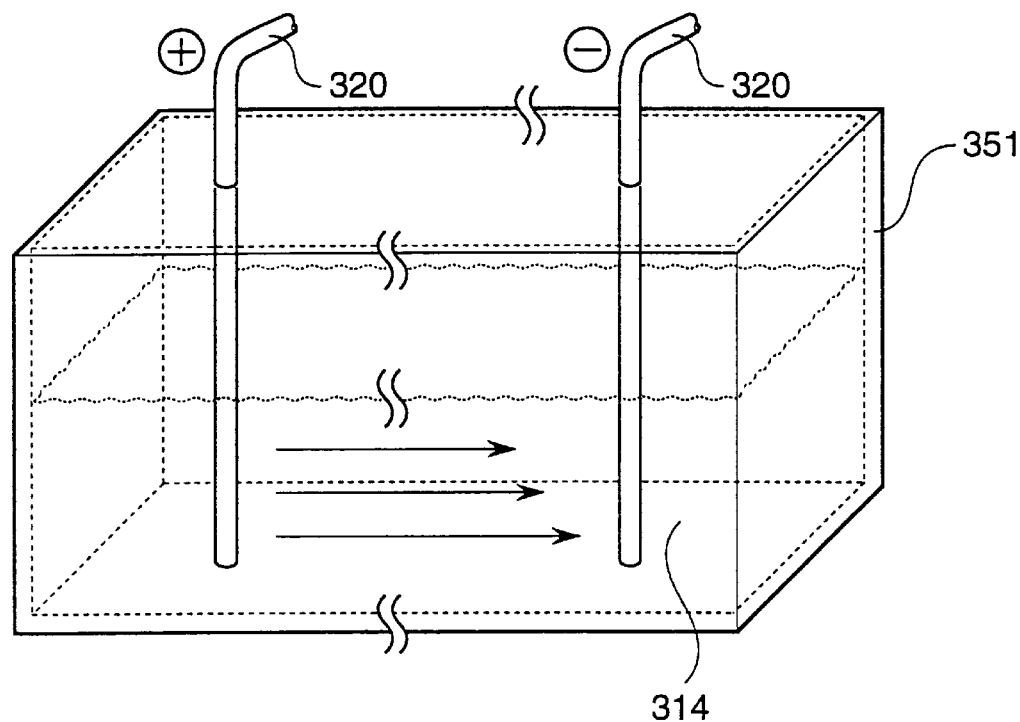
FIG. 27 is a view showing an embodiment of a structure of the micropump of the invention.

As shown in FIG. 27, two electrodes 320, 320 are arranged in a container 351 containing an electro-sensitive movable fluid 314. When a voltage is applied so that one electrode 320 becomes a positive electrode and the other electrode 320 becomes a negative electrode, the electro-sensitive movable fluid 314 flows between the electrodes 320, 320. The micropump of the invention is driven using, as its driving source, the electro-sensitive movable fluid 314 which flows (is propelled by itself) between the electrodes 20, 20 under application of a voltage. Accordingly, there is no specific limitation on the arrangement, the number and the shapes of the electrodes, and they can be properly determined, as far as a uniform electric field is formed in the electro-sensitive movable fluid by application of a voltage, and thereby the electro-sensitive movable fluid moves between the electrodes to form a jet flow. In FIG. 27, for example, two bar electrodes 320, 320 electrically insulated from each other are arranged at the center of the container 351 containing the electro-sensitive movable fluid 14, but these electrodes 320, 320 may be provided vertically on the inner surface of the wall of the container 351. The shape of the electrode is not limited to the bar mentioned above. For example, referring to FIG. 27, plate electrodes may be attached to the inner surface of the side wall of the container 351. Though two electrodes are provided in FIG. 21, electrodes of more than 2 can be provided. The number of the electrodes may be an odd number.

The micropump shown in FIG. 27 comprises the closed container 351, the electrodes 320, 320 provided in the container and the electro-sensitive movable fluid 314, and produces a jet flow of the fluid 314 upon application of a voltage. This micropump functions as a circulating pump wherein the electro-sensitive movable fluid is circulated in the container 351. If a fresh electro-sensitive movable fluid 314 is continuously fed at the upstream side (e.g., left side in FIG. 27) of the flow of fluid 314 and if the electro-sensitive movable fluid 314 is continuously drawn out from the downstream side (e.g., right side in FIG. 27), the micropump of the invention functions as a transfer pump of the electro-sensitive movable fluid.

The shape of the electrode used in the micropump can be variously modified according to the intended use of the micropump.

Figure 28:
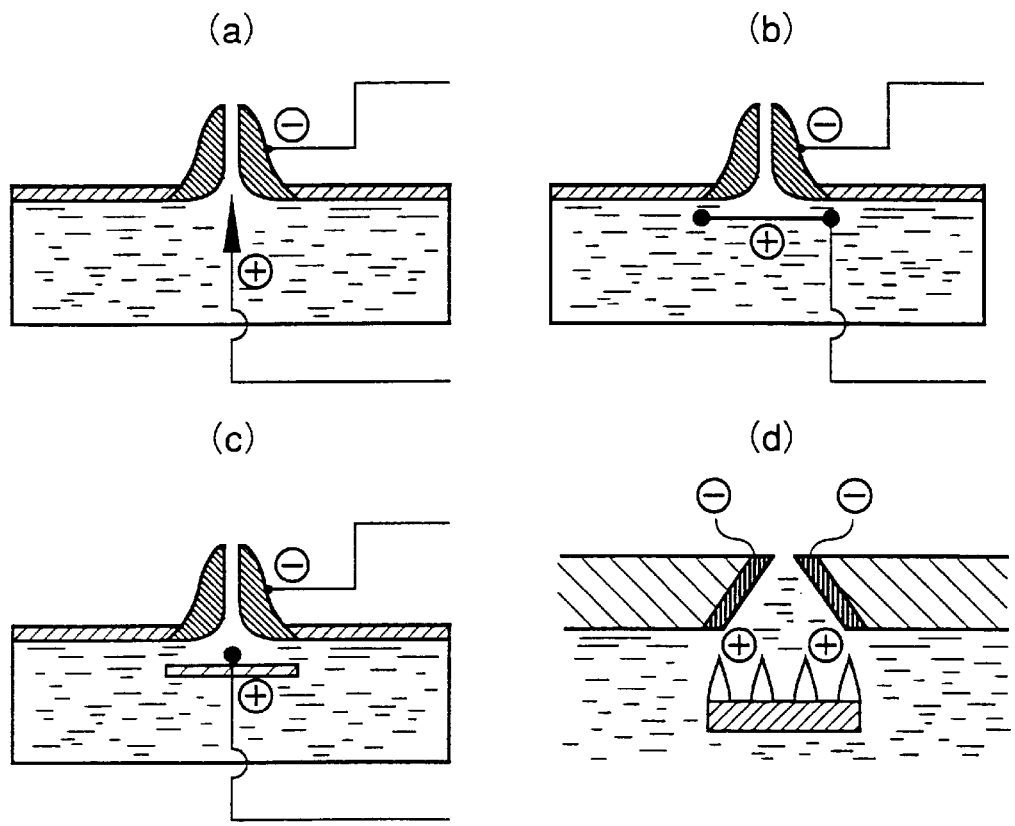
FIGS. 28($a$–$d$), 29($a$–$c$) to FIG. 30($a$–$c$) are each a schematic view showing an embodiment of shape of the electrode employable in the micropump of the invention.

For example, a nozzle electrode is prepared and a tapered electrode insulated from the nozzle electrode is provided in the vicinity of the bottom end of the nozzle electrode, as shown in FIG. 28, whereby the micropump of the invention functions as a jet pump wherein the electro-sensitive movable fluid is jetted from the tip of the nozzle electrode. The term "tapered electrode" used herein means an electrode so designed to have a tip of an extremely small area. Examples of the tapered electrodes include a needle electrode (FIG. 28(a)), a linear electrode (FIG. 28(b)) which is extended along the diameter of a nozzle hole of the nozzle electrode on its bottom end side, a point electrode (FIG. 28(c)) which is formed on a printed board arranged in the vicinity of the bottom end of the nozzle electrode, and a needlepoint holder type electrode (FIG. 28(d)) which is constituted of a substrate and plural tapered electrodes (e.g., needle electrode, point electrode) provided thereon similarly to a needlepoint holder.

Examples of the nozzle electrodes used in combination with the above-mentioned various tapered electrodes include an ordinary nozzle electrode made of a conductive metal as shown in FIG. 28(a), a punched nozzle electrode obtained by punching a hole into a conductive plate, and a conical nozzle electrode (FIG. 28(d)) obtained by punching a conical hole into an insulating substrate and providing a conductive material on the conical wall surface.

The tapered electrode is preferably arranged in such a manner that the tip of the tapered electrode slightly enters into a nozzle hole of the nozzle electrode on its bottom end side, as shown in FIG. 28(a). In the micropump of the invention having plural nozzle electrodes and plural tapered electrodes arranged in the above-mentioned way, the electro-sensitive movable fluid can be selectively jetted from the voltage-applied nozzle electrodes in a high selectivity.

Figure 30:
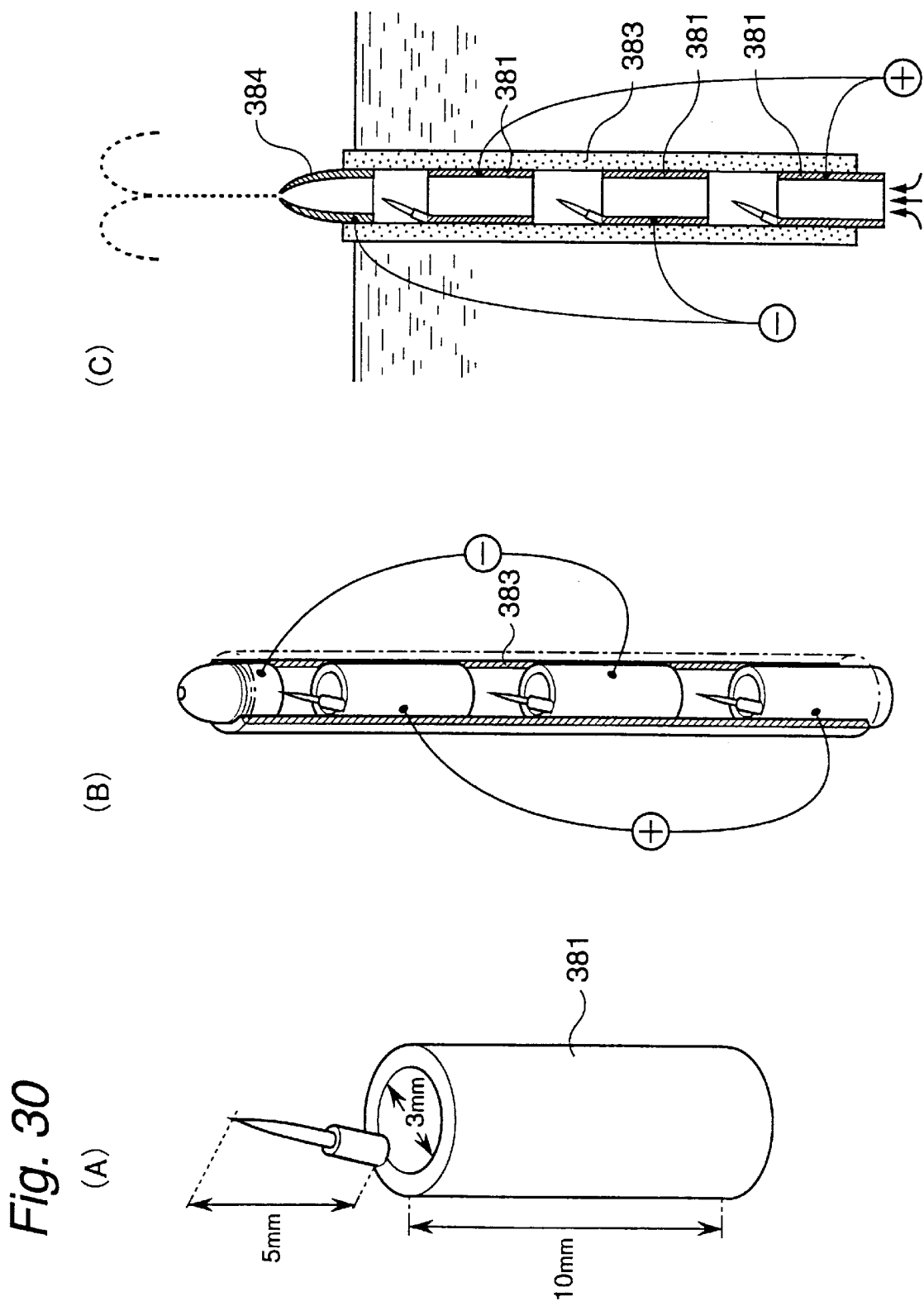

In the micropump of the invention, a multi-step electrode composed of plural ring electrodes disposed in series as shown in FIG. 29 and FIG. 30 is also available.

The multi-step electrode is obtained by disposing, in series, plural rings (ring electrodes) 371a, 371b, - - - , through which the electro-sensitive movable fluid is able to flow. To the ring electrodes 371a, 371b, - - - , a voltage is applied so that the electrodes become positive and negative alternately, as shown in FIG. 29(A). When a voltage is applied to the ring electrodes 371a, 371b, - - - , which are disposed as above, a jet flow of the electro-sensitive movable fluid in the direction of the first ring electrode 371a to the second ring electrode 371b is formed. This jet flow is accelerated when it advances from the second ring electrode 371b to the third ring electrode 371c. The jet flow is further accelerated when it advances from the third ring electrode 371c to the fourth ring electrode 371d. Consequently, the electro-sensitive movable fluid can be moved at a higher velocity by means of the micropump of the invention wherein plural ring electrodes are disposed in series as described above. The ring electrode can be formed from, for example, a conductive metallic wire, as shown in FIG. 29(B), or can be formed from a conductive metallic plate or metallic foil having a hole through which the electro-sensitive movable fluid is able to pass, as shown in FIG. 29(C). Further, the ring electrode may be formed by subjecting the inner surface of an insulating cylindrical material to conductive metal plating of circumferential direction utilizing such as printed wiring technique or plating technologies.

The ring electrode is preferably provided with an electrode protrusion 372, which is electrically connected to the ring electrode, on the downstream side of the jet flow, as shown in FIG. 29(A). Though the electrode protrusion 372 may have various shapes, a needle shape is preferable because the resistance to the jet flow of the electro-sensitive movable fluid is low. The ring electrodes 371 provided with the electrode protrusion 372 are arranged in series in such a manner that the electrode protrusion 372 is not in contact with the next ring electrode 371. By virtue of the electrode protrusion 372, the jet flow of the electro-sensitive movable fluid in the direction of the electrode body to the electrode protrusion can be selectively formed.

The ring electrode can be modified to have a cylindrical body. That is, as shown in FIG. 30(A), the ring width (in the direction of the jet flow) of the ring electrode is enlarged in such a manner that the jet flow of the electro-sensitive movable fluid is not inhibited, to form a cylindrical body 381 (cylindrical electrode). The cylindrical electrode is preferably provided with an electrode protrusion 382 at its end on the downstream side of the jet flow, similarly to the ring electrode.

Plural cylindrical electrodes 381, each of which is provided with the electrode protrusion 382, are arranged in series in an insulating cylinder 383 in such a manner that the electrodes are insulated from each other, whereby a jet flow of high velocity can be produced.

FIG. 30 shows an embodiment wherein the electrode positioned on the most downstream side of the jet flow is a nozzle electrode 384. When the nozzle electrode 384 is arranged at the tip of the pump as above, this pump functions as a jet pump of the electro-sensitive movable fluid. If the cylindrical electrode is arranged at the tip of the pump, this pump functions as a circulating pump or a transfer pump.

The micropump of the invention has no mechanical driving means and is driven by merely applying a voltage to the electro-sensitive movable fluid, and therefore the micropump is advantageous in miniaturization.

The micropump of the invention is driven by applying a voltage between the electrodes, and the applied voltage is, for example, a pulse voltage, a rectangular voltage or a continuous voltage. Particularly, a direct-current-voltage of continuous wave is preferably applied in the micropump of the invention. The voltage applied between the electrodes is a direct-current-voltage of usually 50 V to 30 kV, preferably 100 V to 15 kV. By adjusting the applied voltage, the output power of the micropump of the invention can be controlled. Even if a voltage is applied, the current in the electro-sensitive movable fluid is extremely small, and therefore generation of heat caused by driving the micropump is not substantially observed.

The micropump wherein the electrode positioned on the upstream side of the jet flow is a positive electrode and the electrode positioned on the downstream side of the jet flow is a negative electrode is described above, but the electrode on the upstream side may be a negative electrode and the electrode on the downstream side may be a positive electrode according to the type of the electro-sensitive movable fluid.

Like the conventional pumps, the micropump of the invention can be used as a transfer pump, a jet pump or a circulating pump.

In particular, the micropump of the invention is preferably used for heat energy exchange. That is, a voltage is applied to produce a jet flow of the electro-sensitive movable fluid toward a target, and the thus produced jet flow is brought into contact with the target, whereby heat energy exchange is carried out utilizing temperature difference between the jet flow and the target. When the temperature of the electro-sensitive movable fluid is higher than that of the target, the micropump of the invention can be used as a means to heat the target. When the temperature of the electro-sensitive movable fluid is lower than that of the target, the micropump of the invention can be used as a means to cool the target.

FIG. 31 schematically shows an embodiment of a piston driving apparatus using shape-memory alloy lines 312.

In the piston driving apparatus, as shown in FIG. 31, a lower fixed disc 331 is fixed to a fixed shaft 11 which is united to a casing 313. The center of an upper lid 33 of the casing 313 is provided with a shaft hole. To the shaft hole, a driving shaft 322 is vertically movably fitted. To the bottom of the driving shaft 322 is fixed a driving disc 332. The driving disc 332 and the lower fixed disc 331 are connected with shape-memory alloy lines 312. To the shape-memory alloy lines 312, a pulse current can be applied from the outside of the casing.

Referring to FIG. 31, the upper fixed disc 334 is fixed to the driving shaft 322 at its higher part than the upper lid. Between the upper fixed disc 334 and the upper lid, a spring 324 is provided so that the driving shaft 322 is pulled up. By virtue of the spring 324, the shape-memory alloy lines 312 are strained. On the inner surface of the wall of the casing 313, plural electrodes 320 are arranged vertically. The plural electrodes 320 can be arranged so that they become positive electrode and negative electrode alternately when a voltage is applied. The casing is filled with an electro-sensitive movable fluid 314.

When a voltage is applied to the electrodes 320 of the piston driving apparatus having the above structure, a jet flow of the electro-sensitive movable fluid 314 in the circumferential direction of the casing 313 is formed in the casing 313. The jet flow of the fluid 314 produced by the plural electrodes 320 comes into contact with the shape-memory alloy lines 312. In this stage, the temperature of the shape-memory alloy lines 312 is equal to or lower than the temperature of the electro-sensitive movable fluid 314.

Then, a pulse current is applied to the shade-memory alloy lines 312, whereby the shape-memory alloy lines 12 generate heat because of their electric resistance. When the shape-memory alloy lines 312 reach a given temperature (said given temperature varies according to the shape-memory alloy), the memorized shape appears and the shape-memory alloy lines 312 are contracted to pull down the upper driving disc 332. If the application of a current to the shape-memory alloy lines 312 is stopped, heat generation of the shape-memory alloy lines 312 is also stopped. When the shape-memory alloy lines 312 are cooled to a given temperature, the driving disc 332 is pulled up to the former position by the spring 324. The time of applying a current to raise the temperature of the shape-memory alloy lines 312 is relatively short (usually 0.05 to 0.2 second), and the driving speed of the piston driving apparatus depends on the cooling rate of the shape-memory alloy lines 312.

When the jet flow of the electro-sensitive movable fluid 314 produced by the micropump of the invention is brought into contact with the shape-memory alloy lines 312 (targets of cooling), the alloy lines 312 can be forcibly cooled. The jet flow, which is produced by the micropump upon application of a voltage between plural electrodes vertically provided on the inner surface of the casing 313, is a flow in the circumferential direction of the casing 313. The heat energy of the jet flow is transferred to the casing 313 by the contact of the jet flow with the inner wall surface of the casing 313 and then released outside.

When the shape-memory alloy lines are cooled using the micropump of the invention as described above, the driving disc 332 can be vertically moved at a high speed and the amplitude of the driving disc 332 becomes large.

In FIG. 31, a rotational flow of the electro-sensitive movable fluid 314 in the circumferential direction of the casing 313 is produced by the micropump having plural electrodes 20 which are vertically arranged in the electro-sensitive movable fluid. However, a jet flow of the electro-sensitive movable fluid 314 in the vertical direction of the casing 313 can be produced by providing the electrodes 320 in plural steps in the transverse direction of the casing 313, as shown in FIG. 32.

Referring to FIG. 32, the piston driving apparatus includes a fixed shaft 311, shape-memory alloy lines 312, a casing 313, an electro-sensitive movable fluid 314, electrodes 320, a driving shaft 322, a spring 324, a driving disc 332, an upper lid 333 and an upper fixed disc 334. The piston driving apparatus shown in FIG. 32 is different from the piston driving apparatus shown in FIG. 31 in the arrangement of the electrodes 320. In the piston driving apparatus having a micropump wherein the electrodes 320 are arranged at the upper and the lower positions in the electro-sensitive movable fluid 314, the electro-sensitive movable fluid 314 is convected vertically in the casing 313, as shown in FIG. 32. The heat from the shape-memory alloy lines 12 presumably causes convection of the electro-sensitive movable fluid, though it is slight. By virtue of the arrangement of the electrodes 20 shown in FIG. 32, more efficient forced cooling may be carried out.

Each of FIG. 31 and FIG. 32 shows an embodiment of the piston driving apparatus using a micropump wherein plural linear electrodes 320 are arranged in the electro-sensitive movable fluid. Instead of the micropump of this type, micropumps using the aforesaid various electrodes are available to perform cooling. In the above embodiments, the voltage applied between the electrodes 320 and the current applied to the shape-memory alloy lines 312 are separately controlled, but the voltage applied between the electrodes 320 can be made a pulse voltage by electrically connecting the shape-memory alloy lines 312 to the electrodes 320. In the case where the pulse voltage is applied between the electrodes 320 to produce a jet flow of the electro-sensitive movable fluid, the electro-sensitive movable fluid continues to move because of the inertia force of the jet flow even when no voltage is applied. In this case, only one voltage modulation circuit (not shown) is enough, and this contributes to miniaturization of the whole apparatus and decrease of costs.

The micropump of the invention can be effectively used as a cooling means as described above, and hence it can be used as a means to cool shape-memory alloy lines of an actuator wherein a bellows or the like is contracted by the shape-memory alloy lines.

Figure 33:
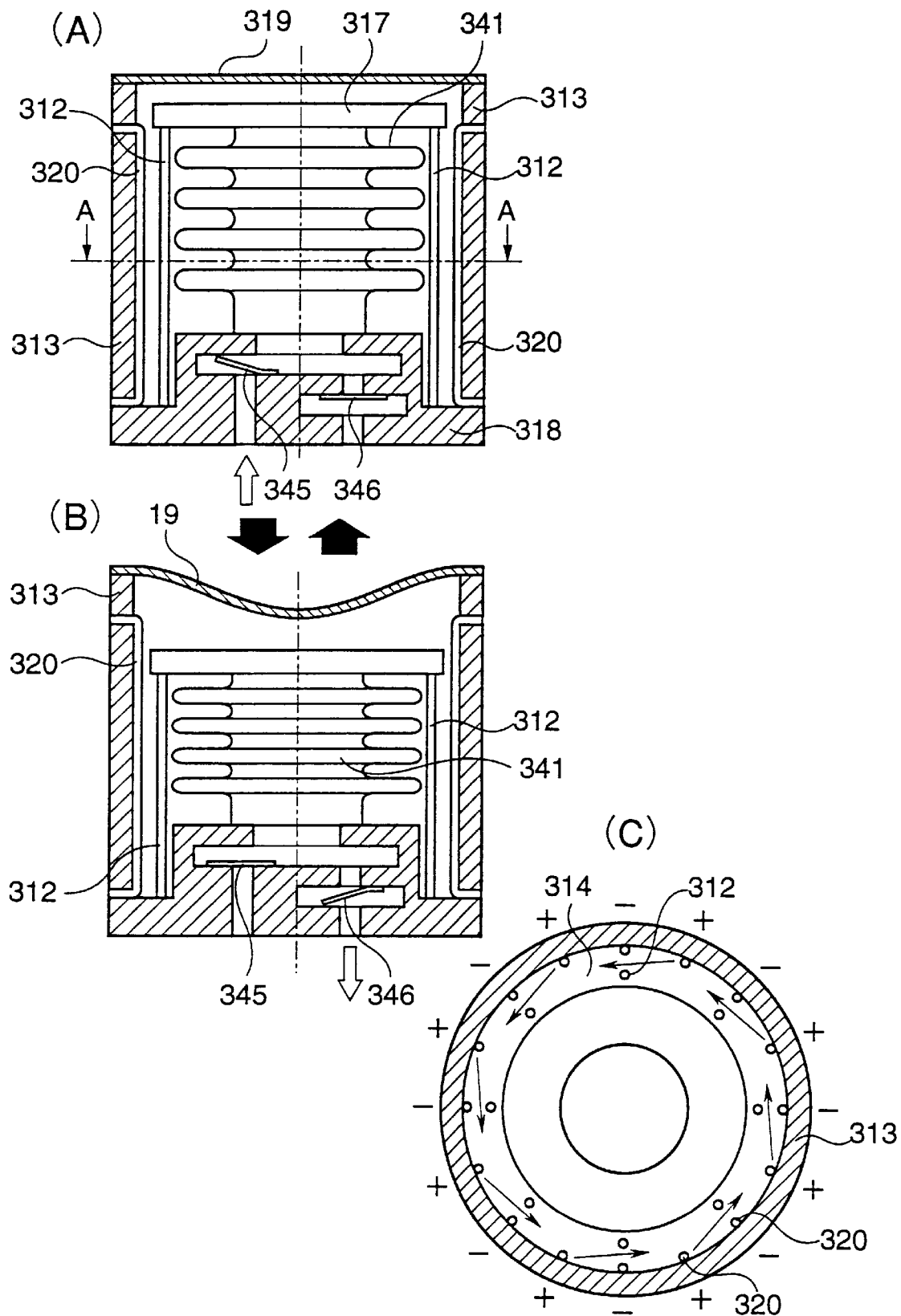
FIGS. 33($a$–$c$) is a view showing the principle of driving the microactuator incorporating the micropump of the invention as a cooling means.

FIG. 33 schematically shows an embodiment of the microactuator of the invention.

In FIG. 33(A), a bellows 341 (expansion pump chamber) is expanded. In FIG. 33(B), a bellows 341 (expansion pump chamber) is contracted by means of shape-memory alloy lines 312. FIG. 33(C) is a sectional view taken on line A—A of FIG. 33(A).

As shown in FIG. 33, the microactuator of the invention includes an inside cylinder (pump chamber) constituted of a bellows 341 and a casing 313 provided outside the inside cylinder. A substrate 318 located at the lower end of the bellows 341 (pump chamber) is provided with a suction valve 345 and a discharge valve 346. Through the suction valve 345, a liquid can be suctioned from the outside into the bellows 341 (pump chamber) when the bellows 341 having been contacted is expanded, as shown in FIG. 33(A). From the discharge valve 346, the liquid can be discharged from the bellows 341 (pump chamber) to the outside when the bellows 341 having been expanded is contracted, as shown in FIG. 33(B).

The pump chamber can be formed from a piston, a bellows or the like. The bellows is preferably used because the actuator can be made small. A preferred embodiment using a bellows as the pump chamber is described below.

Between an upper end 317 of the bellows 341 and a lower end of the casing 313, plural shape-memory alloy lines 312 are stretched. The shape-memory alloy lines 312 are connected to a controller (not shown) provided outside the microactuator.

The space between the bellows 341 and the casing 313 is filled with the electro-sensitive movable fluid 314. The electro-sensitive movable fluid 314 is usually adjusted to have a temperature lower by 20 to 30° C. than the temperature at which the memorized shape of the shape-memory alloy lines 312 appears. On the inner surface of the casing 313, plural electrodes 320 are provided. The electrodes 320 are generally arranged in such a manner that they become positive electrode and negative electrode alternately. The electrodes 320 are connected to a controller (not shown) provided outside the microactuator. Between the electrodes 320, a direct-current-voltage controlled by the controller is applied. When the voltage is applied between the electrodes 320, a jet flow of the electro-sensitive movable fluid 314 is produced in the circumferential direction of the casing 313.

An upper end 319 of the casing 313 is made of an elastic material so that no negative pressure is applied to the bellows 341 during contraction of the bellows 341.

When a current is applied to the shape-memory alloy lines 312 of the microactuator having the above structure, the shape-memory alloy lines 312 generate heat because of their electric resistance and are changed in their shapes. The shape-memory alloy lines 312 used herein are preferably those having such properties that, when a pulse current is applied thereto, they have a temperature of 65 to 200° C. and are changed in their shapes. The power supplied to the shape-memory alloy lines of the microactuator of the invention is in the range of usually 0.1 to 10 W, though it varies depending on the size of the microactuator.

When a current is applied to the shape-memory alloy lines 312, the shape-memory alloy lines 312 generate heat because of their electric resistance. By virtue of the heat generation, the shape-memory alloy lines 312 are contracted to thereby contract the bellows 341, as shown in FIG. 33(B). With the contraction of the bellows 341, a liquid in the pump chamber (bellows) pushes down the discharge valve and the liquid is discharged.

A current is applied to the shape-memory alloy lines 312 to contract the bellows 341 as described above, while a voltage is applied between the electrodes 320 to produce a jet flow of the electro-sensitive movable fluid 314, as shown in FIG. 33(C). The jet flow comes into contact with the shape-memory alloy lines 312 to lower the temperature of the shape-memory alloy lines 312 to a temperature not higher than the temperature at which change of shape takes place. The bellows 341 is made of an elastic material, and when the bellows is liberated from the tension given by the shape-memory alloy lines 312, it returns to the expanded state shown in FIG. 33(A) from the contracted state shown in FIG. 33(B). With the expansion of the bellows, the suction valve 345 is pushed up, whereby a liquid present outside is suctioned into the bellows 341. That is, application of a current to the shape-memory alloy lines and cooling of the shape-memory alloy lines cause contraction and expansion of the bellows 341, and by virtue of the contraction and expansion of the bellows, the liquid is suctioned and discharged.

When the jet flow of the electro-sensitive movable fluid 314, which is produced by the micropump incorporated in the actuator and constituted of the electrodes 320 and the electro-sensitive movable fluid 314, is used to cool the shape-memory alloy lines 312, the shape-memory alloy lines 312 can be forcibly cooled efficiently. That is, the time of applying a current to contract the shape-memory alloy lines 312 is usually about 0.05 to 0.2 second and is relatively short. In case of spontaneous cooling, however, the time required for cooling the shape-memory alloy lines 312 which have once generated heat is considerably long. Therefore, if the shape-memory alloy lines 312 are efficiently cooled using the micropump of the invention, the actuator of the invention can be driven at a high speed. Besides, the bellows 341 can be greatly expanded and contracted, and hence the amount of the liquid which is suctioned or discharged by expansion or contraction at one time can be increased.

The heat transferred to the electro-sensitive movable fluid from the shape-memory alloy lines is released from the surface of the casing having a large surface area. Therefore, the temperature of the electro-sensitive movable fluid is not substantially raised.

For producing a jet flow of the electro-sensitive movable fluid so as to forcibly cool the shape-memory alloy lines 312, a direct-current-voltage of usually 50 V to 30 kV, preferably 100 V to 15 kV, is applied between the electrodes 320. Though a continuous voltage such as a direct-current-voltage is generally applied between the electrodes 320, a discontinuous voltage such as pulse voltage is also available. Even if the voltage applied between the electrodes 320 is discontinuous, a continuous jet flow of the electro-sensitive movable fluid is produced because of the inertia force.

As shown in FIG. 33, when a voltage is applied between plural electrodes 320 which are vertically arranged on the inner surface of the casing 313, the electro-sensitive movable fluid flows in the circumferential direction of the casing 313. The flow of the electro-sensitive movable fluid comes into contact with the shape-memory alloy lines 312 (targets of cooling), whereby the shape-memory alloy lines 312 can be forcibly cooled.

In the microactuator of the invention, a current is applied to the shape-memory alloy lines to allow them to generate heat so as to make them in the desired shape, whereby the bellows is contracted, while the shape-memory alloy lines are brought into contact with the jet flow of the electro-sensitive movable fluid to cool the alloy lines. However, the microactuator can be variously modified.

For example, a jet flow of the electro-sensitive movable fluid in the vertical direction of the casing 313 can be produced by arranging the electrodes as shown in FIG. 32.

The microactuator described above is designed so that the shape-memory alloy lines generate heat and are contracted to thereby contract the bellows, however, the microactuator may be designed so that the shape-memory alloy lines generate heat and are expanded to thereby drive the bellows. The bellows may be formed from a shape-memory alloy.

In the microactuator of the invention, the outer surface of the casing can be provided with a radiating means to increase the radiation area.

In the microactuator of the invention, a voltage is applied to the electro-sensitive movable fluid to produce a jet flow of the movable fluid. By virtue of the jet flow, the shape-memory alloy lines (targets of cooling) are cooled to drive the microactuator at a high speed. The microactuator of the invention is extremely small. For example, the microactuator has a diameter of not more than 20 mm and a height of not more than 30 mm, and preferably has a diameter of not more than 10 mm and a height of not more than 10 mm. In spite of such a small-sized microactuator, the flow rate of the liquid discharged is usually not less than 5 mm$^3$/s, preferably not less than 50 mm$^3$/s, and the microactuator can be efficiently driven at a remarkably high speed.

Next, the method of controlling relative flow properties of a fluid according to the invention and the apparatus used in the method are described in detail.

FIG. 39 schematically shows an embodiment of an apparatus for controlling flow properties of a fluid, which is employable in the method of the invention.

The control apparatus 410 used in the invention has at least one pair of electrodes 412, 414. The pair of electrodes 412, 414 is designed so that an ununiform electric field can be formed in a fluid 416. If a voltage is applied between a pair of electrodes with smooth surfaces placed in a fluid, a uniform electric field is formed in the fluid, and in case of such electrodes, it is difficult to produce a jet flow of a fluid. In the present invention, at least one electrode out of the pair of electrodes 412, 414 facing each other is an uneven surface electrode having a non-smooth surface. Referring to FIG. 39, the upper electrode 412 is an uneven surface electrode whose surface is flocked with a fibrous material 418. Examples of the uneven surface electrodes include the above-mentioned flocked electrode, an electrode obtained by providing a number of metal poles on a surface of an electrode substrate, an electrode obtained by forming protrusions and depressions on a surface of an electrode material through embossing or the like, an electrode obtained by providing protrusions and depressions on a surface of an electrode substrate utilizing printing technique or the like, an electrode of an island structure having depressed sea portion and protruded island portion, and a honeycomb electrode. Of these, the flocked electrode is preferable. The electrodes capable of forming an ununiform electric field in a fluid are sometimes referred to as "flocked electrodes" generically hereinafter. In the flocked electrodes, fibers of the fibrous material are not swayed in a flow formed by a shear stress-generating plate. Therefore, it is different from the case of the prior art electrode provided with the woven fabric that the shear stress produced by the invention has hydrodynamic continuity, is free from yield stress which indicates solidification, and exhibits ease of controlling.

FIG. 39 shows electrodes comprising a pair of circular plates 412, 414 each having a diameter of 35 mm. The surface of the upper circular plate 412, said surface facing the lower circular plate, is flocked with synthetic fibers 418. The upper circular plate 412 is rotatably arranged above the lower plate 414. Numeral 422 designates a motor to rotate the upper electrode 412. The upper circular plate 412 and the lower circular plate 414 are arranged at a distance of 1.5 mm. The length of the fiber of the fibrous material 418 is 1 mm, and therefore, the distance between the tip of the fiber of the fibrous material 418 and the lower circular plate 414 is 0.5 mm. The upper circular plate 412 is electrically insulated from the lower circular plate 414. In FIG. 1, a rotating shaft 426 of the motor 422 is provided with a rotational contact point so that a voltage can be applied between the upper circular plate 412 and the lower circular plate 414. The voltage is controlled by a controller 424.

The upper circular plate 412 is connected to the motor 422 (driving device) through the rotating shaft 426. The rotating shaft 426 is provided with a measuring equipment (not shown) to measure shear stress when the upper circular plate is rotated.

The flocked electrode preferably used as the uneven surface electrode in the invention is an electrode wherein a surface of a metallic substrate is flocked with a fibrous material.

As the fibrous material used for flocking the lower surface of the upper circular plate shown in FIG. 39, an organic fibrous material, an inorganic fibrous material or a metallic fibrous material can be used. Examples of the organic fibrous materials include chemical fibers, such as polyamide fibers (nylon fibers), polyester fibers, acrylic fibers, rayon fibers, acetate fibers, vinylon fibers, polypropylene fibers and polyvinyl chloride fibers; natural fibers, such as cotton fibers, linen fibers and wool fibers; and whiskers of organic materials. Examples of the inorganic fibrous materials include glass fibers, asbestos fibers and whiskers of inorganic materials. Examples of the metallic fibrous materials include stainless steel fibers, copper fibers, nickel fibers, metallic whiskers, and whiskers of metallic compounds or metallic derivatives such as metallic oxides, metallic nitrides and metallic carbides. These fibrous materials can be used singly or in combination.

The length of the fibrous material 418 (length of fiber) can be appropriately determined according to the distance between the electrodes. The length is in the range of usually $1/100$ to $95/100$, preferably $1/100$ to $80/100$, more preferably $1/100$ to $80/100$, of the distance between the electrodes. For example, in the apparatus 410 shown in FIG. 39, the distance between the upper circular plate 412 and the lower circular plate 414 is 1.5 mm, and the length of the fibrous material 18 provided on the upper circular plate is 1.0 mm. The fineness of the fibrous material 418 is in the range of usually 0.5 to 20 deniers, preferably 1.0 to 5.0 deniers. If the fineness of the fibrous material greatly deviates from this range, uniform flocking of the surface of the electrode material with the fibrous material becomes difficult, and the resulting flocked electrode shows scattered shear stress values. Further, dense flocking with the fibrous material may cause scattering of the shear stress values, because the dense area has high resistance to the fluid even when no voltage is applied and inevitably a difference of the resistance from the state of voltage application becomes small, though it depends on the flocking density (number of fibers per unit area).

The number of fibers of the fibrous material can be appropriately determined in consideration of the flow properties of the fluid to be controlled, and is in the range of usually 1,000 to 50,000 per 1 $cm^2$, preferably 3,000 to 30,000 per 1 $cm^2$. The total area of the sections of the fibers is usually 1 to 75%, preferably 5 to 35%, based on the area of the electrode surface having the fibers thereon. In the method of the invention, a jet flow of the fluid is produced between the tip of the fibrous material (tip of the flocked electrode) and the other electrode. Therefore, if the flocking density of the fibrous material is low, a jet flow is produced on a small scale. That is, when the flocking density is low, the jet flow produced upon application of a voltage is too small to sufficiently control the flow properties of the fluid. On the other hand, flocking with a larger number of fibers than the above range is practically impossible from the industrial viewpoint.

There is no specific limitation on the process for flocking the electrode material (substrate) with the fibrous material. For example, the ends of the fibers are bonded to a surface of the electrode material such as a metal through an adhesive (flocking glue) layer 428, or the ends of the fibers are fusion bonded to the surface of the electrode material. If the fibrous material is a metal or an inorganic material, the metal or the inorganic material may be allowed to grow in the form of fibers on the surface of the electrode material.

The other electrode 414, which faces the flocked electrode having the fibrous material 418 thereon, can be formed from any of various materials, with the proviso that a voltage can be applied between the electrodes. Examples of the materials for forming the electrode 414 include metals, carbon materials such as graphite, conductive metallic oxides, coating materials capable of forming a conductive layer, and conductive films. The surfaces of these electrode-forming materials may be covered with cloth or the like. In FIG. 39, the electrode 414 is formed from a metal.

The gap between the flocked electrode 12 and the other electrode 414 is filled with a fluid 16 which is substantially dielectric at its working temperature. FIG. 39 shows an embodiment wherein the flocked electrode 12 and the other electrode 414 are immersed in a fluid contained in a container 430. By immersing the flocked electrode 412 and the other electrode 414 in the fluid 16 contained in the container 430, the gap between the flocked electrode 412 and the other electrode 414 is filled with the fluid.

The fluid 416 filled in the gap between the flocked electrode 412 and the other electrode 414 is a fluid which shows flowability at its working temperature. In the invention, the fluid 416 is preferably a fluid which is substantially dielectric at its working temperature. By the expression "fluid which is substantially dielectric" is meant that the fluid has a conductivity ($\sigma$) of usually not more than $1\times10^{-6}$ S·m$^{-1}$, preferably not more than $2.5\times10^{-6}$ S·m$^{-1}$. Examples of the fluids include silicone oil, hydraulic oil, transformer oil, lubricating oil, mineral oil, cutting oil and bearing oil. The dielectric fluid preferably has conductivity and viscosity equivalent to those of the aforesaid electro-sensitive movable fluid.

A voltage is applied between the flocked electrode 412 and the other electrode 414 between which the substantially dielectric fluid 416 is held. The applied voltage is, for example, rectangular voltage, pulse voltage or continuous voltage. The intensity of the applied voltage is in the range of usually 10 V to 10 kV, preferably 50 V to 6 kV. Even if the fluid to which a voltage is applied is substantially dielectric, a current is produced in the fluid, though it is very small. The current is usually 0.001 to 100 $\mu A/cm^2$, in many cases 0.05 to 20 $\mu A/cm^2$, though it varies depending on the type of the fluid, the type of the flocked electrode and the distance between the electrodes.

When a voltage is applied between the electrodes as described above, a jet flow of the fluid is produced between the tip of the fibrous material 418 of the flocked electrode 412 (uneven surface electrode) and the other electrode. That is, by the use of the uneven surface electrode, an ununiform electric field is formed in the fluid filled in the gap between the electrodes, and by virtue of the ununiform electric field, a jet flow of the fluid is produced. When the flocked electrode is used, a jet flow is produced between the tip of each fiber and the other electrode, and the jet flow often becomes a circulating flow. For example, in FIG. 39, plural circulating flows are produced in the vertical direction between the flocked electrode 12 and the other electrode 414. The circulating flows thus produced are almost perpendicular to the fluid which moves horizontally between the electrodes, and therefore the circulating flows function as shear stress against the fluid which moves horizontally between the electrodes. The flow rates (or intensities) of the circulating flows can be controlled by the intensity of the voltage applied between the flocked electrode and the other electrode. In FIG. 39, the flow properties of the fluid which moves horizontally can be controlled by varying the voltage applied between the flocked electrode 412 and the other electrode 414.

Figure 40:
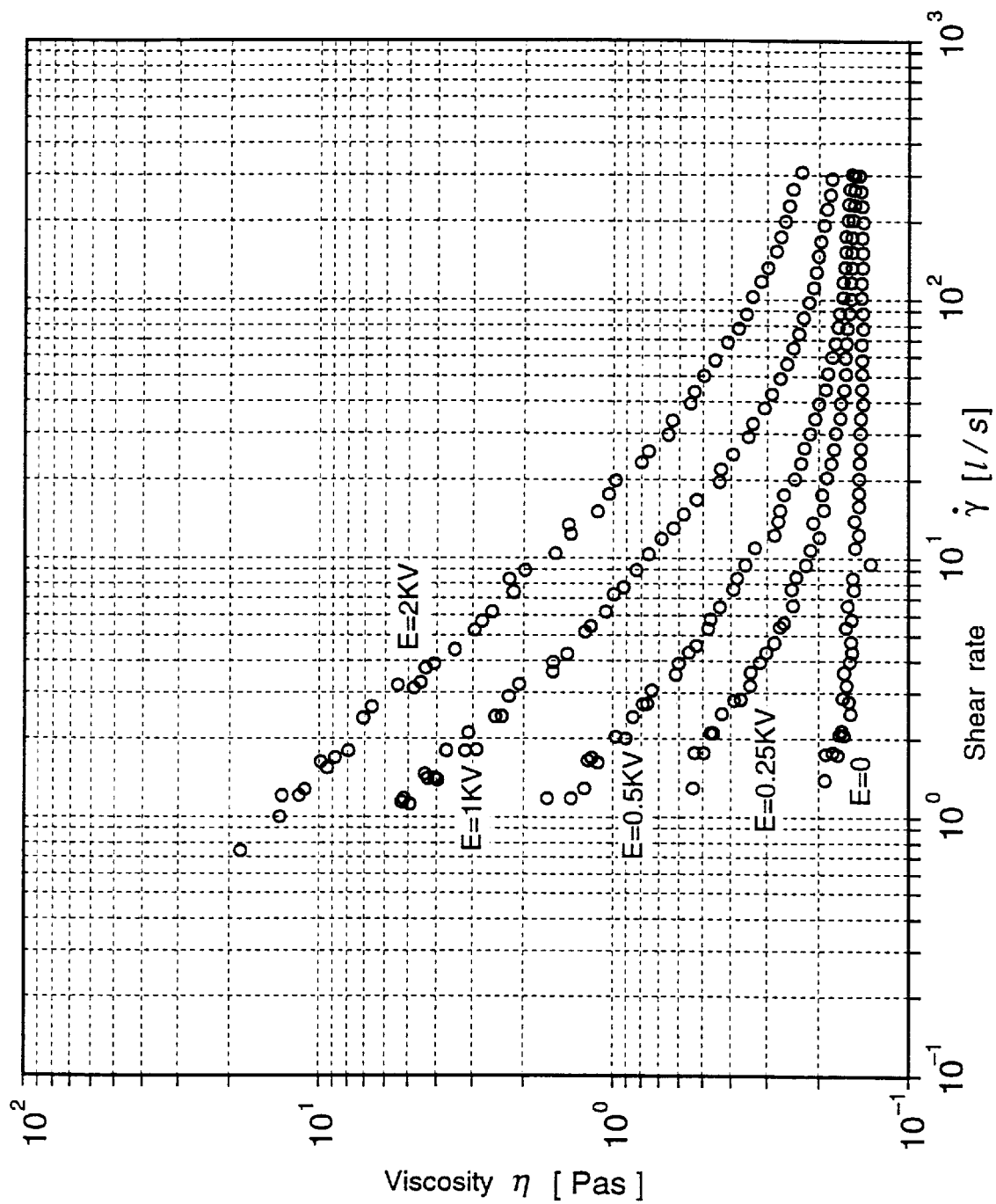
FIG. 40 to FIG. 52 are each a graph showing viscosity of a fluid at each shear rate in Example 18 to Example 30.

FIG. 40 shows change in a viscosity of a dielectric hydraulic oil (silicone oil) given when the upper circular plate (flocked electrode) is rotated with applying a voltage of 0.25 to 2 kV between the flocked electrode and the other electrode arranged in such a manner that the distance between the tip of the fibrous material of the flocked electrode and the other electrode is made 0.5 mm and the silicone oil is filled in the gap between those electrodes. For comparison, a viscosity of the hydraulic oil given when no voltage is applied is also shown in FIG. 40.

It is generally known as the electrical rheology effect that the viscosity of a fluid varies when a voltage is applied to the fluid. This results from change of state of the fluid caused by the electric field. For example, as for the particle dispersion type electro-rheological fluids, it is understood that the particles undergo dielectric polarization owing to the electric field to form a chain structure between the electrodes, whereby shear stress of the fluid is increased. As a result, the viscosity of the fluid is increased. As for the liquid crystals which are homogeneous electro-rheological fluids, it is understood that molecules of the crystal material are orientated in one direction owing to the electric field, whereby shear stress of the fluid is increased. As a result, the viscosity of the fluid is increased.

The silicone oil used in the control method of the invention is, however, electrically stable and does not have such orientation properties as of the particle dispersion type fluids or the crystals, so that it is impossible that a chain structure is formed as in the heterogeneous fluids or the molecules are orientated as in the crystals. The silicone oil is known to exhibit stable state in the electric field, and for this reason, the silicone oil is widely used now as an excellent dielectric fluid.

According to the invention, even if the electrically stable silicone oil is used, a jet flow (circulating flow in many cases) of the fluid (silicone oil) is observed between the tip of the fibrous material of the flocked electrode and the other electrode upon application of a voltage between the electrodes. By virtue of the jet flow, shear stress of the silicone oil is increased, and the flow properties of the silicone oil can be controlled by the voltage applied between the electrodes. This behavior is not limited to the silicone oil, and other common hydraulic oils also exhibit similar behavior.

The jet flow (particularly circulating flow) of the fluid thus produced functions as shear stress against a motion of the fluid which crosses at right angles to the direction of voltage application.

According to the invention, therefore, the flow properties of the fluid against the flocked electrode can be easily controlled by application of a voltage between the electrodes. Moreover, the control of the flow properties can be extremely precisely carried out by controlling the voltage applied between the electrodes.

In the invention, further, the flow properties can be controlled by using an ordinary dielectric fluid as it is, without adding particles or the like, and by incorporating the electrodes into the existing device. Therefore, alteration of equipment on a large scale is unnecessary. In the invention, the electrodes can be moved or can be fixed as shown in FIG. 39. When a fluid is allowed to flow between the fixed electrodes and a voltage is applied therebetween, the flow properties of the fluid which passes between the fixed electrodes can be controlled. That is, relative flow properties of the fluid to the electrodes can be controlled by the method of the invention.

The control method of the invention can be widely applied to various industries, and can be made to serve as a hydraulic valve having no slide member and controllable by a voltage in the hydraulic mechanism using ordinary hydraulic oil. Further, the control method of the invention can be applied to automobile parts such as clutch and shock absorber, industrial machine parts and vibration-damping mechanism.

The method of controlling flow properties of a fluid according to the invention is to control flow properties of a fluid by applying a voltage to a dielectric fluid through uneven surface electrode, as described above, but this method can be variously modified.

For example, various additives, such as antioxidant, stabilizer, colorant, anti-corrosive agent, viscosity modifier, antiseptic agent, mildew-proofing agent, solvent, flowability adjusting agent and surface active agent, can be added to the fluid employable in the invention, though addition of those components is not always necessary.

EFFECT OF THE INVENTION

The micromotor of the invention is extremely small, and the thin micromotor of the invention is extremely thin. In spite of the small or thin micromotor, it can be driven at a high rotational speed of several hundreds to several tens of thousands rpm. The micromotor of the invention hardly generates heat even when it rotates at a high speed.

The micromotor and the linear motor of the invention utilize jet flow of an electro-sensitive movable fluid produced in an electric field, but not magnetic force or magnetic field, and therefore they are normally driven even in a strong magnetic field and generate none of magnetism, driving noise and electromagnetic noise.

The linear motor of the invention is driven by such an entirely new mechanism that a direct-current-voltage is applied in such a manner that an ununiform electric field is formed in a specific electro-sensitive movable fluid. The linear motor can be more efficiently driven by making the size smaller, and the linear motor hardly generates heat.

There is also provided by the invention a micropump of an entirely new mechanism comprising a specific electro-sensitive movable fluid and electrodes. This micropump is driven by applying a voltage to the electro-sensitive movable fluid and does not have such a driving means as used in the conventional pumps. Therefore, the micropump can be easily miniaturized and can be easily incorporated in the conventional microactuators and pumps. Further, since the micropump uses no magnetic force as the driving force, it can be driven even in a strong magnetic field.

The micropump of the invention can be used as a circulating pump, a transfer pump or a jet pump of an electro-sensitive movable fluid. By bringing the jet flow of the electro-sensitive movable fluid produced by the micropump into contact with the target, heat energy exchange between the target and the electro-sensitive movable fluid can be carried out. For example, when the temperature of the target is higher than that of the electro-sensitive movable fluid, the micropump can be used as a means to cool the target. When the micropump of the invention is incorporated in a microactuator using a shape-memory alloy as a driving source, this micropump can be used as a means to cool the shape-memory alloy. Since the microactuator of the invention uses no electromagnetic motor, it can be favorably driven even in a strong magnetic field.

The micropump of the invention can be incorporated in a small-sized apparatus wherein a conventional micropump using an electromagnetic motor cannot be incorporated. Moreover, since the micropump of the invention does not have any driving means which easily causes troubles, it can be used continuously for a long period of time.

In the method of controlling flow properties of a fluid according to the invention, flow properties of a substantially dielectric fluid can be controlled by the use of a flocked electrode. Since it is unnecessary to add particles or the like to the fluid employable in the invention, sedimentation or flotation of particles does not take place. Further, since a conventional dielectric fluid is available, the method is economically advantageous. Furthermore, the shear stress produced by the invention has hydrodynamic continuity, is free from yield stress which indicates solidification and has ease of controlling, so that the apparatus used in the method can be simplified.

EXAMPLE

The present invention is further described with reference to the following examples, but it should be construed that the invention is in no way limited to those examples.

Example 1

A SE type ECF motor having a structure shown in FIG. 2(A) was fabricated. That is, as a fluid container of the SE type ECF motor, a cylinder having an inner diameter of 16 mm and a depth of 3.5 mm was used. The bottom surface of the cylinder and the lower surface of a lid each was provided with four pairs of electrodes in such a manner that the angle between a pair of electrodes (positive electrode and negative electrode) was 22.5° and the angle between the adjacent positive electrodes was 90°.

A circular film having a rotating shaft at its center and having a diameter of 15 mm was used as a rotator. As the flow receiving members, 8 convex bars each having a section of right-angled triangle were attached to the upper surface of the circular film, and 8 convex bars having the same section as above were attached to the lower surface of the circular film (total number of bars: 16).

The fluid container was filled with 16 ml of dibutyl decanedioate (DBD).

Then, a direct-current-voltage of 6.0 kV was applied between the electrodes of the thus fabricated SE type ECF motor. As a result, the rotator of the SE type ECF motor underwent steady rotation at 510 rpm, and the rotator (SE type ECF motor) continued to rotate stably during the application of a voltage. The intensity of the current in DBD was 2.0 $\mu$A, and the rotational direction was the same as the flow direction of DBD (i.e., direction of the positive electrode to the negative electrode). When the polarities of the electrodes between which the voltage was applied were reversed, the rotator 30 rotated at the same rotational speed in the opposite direction, and the intensity of the current was the same as above.

Example 2

The SE type ECF motor was driven in the same manner as in Example 1, except that the rotator having a flow receiving member consisting of 16 convex bars was replaced with a rotator having a flow receiving member consisting of 8 convex bars (4 convex bars each having a section of right-angled triangle attached to the upper surface and 4 convex bars having the same section attached on the lower surface). As a result, the SE type ECF motor underwent steady rotation at 340 rpm, and the rotational direction was the same as in Example 1.

Example 3

The SE type ECF motor was driven in the same manner as in Example 1, except that linalyl acetate was used in place of the dibutyl decanedioate (DBD). As a result, the SE type ECF motor underwent steady rotation at 740 rpm, the intensity of the current was 1.8 $\mu$A, and the rotational direction was the same as the flow direction of the linalyl acetate (i.e., direction of the positive electrode to the negative electrode).

Example 4

The SE type ECF motor was driven in the same manner as in Example 1, except that dibutyl dodecanedioate was used in place of the dibutyl decanedioate (DBD). As a result, the SE type ECF motor underwent steady rotation at 480 rpm, the intensity of the current was 1.8 $\mu$A, and the rotational direction was the same as the flow direction of the dibutyl dodecanedioate (i.e., direction of the positive electrode to the negative electrode).

Example 5

An engineering plastic (insulating material) was cut to prepare a rotator having a diameter of 19 mm and a thickness of 1.0 mm. The rotator had at its center a rotating shaft (diameter: 1.0 mm) united to the rotator in one body.

The united product of the rotator and the rotating shaft was provided with electrodes by means of electroless nickel plating, as shown in FIG. 5. The electrodes had a thickness of 5 $\mu$m.

The united product consisting of the rotator and the rotating shaft and provided with the electrodes was incorporated in a housing having an inner diameter of 22 mm and a depth of 4 mm, as shown in FIG. 4(A), and the housing was filled with 1 ml of dibutyl decanedioate (DBD).

Then, a direct-current-voltage of 6.0 kV was applied between the electrodes of the thus fabricated RE type ECF motor. As a result, the rotator of the RE type ECF motor underwent steady rotation at 320 rpm, and the rotator (RE type ECF motor) continued to rotate stably during the application of a voltage. The intensity of the current in DBD was 1.5 $\mu$A, and the rotational direction was a direction of the reaction of the jet flow produced between the electrodes provided on the rotator. When the polarities of the electrodes between which the voltage was applied were reversed, the rotator rotated at the same rotational speed in the opposite direction, and the intensity of the current was the same as the above.

Example 6

The RE type ECF motor was driven in the same manner as in Example 5, except that linalyl acetate was used in place of the dibutyl decanedioate (DBD). As a result, the RE type ECF motor underwent steady rotation at 440 rpm, and the intensity of the current was 1.4 $\mu$A.

Example 7

The RE type ECF motor was driven in the same manner as in Example 5, except that dibutyl dodecanedioate was used in place of the dibutyl decanedioate (DBD). As a result, the RE type ECF motor underwent steady rotation at 300 rpm, and the intensity of the current was 1.5 $\mu$A.

Example 8

Figure 19:
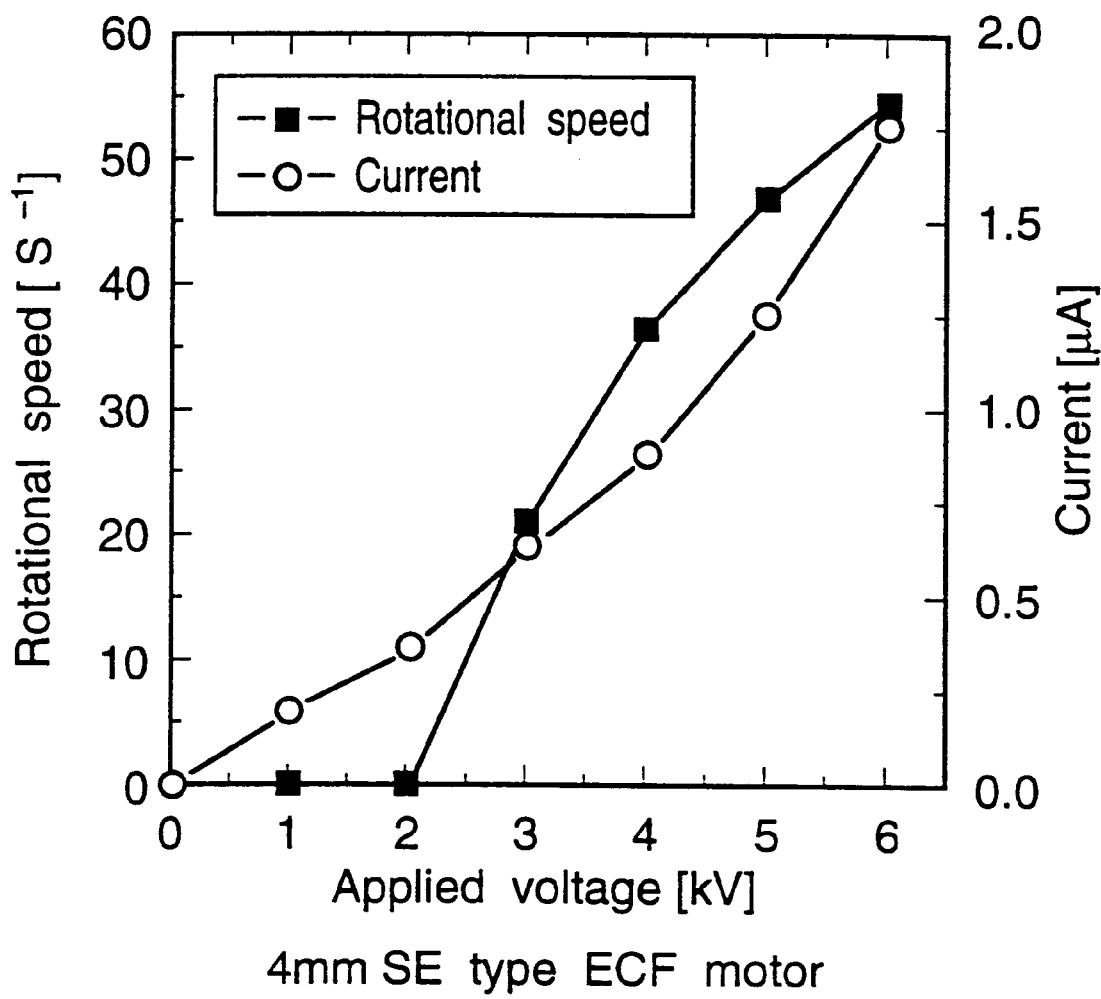
FIG. 19 is a graph showing a relation among applied voltage, rotational speed and current in the SE type ECF motor having a diameter of 4 mm.

Using the SE type ECF motor shown in FIG. 9 and FIG. 10, properties given when the size of the motor was made smaller were examined. The SE type ECF motor used herein was one having a medium container 211 (inner diameter: 4 mm) made of an engineering plastic and a vane rotor 230 with 8 vanes made of a polyester film (thickness: 0.5 mm). This SE type ECF motor is referred to as "4 mm SE type ECF motor" hereinafter. In the bearing section of the 4 mm SE type ECF motor, a bearing means was incorporated. As the electro-sensitive movable fluid, dibutyl decanedioate (DBD) was used. FIG. 19 shows a relation between applied voltage, rotational speed and current in the 4 mm SE type ECF motor.

Separately, a SE type ECF motor having the same structure as that of the 4 mm SE type ECF motor but having a double size (inner diameter of fluid container: 8 mm) was prepared. This SE type ECF motor is referred to as "8 mm SE type ECF motor" hereinafter. As the electro-sensitive movable fluid, dibutyl decanedioate (DBD) was used.

Figure 18:
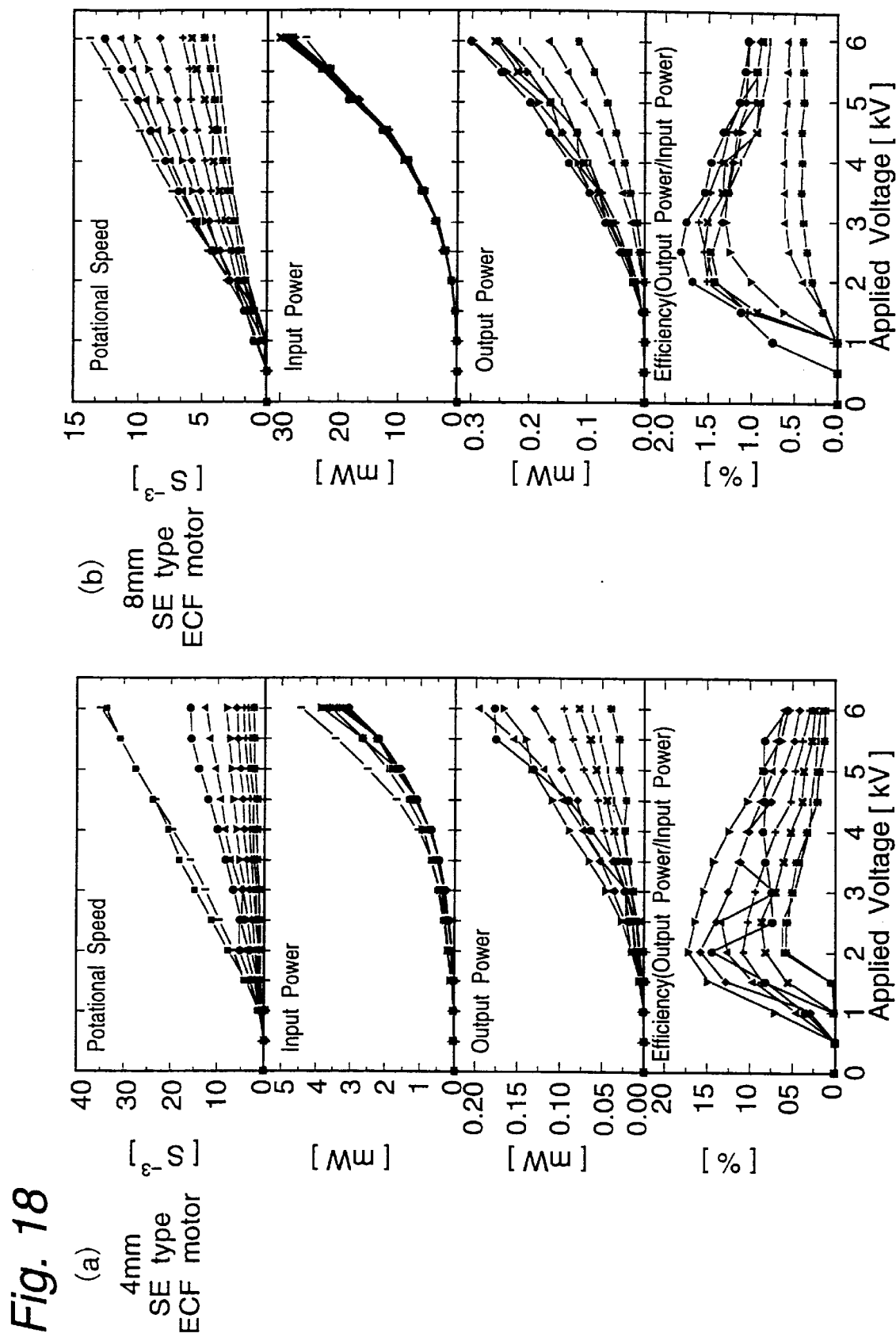
FIGS. 18A–B is a graph showing a relation between applied voltage and rotational speed, input power, output power or efficiency in two SE type ECF motors having different diameters.

A direct-current-voltage of 0 to 6 kV was applied to each of the 4 mm SE type ECF motor and the 8 mm SE type ECF motor, to measure rotational speed, input power and output power of the SE type ECF motors at each voltage. From the input power and the output power, the efficiency (output power/input power) of the 4 mm SE type ECF motor and the 8 mm SE type ECF motor was calculated. The results are shown in FIG. 18. FIG. 18(A) shows the rotational speed, input power, output power and efficiency of the 4 mm SE type ECF motor. FIG. 18(B) shows the rotational speed, input power, output power and efficiency of the 8 mm SE type ECF motor. The input power was determined by the applied voltage and the current, and the output power was determined by the torque and the number of rotations.

As is clear from FIG. 18(A), the maximum value of the efficiency of the 4 mm SE type ECF motor was 17% at an applied voltage of 2 kV. On the other hand, the maximum value of the efficiency of the 8 mm SE type ECF motor was about 1.7%. That is, the efficiency of the micromotor of the invention became 10 times by reducing the diameter of the micromotor to ½ of the initial diameter.

Then, the maximum output power density of the 4 mm SE type ECF motor and that of the 8 mm SE type ECF motor were determined. The 4 mm SE type ECF motor had a motor volume (sectional area of motor at its inner diameter×length of rotor) of $7.5×10^{-8}$ m$^3$, so that the maximum output power density of the 4 mm SE type ECF motor became $2.6×10^3$ W/m$^3$. The 8 mm SE type ECF motor had a motor volume of $7×10^{-7}$ m$^3$, so that the maximum output power density of the 8 mm SE type ECF motor became $4×10^2$ W/m$^3$. Therefore, the 4 mm SE type ECF motor was confirmed to have an output power density of about 7 times as much as the 8 mm SE type ECF motor.

Further, the efficiency was measured in the same manner as above, except that linalyl acetate (electro-sensitive movable fluid) was filled in the 4 mm SE type ECF motor in place of the dibutyl decanedioate (DBD). As a result, it was confirmed that the maximum efficiency reached about 40%.

The driving of the SE type ECF motor mentioned above is one embodiment of the driving of the micromotor according to the invention, and other than the SE type ECF motor, various motors such as RE type ECF motor and cup type ECF motor can be driven similarly to the above. Even when other micromotors are driven, the same tendency as in the SE type ECF motor can be obtained.

Example 9

A SE type ECF linear motor having a structure shown in FIG. 20 was fabricated. That is, between an outer cylinder having an inner diameter of 25 mm and a length of 38 mm and an inner cylinder having an outer diameter of 16 mm and a length of 35 mm, a pair of coil electrodes was arranged in such a manner that the coil electrodes were wound 4 times around the inner cylinder and that an ununiform electric field was formed in the electro-sensitive movable fluid. In other words, the pair of electrodes was arranged so that the distance between an electrode and its one adjacent electrode was 2 mm and the distance between the electrode and the other adjacent electrode was 4 mm and that an ununiform electric field was formed. In the inner cylinder (inner diameter: 12 mm), a piston (diameter: 9.7 mm) fixed to the driving shaft was disposed. Then, the fluid container thus formed was filled with about 13 ml of linalyl acetate.

When a direct-current-voltage of 9.0 kV was applied between the pair of coil electrodes of the SE type ECF linear motor, the piston began to move. The moving rate of the piston was measured by means of a laser displacement sensor meter. The results are shown in FIG. 25.

Figure 25:
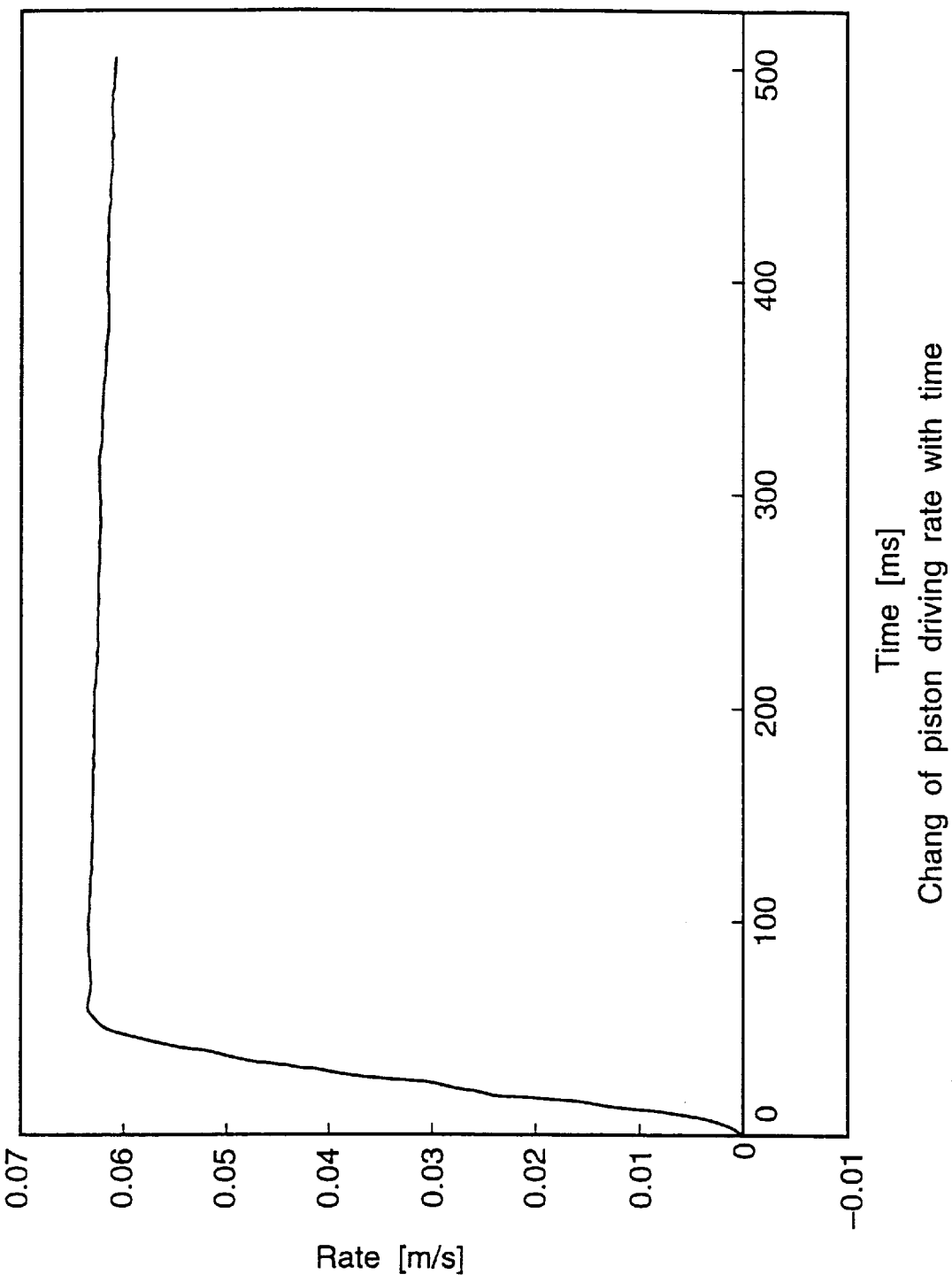
FIG. 25 is a graph showing a relation between driving rate of a piston and time in the SE type ECF linear motor.

As is clear from FIG. 25, the piston began to accelerate immediately after application of a voltage, and after about 40 ms, the moving rate reached 0.065 m/s, followed by equilibrium state. The intensity of the current was 2.0 µA.

The moving direction of the piston was the same as the direction of the jet flow of the linalyl acetate produced between the coil electrodes, that is, the direction of the positive electrode to the negative electrode.

The laser displacement sensor meter used was that of LB series (available from Keyence Co.) using a sensor head of LB-02 and an amplifier of LB-06. The measurement was carried out in the measuring range of ±10 mm.

If the polarities of the electrodes are reversed in the SE type ECF linear motor, the piston moves in the opposite direction.

Example 10

The SE type ECF linear motor was driven in the same manner as in Example 9, except that dibutyl decanedioate was used in place of the linalyl acetate.

As a result, the piston began to accelerate immediately after application of a voltage, and after about 50 ms, the moving rate reached 0.47 m/s, followed by equilibrium state. The intensity of the current was 2.2 µA. The moving direction of the piston was the same as the direction of the jet flow of the dibutyl decanedioate produced between the coil electrodes, that is, the direction of the positive electrode to the negative electrode.

Example 11

The SE type ECF linear motor was driven in the same manner as in Example 9, except that dibutyl dodecanedioate was used in place of the linalyl acetate.

As a result, the piston began to accelerate immediately after application of a voltage, and after about 50 ms, the moving rate reached 0.45 m/s, followed by equilibrium state. The intensity of the current was 2.1 µA. The moving direction of the piston was the same as the direction of the jet flow of the dibutyl dodecanedioate produced between the coil electrodes, that is, the direction of the positive electrode to the negative electrode.

Example 12

In a cylinder having an inner diameter of 12 mm and a length of 35 mm, a driving shaft equipped with two circular mesh electrode plates each having a diameter of 10 mm was arranged. The two mesh electrode plates had a mesh size of 1 mm, and they were arranged in such a manner that they faced each other at a distance of 2.5 mm and were electrically insulated from each other.

The cylinder was filled with about 4 ml of linalyl acetate to prepare a PE Type ECF linear motor. The two circular mesh electrode plates of the motor were set to a positive electrode and a negative electrode, and a direct-current-voltage of 9.0 kV was applied between the electrodes. The circular mesh electrode plates began to move toward the positive electrode immediately after application of a voltage, and after about 30 ms, the moving rate reached 0.38 m/s, followed by equilibrium state. The intensity of the current was 1.7 µA.

The jet flow of the linalyl acetate was produced in the direction of the positive electrode to the negative electrode, while the circular mesh electrode plates were moved in the direction of the reaction of the jet flow (i.e., opposite direction to the direction of the jet flow).

Example 13

The PE type ECF linear motor was driven in the same manner as in Example 12, except that dibutyl decanedioate was used in place of the linalyl acetate.

As a result, the circular mesh electrode plates began to accelerate immediately after application of a voltage, and after about 40 ms, the moving rate reached 0.25 m/s, followed by equilibrium state. The intensity of the current was 2.0 µA. The jet flow of the dibutyl decanedioate was produced in the direction of the positive electrode to the negative electrode, while the circular mesh electrode plates were moved in the direction of the reaction of the jet flow (i.e., opposite direction to the direction of the jet flow).

Example 14

The PE type ECF linear motor was driven in the same manner as in Example 12, except that dibutyl dodecanedioate was used in place of the linalyl acetate.

As a result, the circular mesh electrode plates began to accelerate immediately after application of a voltage, and after about 40 ms, the moving rate reached 0.22 m/s, followed by equilibrium state. The intensity of the current was 2.0 µA. The jet flow of the dibutyl dodecanedioate was produced in the direction of the positive electrode to the negative electrode, while the circular mesh electrode plates were moved in the direction of the reaction of the jet flow (i.e., opposite direction to the direction of the jet flow).

Example 15

An apparatus shown in FIG. 31 was fabricated. That is, four pairs (8 lines) of shape-memory alloy lines 312 were stretched between a driving plate 332 and a lower fixed plate 331 in a casing 313 having a diameter of 15 mm. To the driving plate 332, a driving shaft 322 was joined, and the driving shaft 322 was extended outside from the center of an upper lid 333 of the casing 313. On the inner surface of the casing 313, four pairs (8 lines) of electrodes 320 were stretched in the vertical direction. The casing 313 was filled with dibutyl decanedioate (DBD) ($\sigma=1.35\times10^{-9}$ S/m, $\eta=7.0\times10^{-3}$ Pa·s) as the electro-sensitive movable fluid 314. The driving shaft 322 was provided with a coil spring having a spring constant of 1.9 N/mm as the spring 324, and was equipped with a linear potentiometer (not shown) for measuring output displacement (measuring range: 0–1 mm).

The current applied to the shape-memory alloy lines was controlled by a personal computer, and the output voltage measured by the linear potentiometer was controlled by the same computer after A/D conversion. The sampling frequency was 1 KHz.

A direct-current-voltage of 3 kV was applied between the electrodes 320 of the above apparatus to drive a micropump incorporated in the apparatus and thereby produce a jet flow of the DBD in the casing 313. Then, a pulse current of 0.9 W was applied to the shape-memory alloy lines 312, and the amplitude displacement was measured when the steady state was reached. In this measurement, the pulse width of the pulse current applied to the shape-memory alloy lines was 20 ms, and a state where the change of the amplitude displacement became 3% was taken as the steady state.

Figure 34:
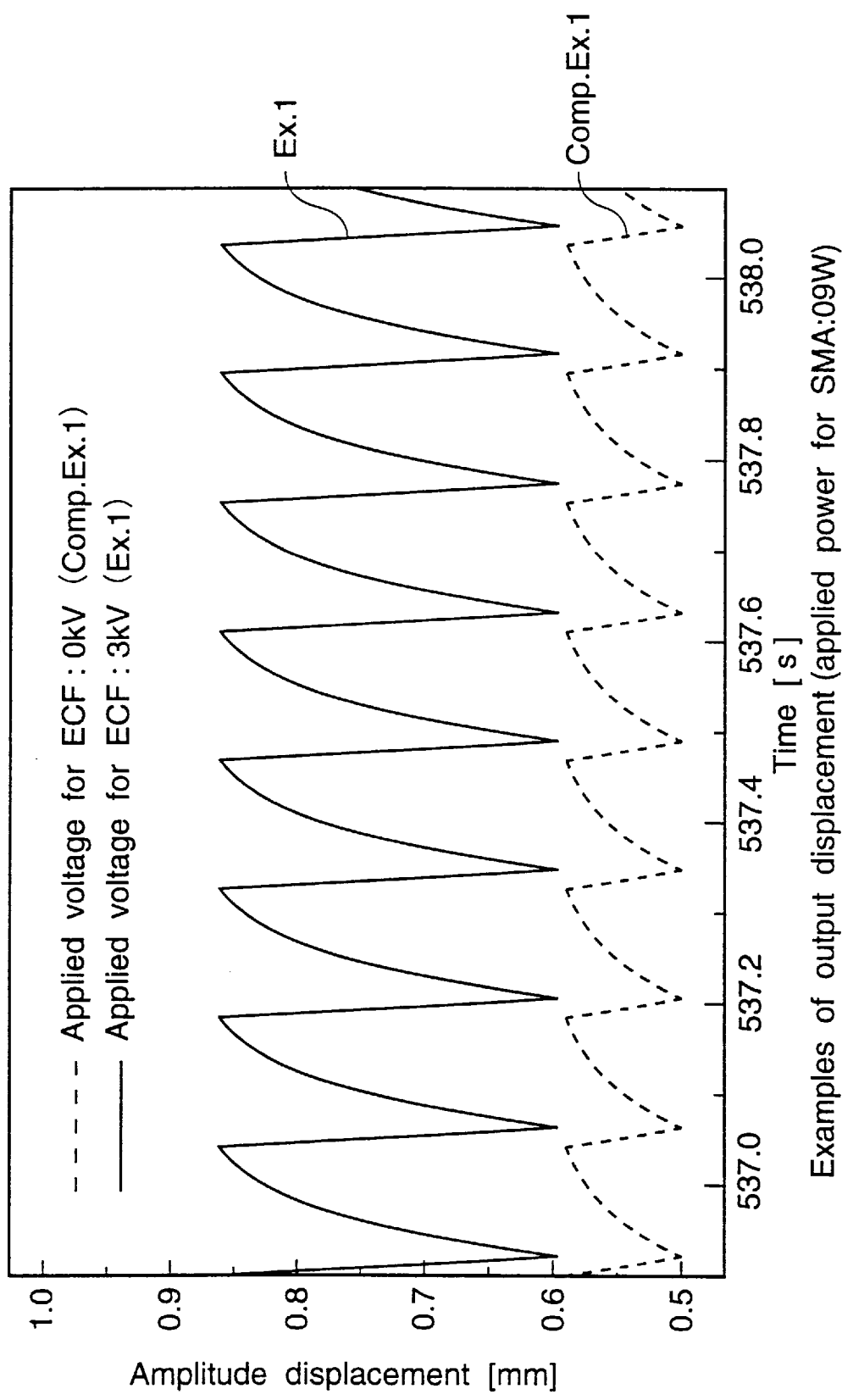
FIG. 34 is a graph showing amplitude displacement given when the apparatus shown in FIG. 31 is used.

The amplitude displacement is shown in FIG. 34.

Figure 35:
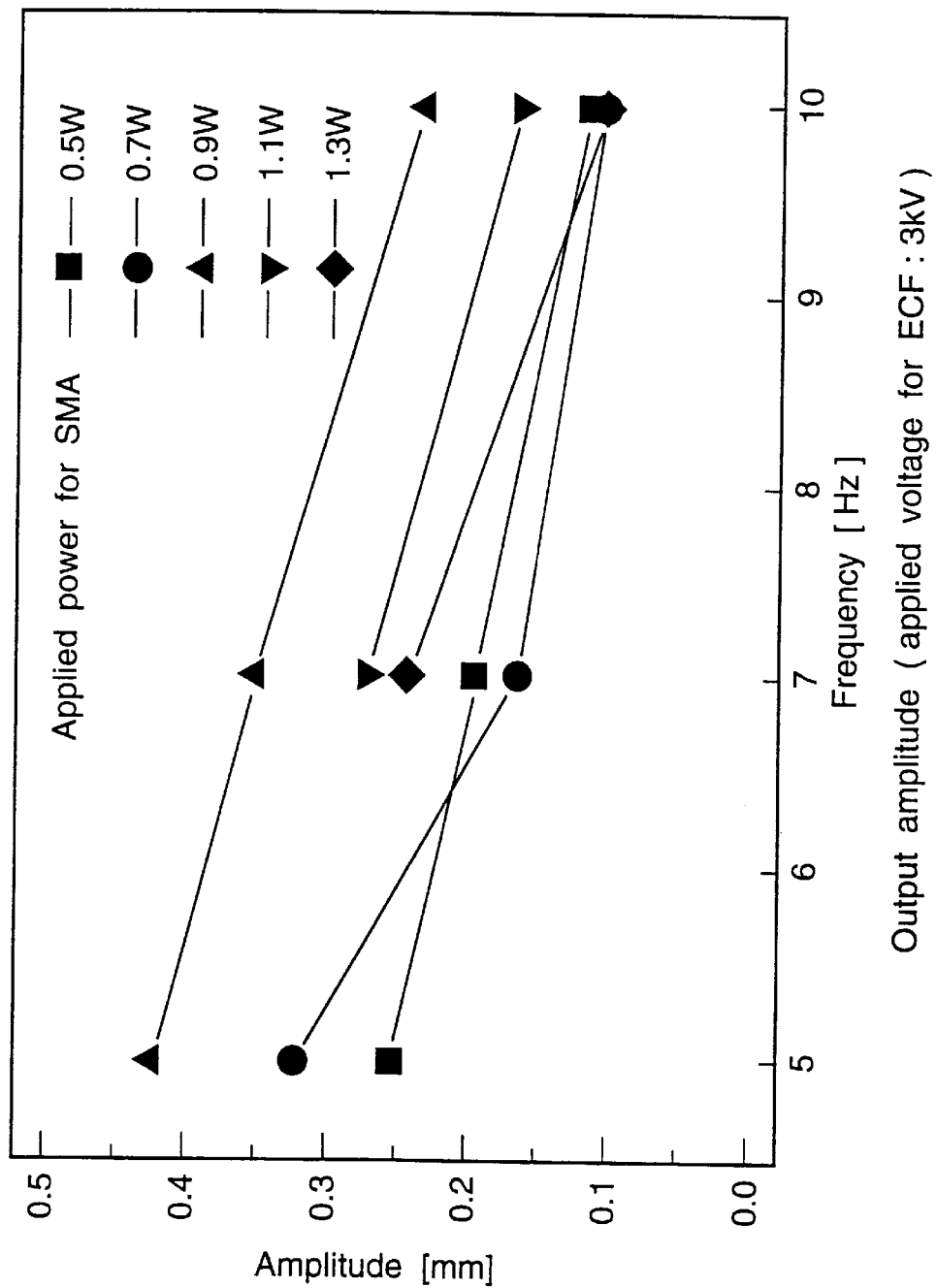
FIG. 35 is a graph showing variation of amplitude given when the power supplied to the shape-memory alloy lines is varied to 0.5 W, 0.7 W, 0.9 W or 1.1 W or 1.3 W.

Further, the power applied to the shape-memory alloy lines was varied to 0.5 W, 0.7 W, 1.1 W or 1.3 W to measure variation of the amplitude. The results are shown in FIG. 35.

Comparative Example 1

The amplitude displacement was measured in the same manner as in Example 15, except that no voltage was applied between the electrodes 320 so that the micropump was not driven, and the same power was applied to the shape-memory alloy lines.

The result is shown in FIG. 34.

Example 16

The amplitude displacement was measured in the same manner as in Example 15, except that the arrangement of the electrodes 320 was varied to that shown in FIG. 32 so as to produce a jet flow of the DBD in the vertical direction by means of the micropump.

Figure 36:
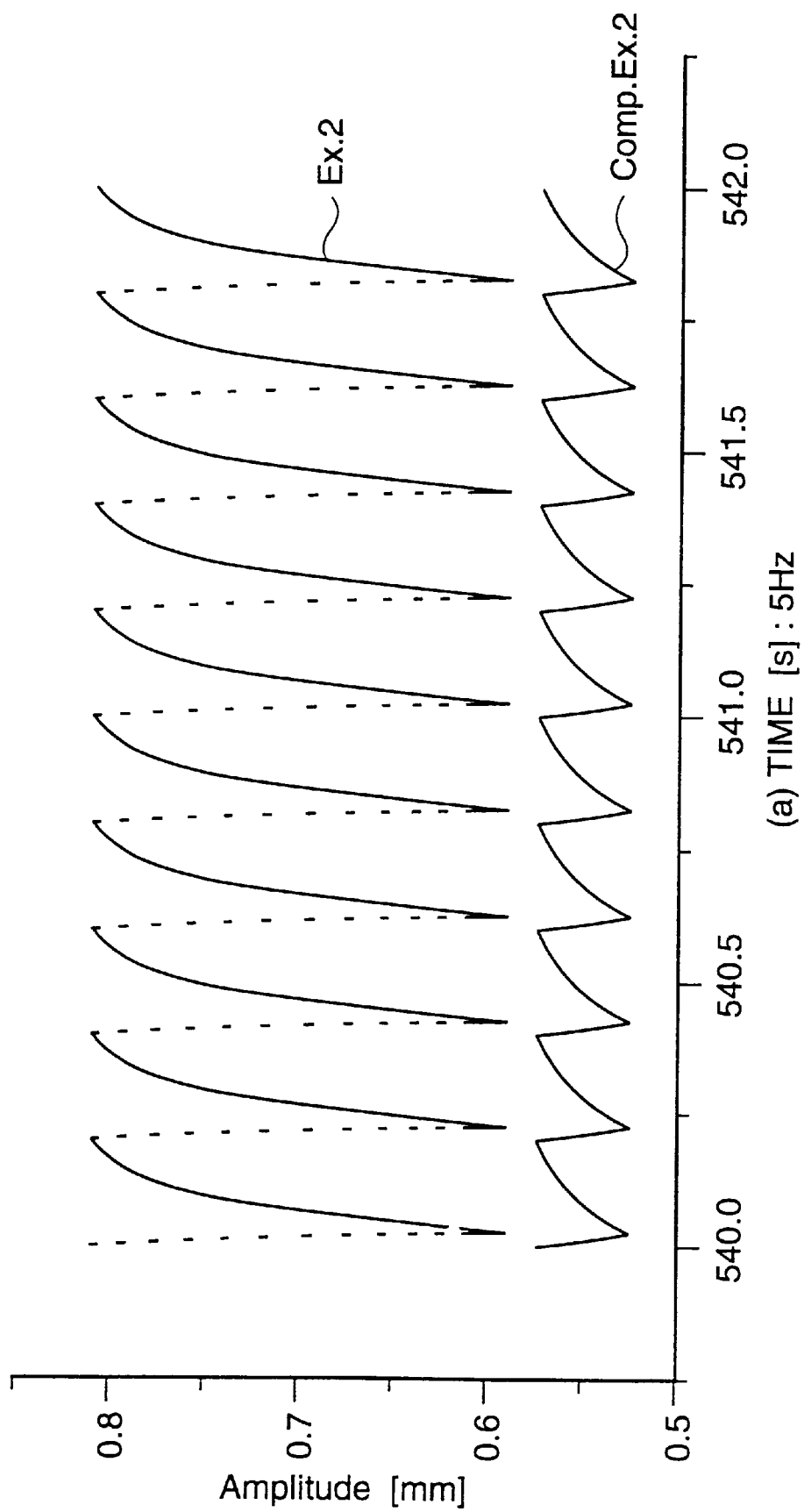
FIG. 36 is a graph showing amplitude displacement given when the apparatus shown in FIG. 32 is used.

The result is shown in FIG. 36.

Comparative Example 2

The amplitude displacement was measured in the same manner as in Example 16, except that no voltage was applied between the electrodes 320 so that the micropump was not driven, and the same power was applied to the shape-memory alloy lines.

The result is shown in FIG. 36.

Example 17

Figure 37:
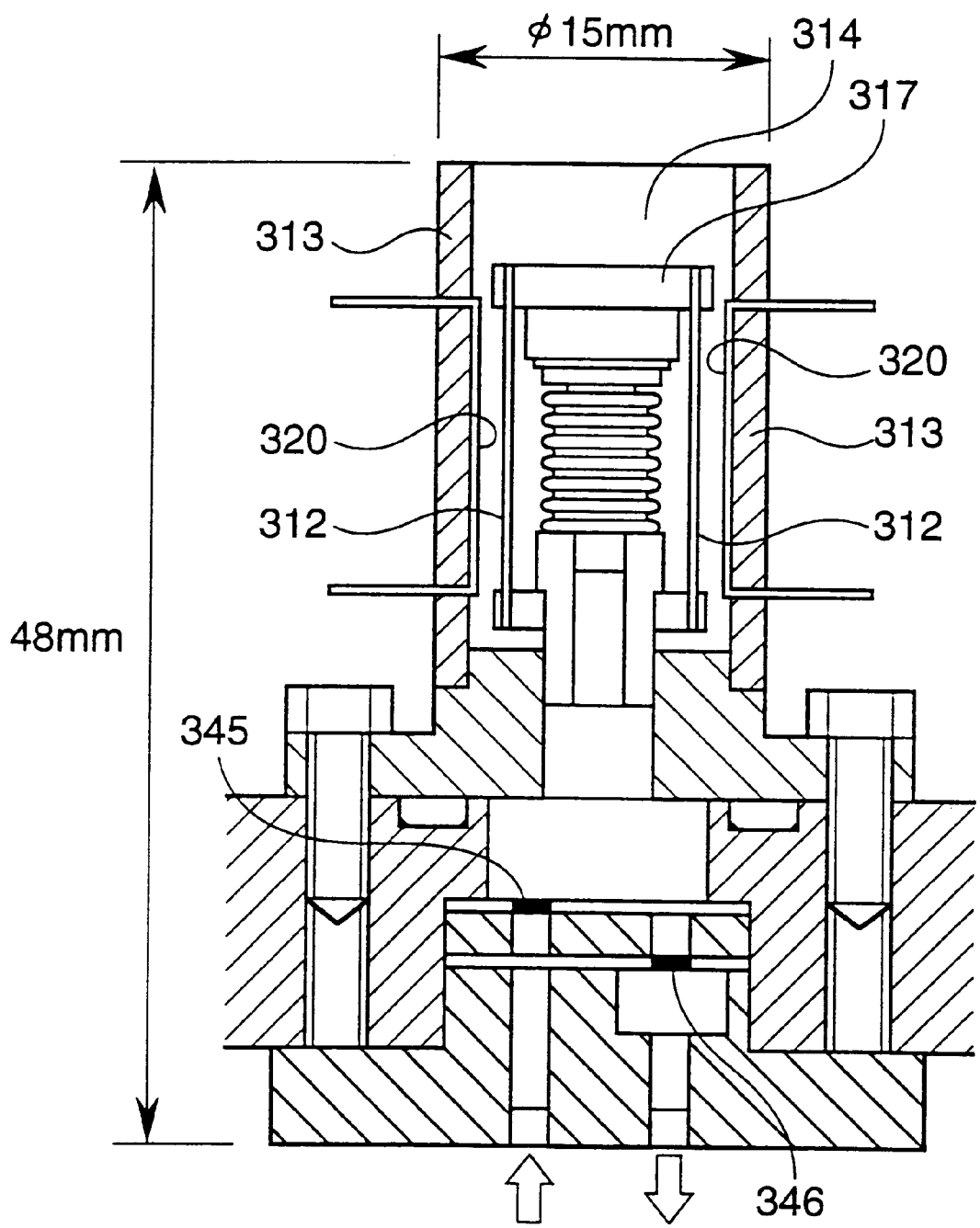
FIG. 37 is a view showing a structure of the microactuator used in Example 17.

A microactuator shown in FIG. 37 was fabricated. That is, a casing 313 was placed on a substrate 318, and a pump chamber was formed from a bellows 341. The substrate 318 having the bellows 341 thereon was provided with a suction valve 345 made of a rubber having a thickness of 0.2 mm and a discharge valve 346 made of a rubber having a thickness of 0.2 mm. By virtue of expansion and contraction of the bellows 341, a fluid (tap water in Example 17) can be made to be suctioned or discharged. Between the upper end of the bellows 341 and the substrate 318, eight shape-memory alloy lines 312 were stretched. The bellows 341 is formed from an elastic material, and therefore when a power is not supplied to the shape-memory alloy lines 312, the shape-memory alloy lines are strained because of the elastic recovery of the bellows 341. On the inner surface of the casing 313, eight electrodes 320 were provided, and these electrodes 320 were set to positive electrode and negative electrode alternately. The casing 13 was filled with DBD.

A direct-current-voltage of 3 kV was applied between the electrodes 320 to produce a jet flow of DBD (electro-sensitive movable fluid 314) in the circumferential direction of the casing 313.

Then, a pulse current (pulse width: 20 ms) of 0.5 W was applied to the shape-memory alloy lines 312, to measure the amount (flow rate) of the discharged tap water by means of a measuring cylinder.

Further, a pulse current (pulse width: 20 ms) of 0.7 W or 0.9 W was applied to the shape-memory alloy lines 312, to measure the amount (flow rate) of the discharged tap water in a manner similar to the above.

Figure 38:
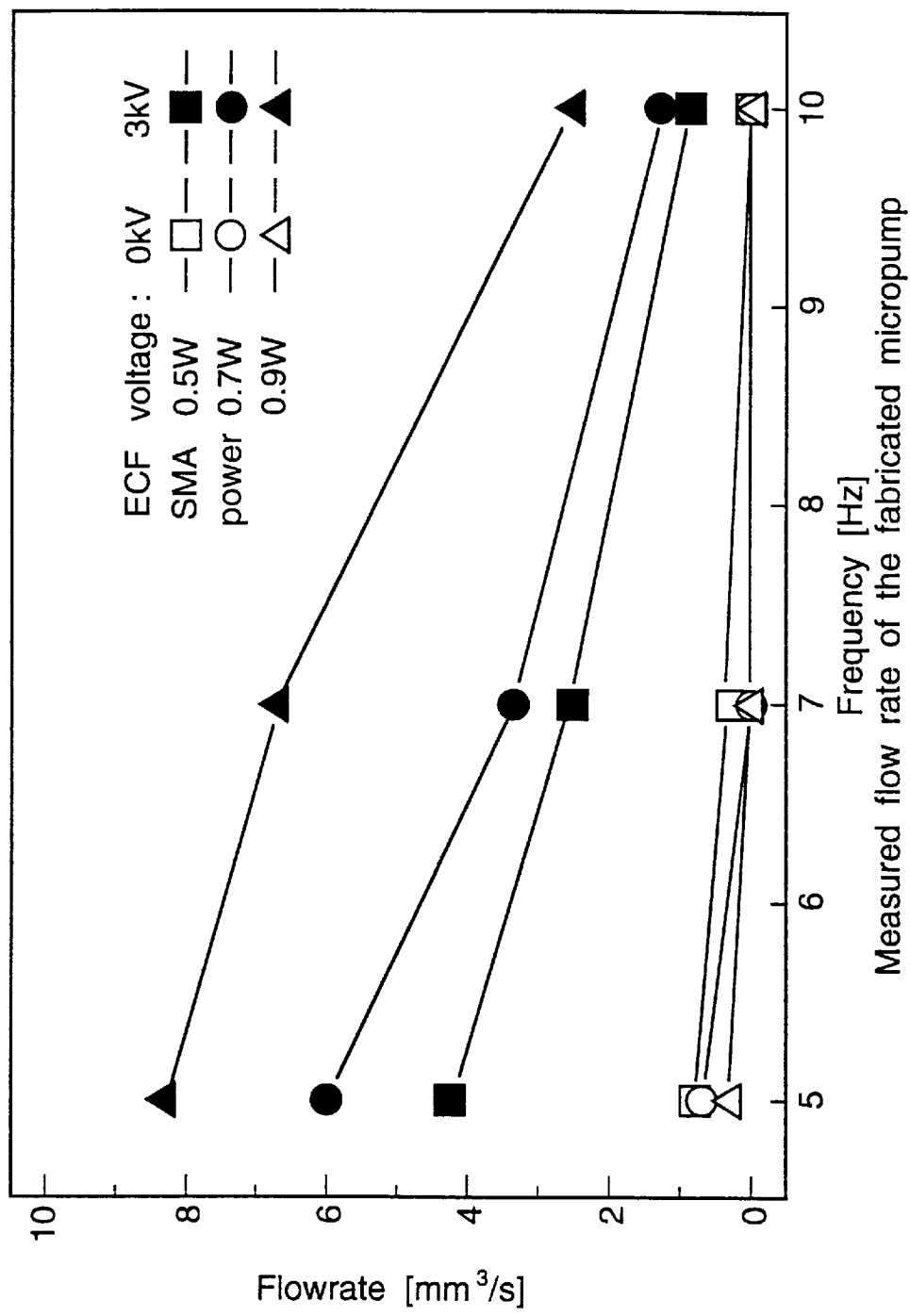
FIG. 38 is a graph showing flow rate of the discharged liquid in the microactuator used in Example 17.

The results are shown in FIG. 38.

Comparative Example 3

The amount (flow rate) of the discharged water was measured in the same manner as in Example 17, except that no voltage was applied between the electrodes 320.

The results are shown in FIG. 38.

Example 18

A circular flat metallic plate having a diameter of 35 mm was coated with a flocking glue in a thickness of 0.1 mm, and the glue layer is flocked with rayon fibers having a length of 1.0 mm and a fineness of 3 deniers (trade name: Corona, available from Daiwa Spinning Co., Ltd.) in an electric field of 30,000 V by an electrostatic flocking method, to obtain a rayon fiber flocked electrode plate. The number of fibers per $cm^2$ was 8,200.

In a container, the rayon fiber flocked electrode plate was arranged as an upper circular plate of a parallel flat plate type measuring sensor. Below the rayon fiber flocked electrode, a lower electrode was arranged at a distance of 0.5 mm from the tips of the fibers. Then, the container was filled with a silicone oil having a viscosity of 0.1 Pa·s at room temperature.

The upper electrode (flocked electrode) arranged as above was rotated to impart shear rates to the silicone oil, and a direct-current-voltage was applied between the flocked electrode (positive electrode) and the lower electrode (negative electrode) to measure a viscosity of the silicone oil at each shear rate and a current in the silicone oil. The results are shown in Table 3 and FIG. 40.

TABLE 3

| Length of fiber (mm) | Fineness of fiber (d) | Applied voltage (kV) | Current ($\mu$A/cm$^2$) |
| --- | --- | --- | --- |
| 1.0 | 3 | 0.25 | <0.1 |
|  |  | 0.5 | 0.1 |
|  |  | 1.0 | 0.3 |
|  |  | 2.0 | 1.5 |

Example 19

Figure 41:
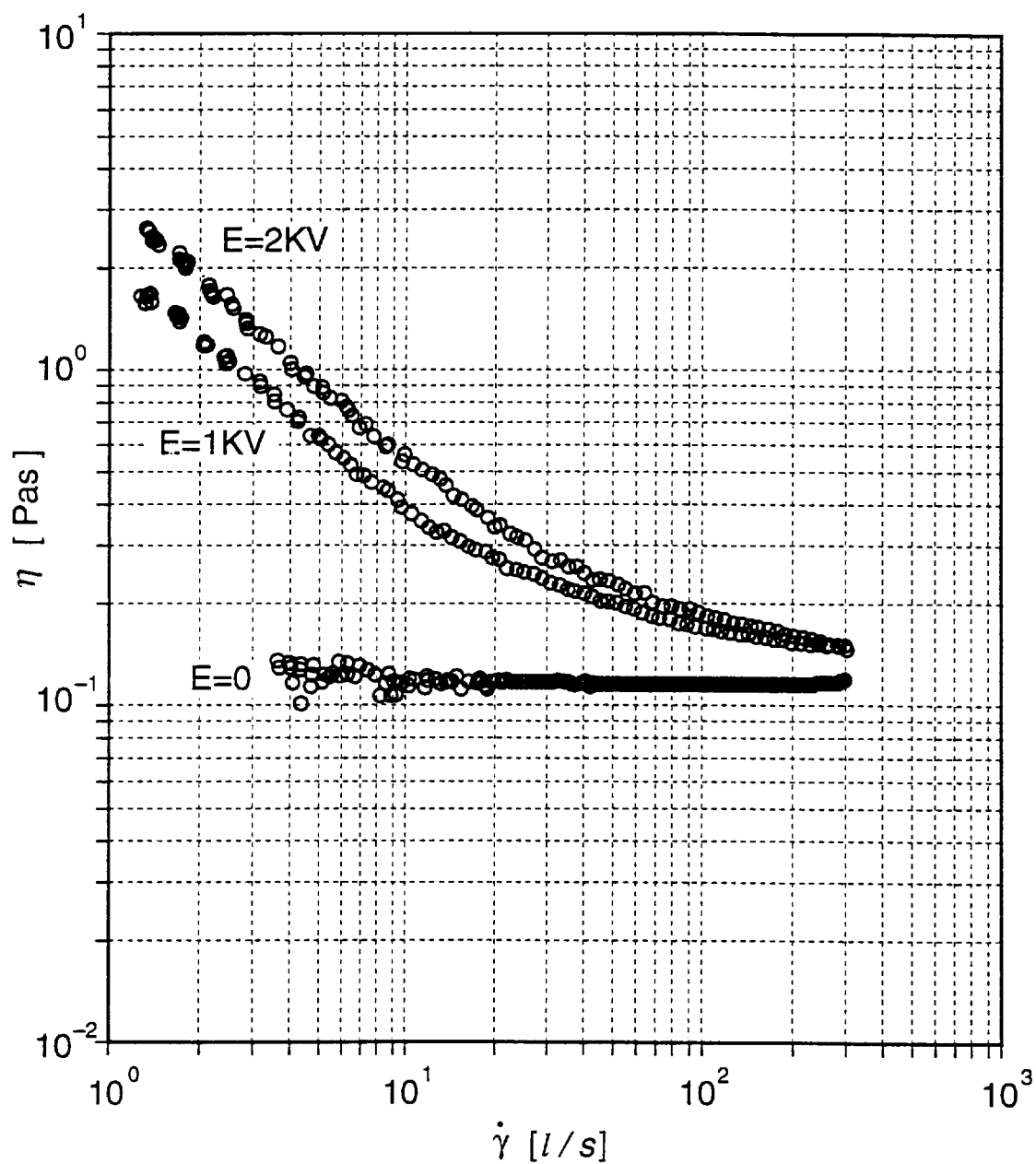

A viscosity of the silicone oil at each shear rate and a current in the silicone oil were measured in the same manner as in Example 1, except that nylon fibers having a length of 1.0 mm and a fineness of 2 deniers (trade name: Toray Nylon, available from Toray Industries, Inc.) were used in place of the rayon fibers having a length of 1.0 mm and a fineness of 3 deniers. The results are shown in Table 4 and FIG. 41.

TABLE 4

| Length of fiber (mm) | Fineness of fiber (d) | Applied voltage (kV) | Current ($\mu$A/cm$^2$) |
| --- | --- | --- | --- |
| 1.0 | 2 | 1.0 | 0.1 |
|  |  | 2.0 | 0.2 |

Example 20

Figure 42:
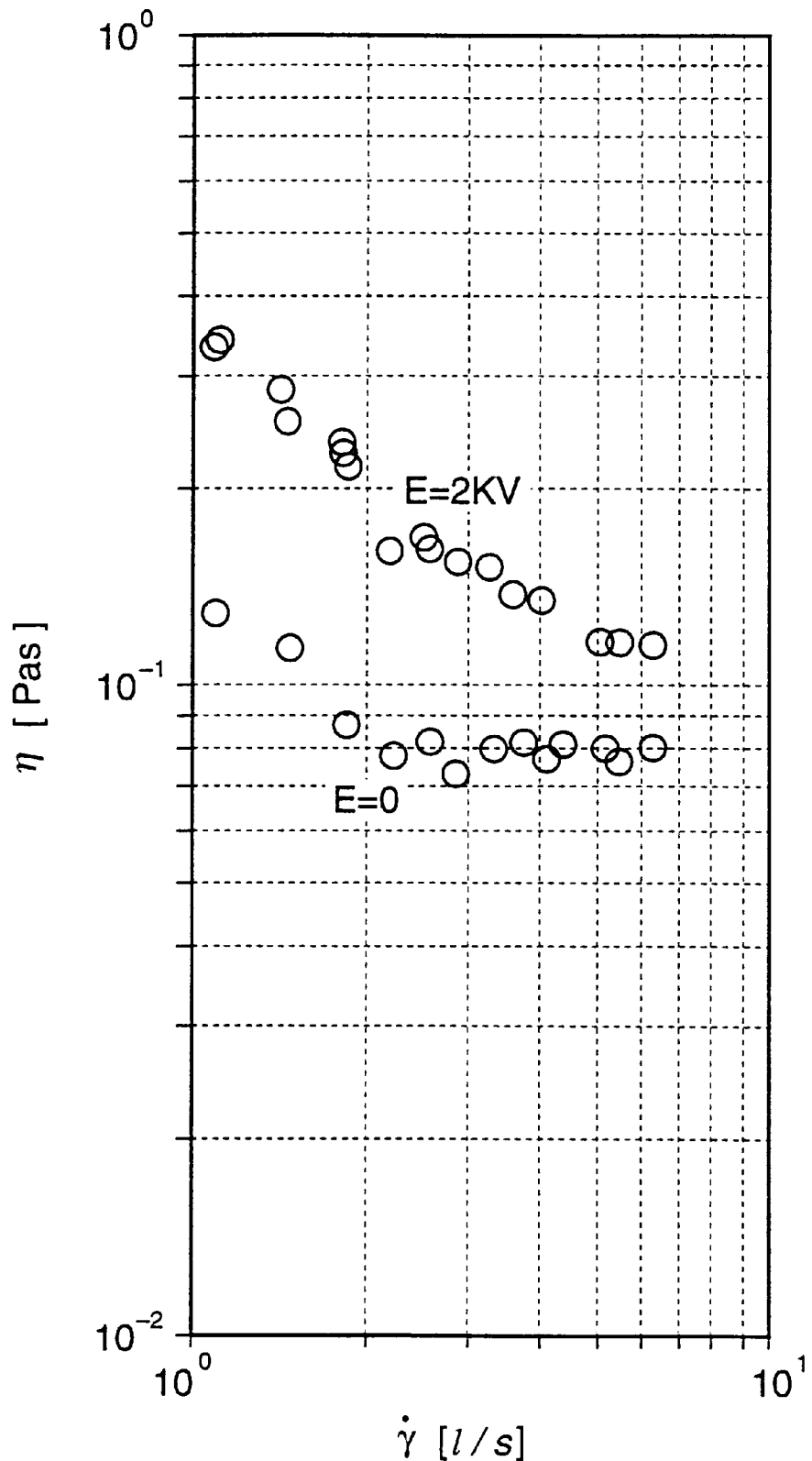

A viscosity of the silicone oil at each shear rate and a current in the silicone oil were measured in the same manner as in Example 18, except that acrylic fibers having a length of 1.0 mm and a fineness of 2 deniers (trade name: Kanekalon, available from Kanegafuchi Chemical Industry Co., Ltd.) were used in place of the rayon fibers having a length of 1.0 mm and a fineness of 3 deniers. The results are shown in Table 5 and FIG. 42.

TABLE 5

| Length of fiber (mm) | Fineness of fiber (d) | Applied voltage (kV) | Current ($\mu$A/cm$^2$) |
| --- | --- | --- | --- |
| 1.0 | 2 | 2.0 | 0.2 |

Example 21

A viscosity of a hydraulic oil at each shear rate and a current in the hydraulic oil were measured in the same manner as in Example 18, except that a hydraulic oil of ISO viscosity grade 32 (conductivity: $6.0 \times 10^{-10}$ s/m, viscosity: $5.9 \times 10^{-2}$ Pa·s, trade name: Daphne Super Hydraulic Fluid 32, available from Idemitsu Kosan Co., Ltd.) was used in place of the silicone oil, and the applied voltage was varied to 0 kV, 1.0 kV, 2.0 kV and 3.0 kV. The results are shown in Table 6 and FIG. 43.

Example 22

A viscosity of a hydraulic oil at each shear rate and a current in the hydraulic oil were measured in the same manner as in Example 18, except that nylon fibers having a length of 1.0 mm and a fineness of 2 deniers (trade name: Toray Nylon, available from Toray Industries, Inc.) were used in place of the rayon fibers, and a hydraulic oil of ISO viscosity grade 32 (conductivity: $6.0 \times 10^{-10}$ s/m, viscosity: $5.9 \times 10^{-2}$ Pa·s, trade name: Daphne Super Hydraulic Fluid 32, available from Idemitsu Kosan Co., Ltd.) was used in place of the silicone oil. The results are shown in Table 6 and FIG. 44.

Example 23

A viscosity of a hydraulic oil at each shear rate and a current in the hydraulic oil were measured in the same manner as in Example 18, except that acrylic fibers having a length of 1.0 mm and a fineness of 2 deniers (trade name: Kanekalon, available from Kanegafuchi Chemical Industry Co., Ltd.) were used in place of the rayon fibers, and a hydraulic oil of ISO viscosity grade 32 (conductivity: $6.0 \times 10^{-10}$ s/m, viscosity: $5.9 \times 10^{-2}$ Pa·s, trade name: Daphne Super Hydraulic Fluid 32, available from Idemitsu Kosan Co., Ltd.) was used in place of the silicone oil. The results are shown in Table 6 and FIG. 45.

Example 24

A viscosity of a hydraulic oil at each shear rate and a current in the hydraulic oil were measured in the same manner as in Example 18, except that rayon fibers having a length of 0.3 mm and a fineness of 1.5 deniers (trade name: Corona, available from Daiwa Spinning Co., Ltd.) were used in place of the rayon fibers having a length of 1.0 mm and a fineness of 3 deniers, and a hydraulic oil of ISO viscosity grade 32 (conductivity: $6.0 \times 10^{-10}$ s/m, viscosity: $5.9 \times 10^{-2}$ Pa·s, trade name: Daphne Super Hydraulic Fluid 32, available from Idemitsu Kosan Co., Ltd.) was used in place of the silicone oil. The results are shown in Table 6 and FIG. 46.

Example 25

A viscosity of a hydraulic oil at each shear rate and a current in the hydraulic oil were measured in the same manner as in Example 18, except that vinylon fibers having a length of 0.4 mm and a fineness of 1.5 deniers (trade name: Kuraray Vinylon, available from Kuraray Co., Ltd.) were used in place of the rayon fibers, and a hydraulic oil of ISO viscosity grade 32 (conductivity: $6.0 \times 10^{-10}$ s/m, viscosity: $5.9 \times 10^{-2}$ Pa·s, trade name: Daphne Super Hydraulic Fluid 32, available from Idemitsu Kosan Co., Ltd.) was used in place of the silicone oil. The results are shown in Table 6 and FIG. 47.

Example 26

A viscosity of a hydraulic oil at each shear rate and a current in the hydraulic oil were measured in the same manner as in Example 18, except that vinylon fibers having a length of 0.2 mm and a fineness of 1.5 deniers (trade name: Kuraray Vinylon, available from Kuraray Co., Ltd.) were used in place of the rayon fibers, and a hydraulic oil of ISO viscosity grade 32 (conductivity: $6.0 \times 10^{-10}$ s/m, viscosity: $5.9 \times 10^{-2}$ Pa·s, trade name: Daphne Super Hydraulic Fluid 32, available from Idemitsu Kosan Co., Ltd.) was used in place of the silicone oil. The results are shown in Table 6 and FIG. 48.

TABLE 6

Figure 43:
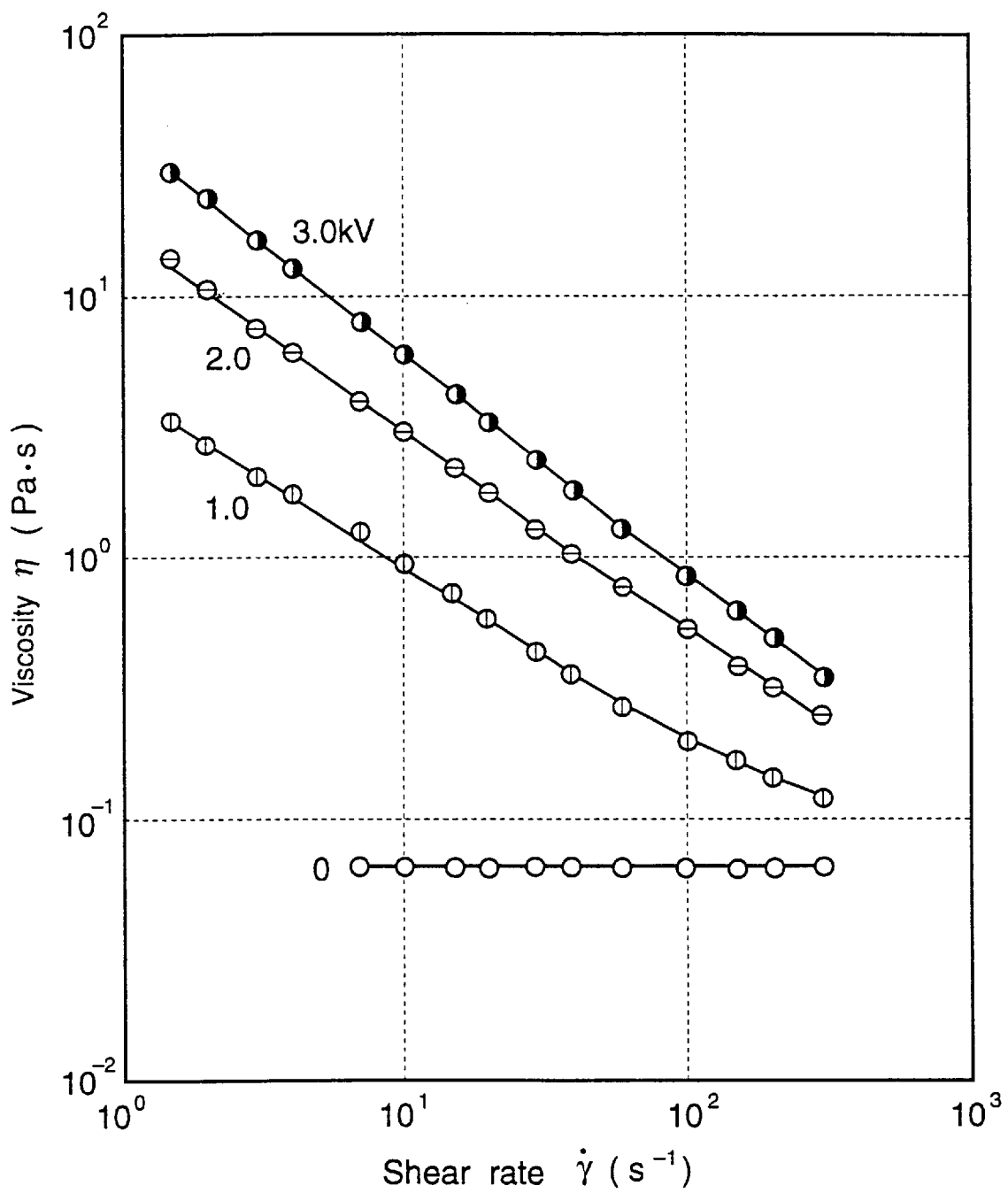
Figure 44:
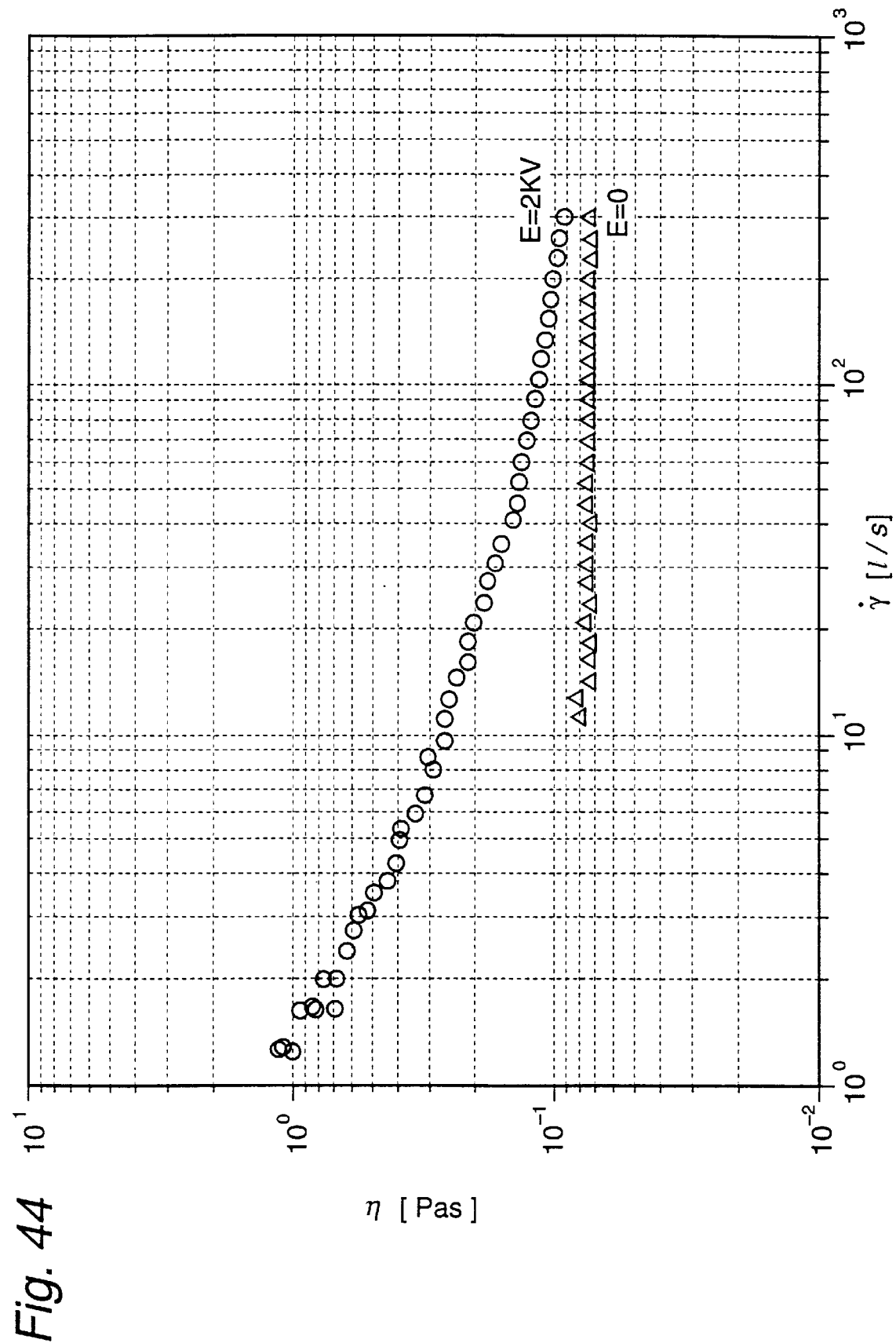
Figure 45:
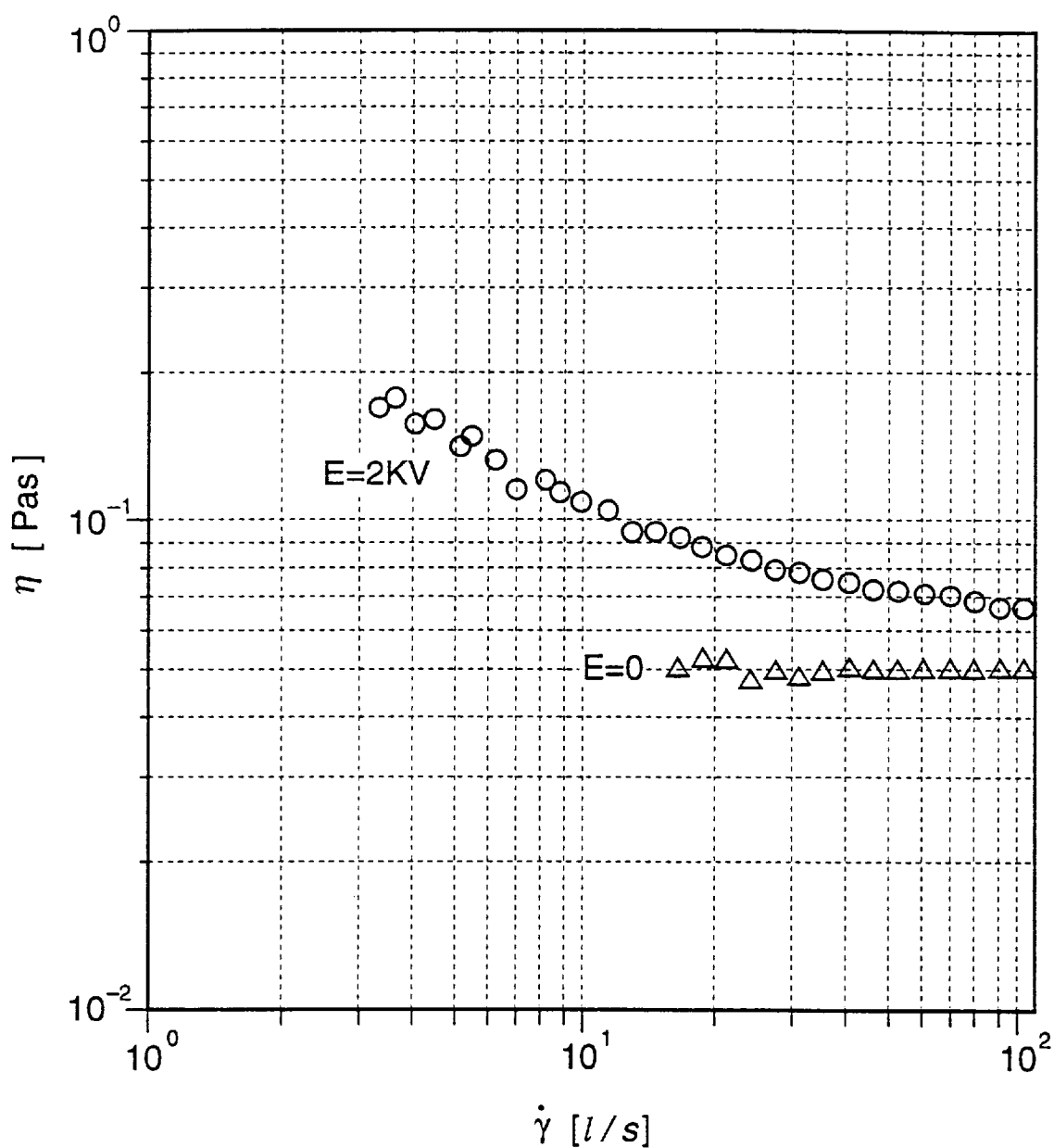
Figure 46:
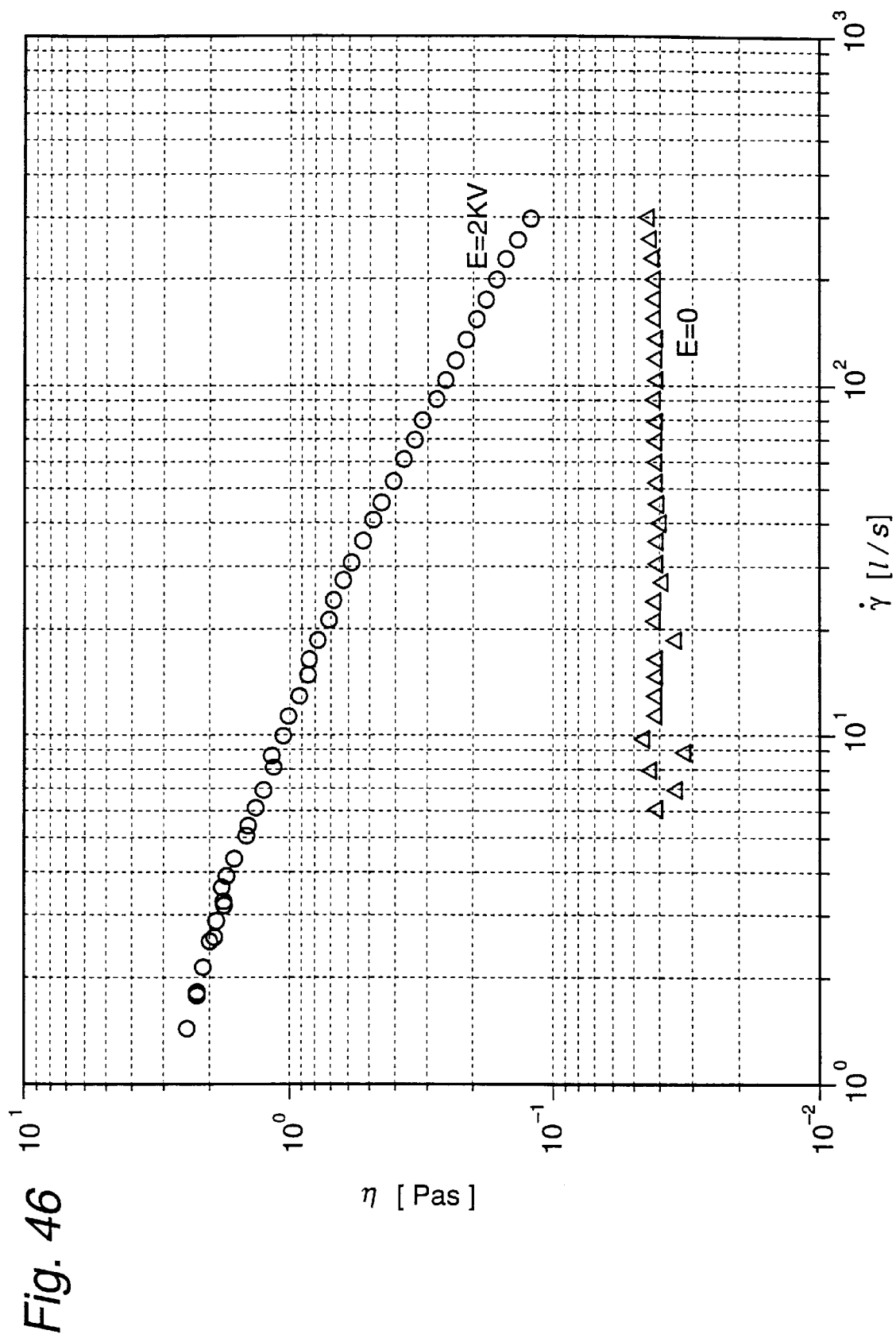
Figure 47:
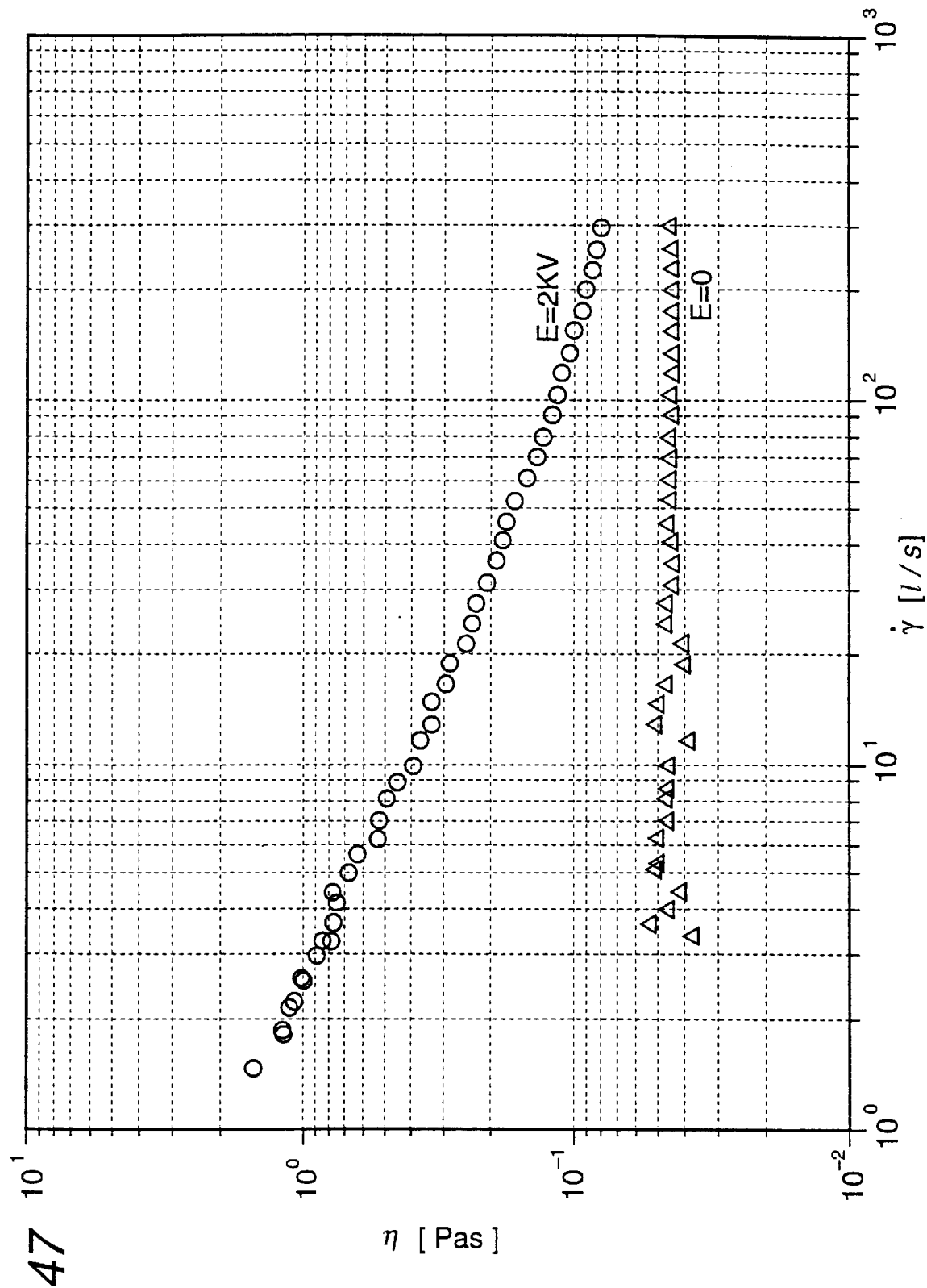
Figure 48:
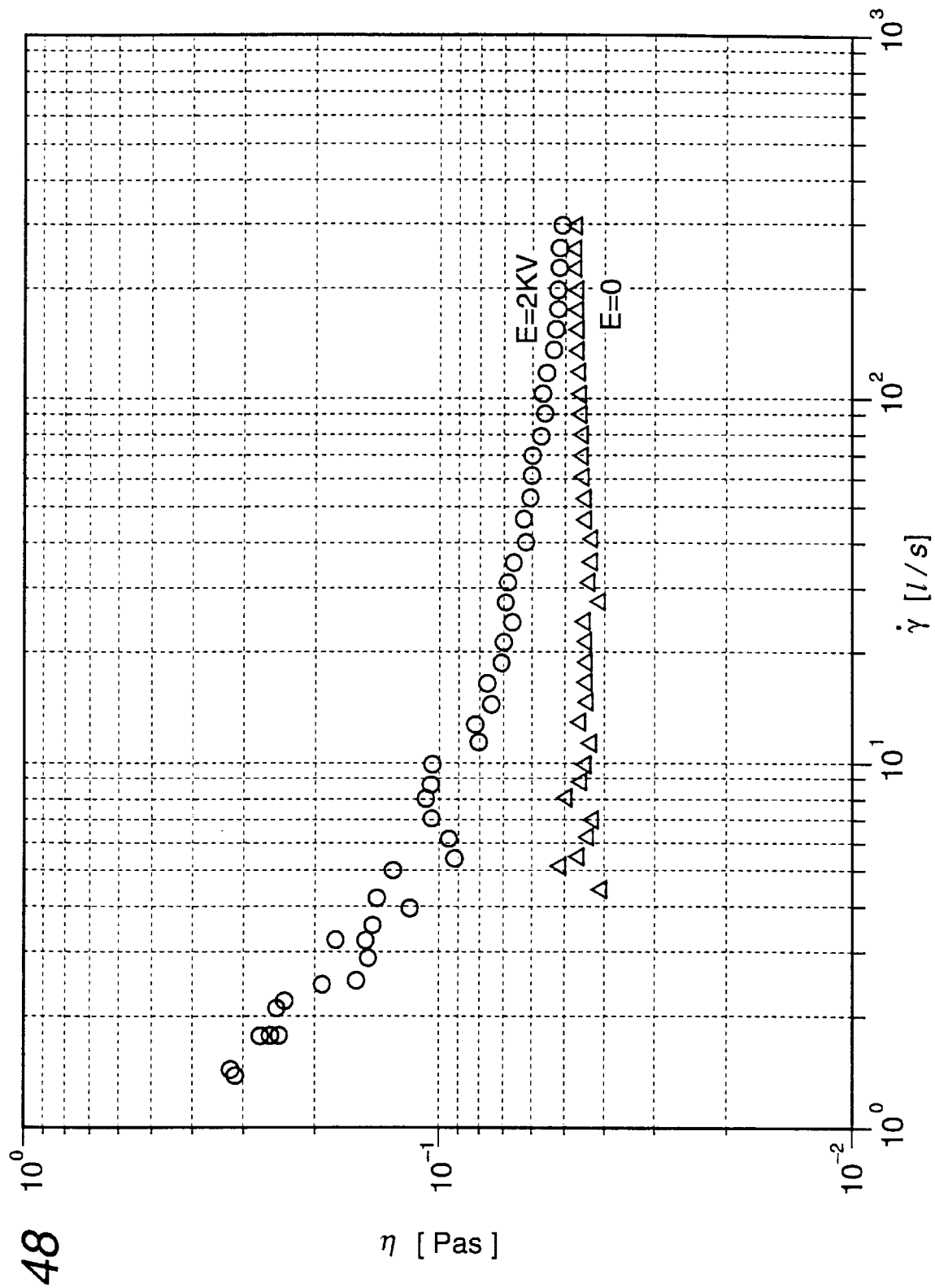

| Type of fiber | Length of fiber (mm) | Fineness of fiber (d) | Applied voltage (kV) | Current (µA/cm$^2$) | Figure |
|---|---|---|---|---|---|
| rayon | 1.0 | 3 | 1.0 | 0.7 | FIG. 43 |
| rayon | 1.0 | 3 | 2.0 | 2.6 | FIG. 43 |
| rayon | 1.0 | 3 | 3.0 | 5.2 | FIG. 43 |
| nylon | 1.0 | 2 | 2.0 | 1.5 | FIG. 44 |
| acrylic | 1.0 | 2 | 2.0 | 1.0 | FIG. 45 |
| rayon | 0.3 | 1.5 | 2.0 | 3.1 | FIG. 46 |
| vinylon | 0.4 | 1.5 | 2.0 | 0.7 | FIG. 47 |
| vinylon | 0.2 | 1.5 | 2.0 | 0.3 | FIG. 48 |

Example 27

Figure 49:
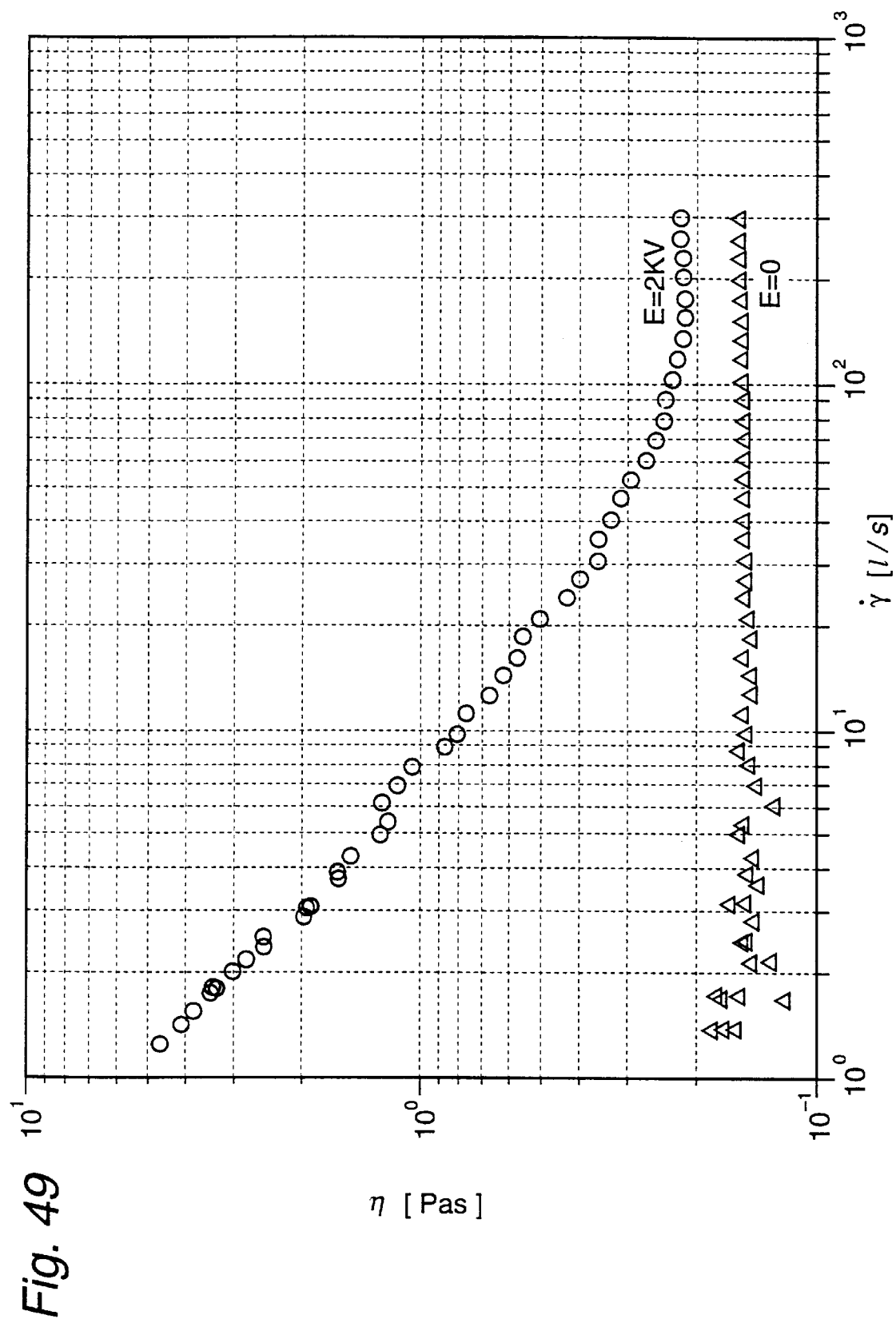

A viscosity of a hydraulic oil at each shear rate and a current in the hydraulic oil were measured in the same manner as in Example 18, except that a hydraulic oil of ISO viscosity grade 100 (trade name: Daphne Super Hydraulic Fluid 100, available from Idemitsu Kosan Co., Ltd.) was used in place of the silicone oil. The results are shown in Table 7 and FIG. 49.

Example 28

Figure 50:
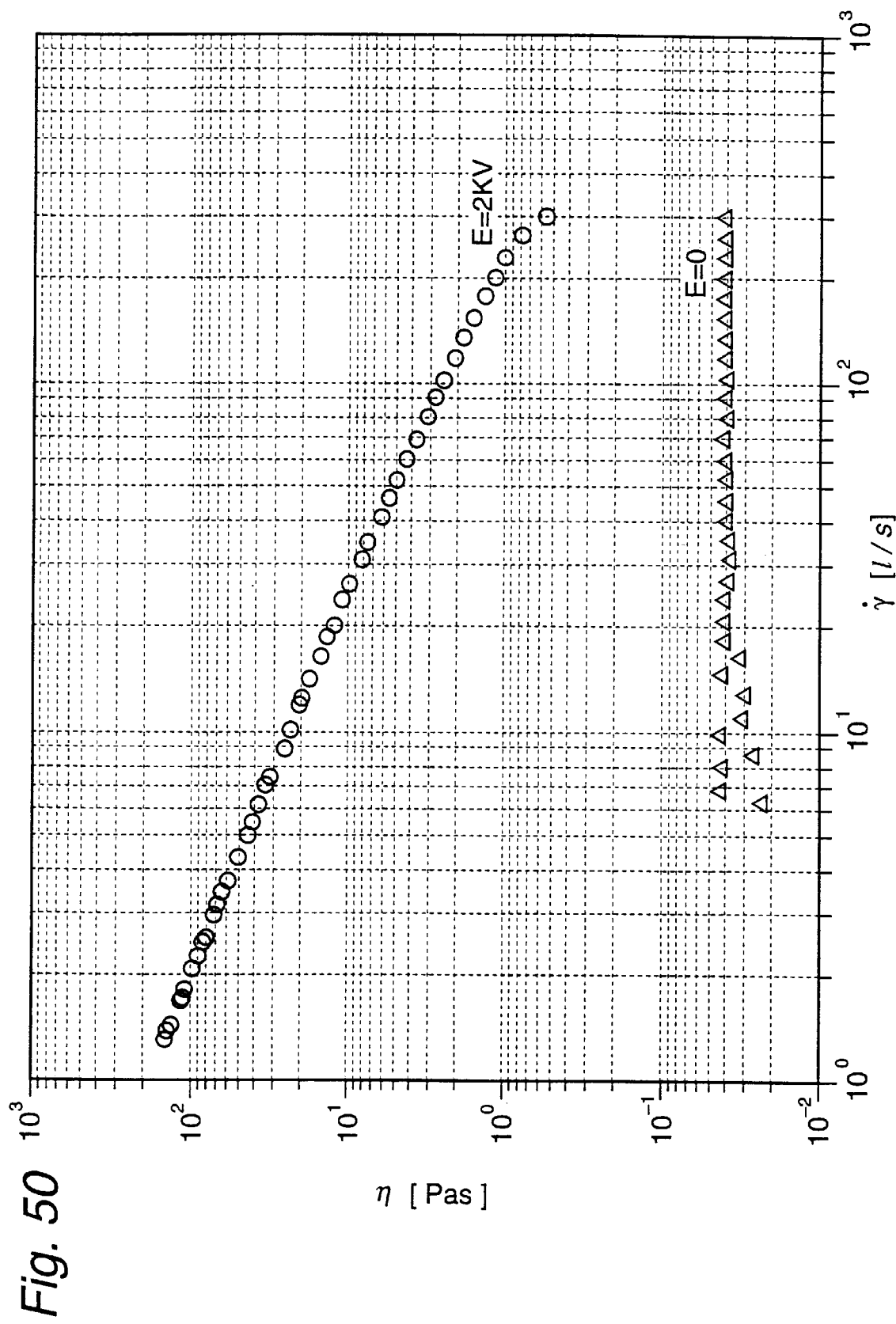

A viscosity of a hydraulic oil at each shear rate and a current in the hydraulic oil were measured in the same manner as in Example 18, except that a hydraulic oil of ISO viscosity grade 22 (trade name: Daphne Super Hydraulic Fluid 22, available from Idemitsu Kosan Co., Ltd.) was used in place of the silicone oil. The results are shown in Table 7 and FIG. 50.

TABLE 7

| ISO viscosity grade | Length of fiber (mm) | Fineness of fiber (d) | Applied voltage (kV) | Current (µA/cm$^2$) |
|---|---|---|---|---|
| 100 | 1.0 | 3 | 2.0 | 0.8 |
| 22 | 1.0 | 3 | 2.0 | 4.2 |

Example 29

A viscosity of a hydraulic oil at each shear rate and a current in the hydraulic oil were measured in the same manner as in Example 21, except that the upper electrode was used as a negative electrode and the lower electrode plate was used as a positive electrode.

Figure 51:
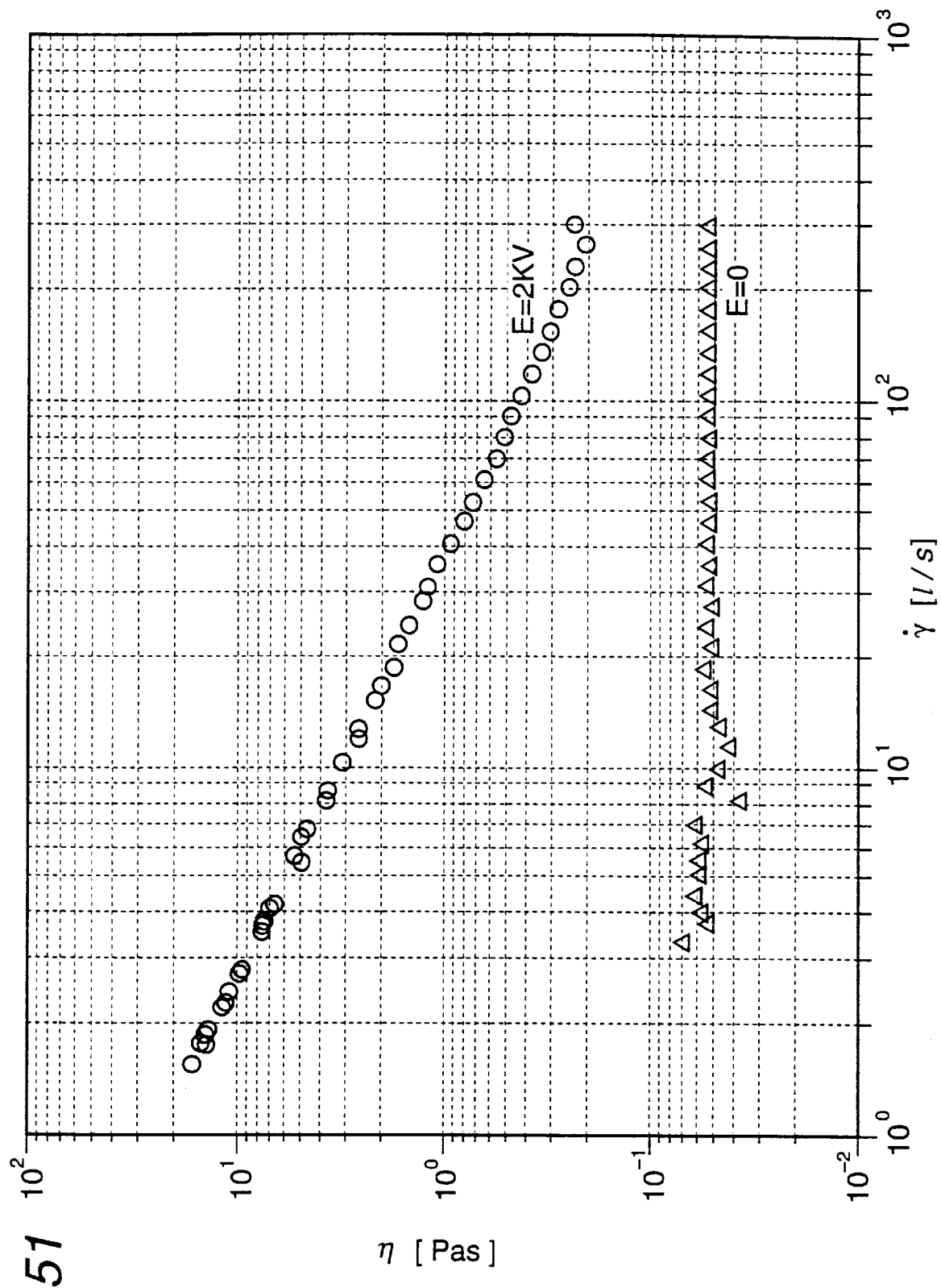

The results are shown in Table 8 and FIG. 51.

TABLE 8

| Type of fiber | Length of fiber (mm) | Fineness of fiber (d) | Applied voltage (kV) | Current (µA/cm$^2$) |
|---|---|---|---|---|
| rayon | 0.1 | 3 | 2 | 3.1 |

Example 30

Figure 53:
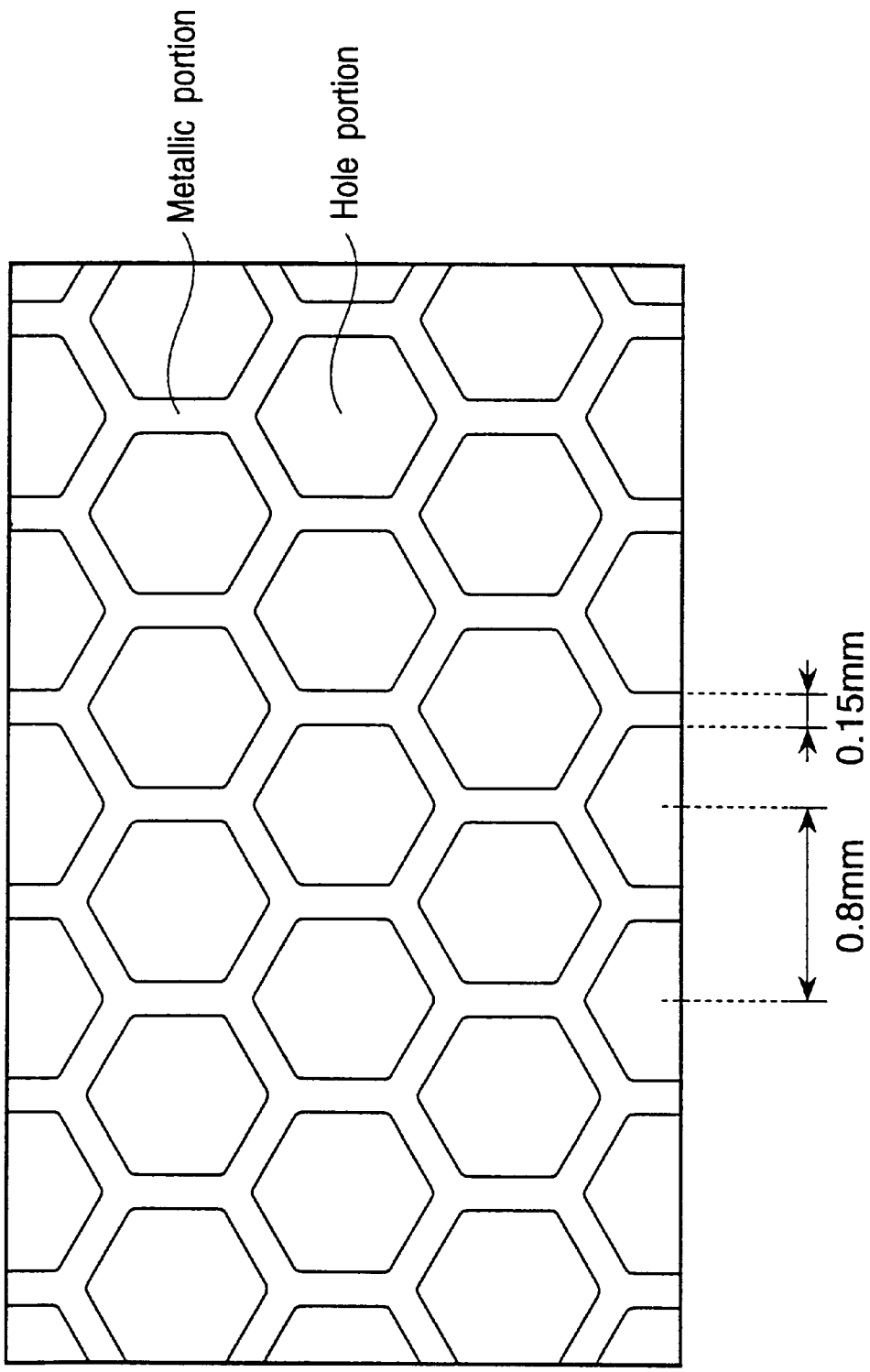
FIG. 53 is a schematic view showing an enlarged surface of a honeycomb electrode used in Example 30.

A viscosity of a hydraulic oil at each shear rate and a current in the hydraulic oil were measured in the same manner as in Example 21, except that an electrode plate having a honeycomb structure (thickness: 0.5 mm) shown in FIG. 53 was used as the upper electrode in place of the rayon flocked electrode. In the metallic electrode of honeycomb structure, the area of the conductive portion was 33% of the whole area, the total area of the hole portion was 67% of the whole area, and the hole portion was non-conductive.

Figure 52:
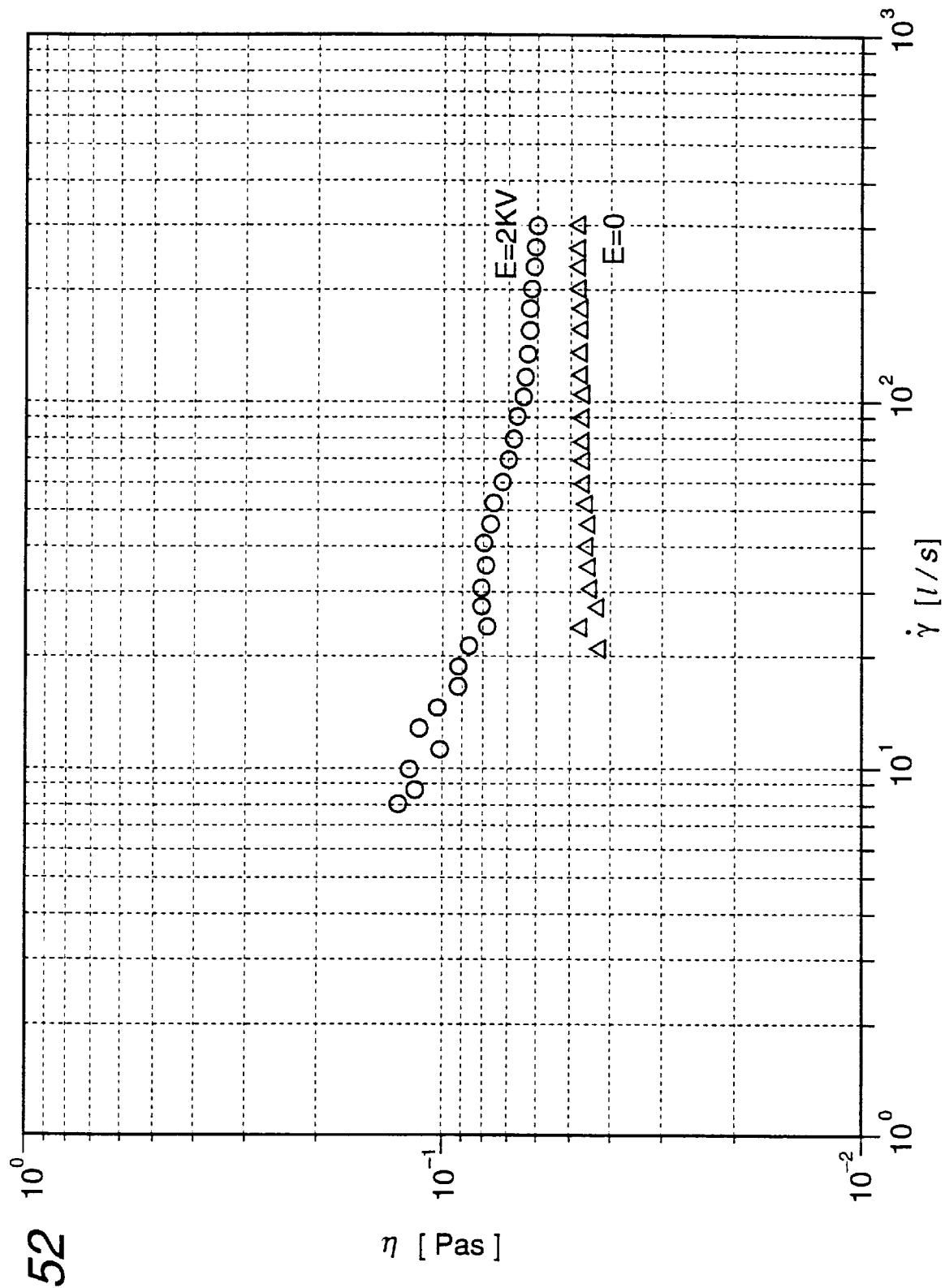

The results are shown in Table 9 and FIG. 52.

TABLE 9

| Type of electrode | Thickness of electrode (mm) | Area of conductive portion (%) | Applied voltage (kV) | Current (µA/cm$^2$) |
|---|---|---|---|---|
| honeycomb electrode | 0.5 | 33 | 2 | 0.1 |

What is claimed is:

1. A method of controlling flow properties of a moving fluid, comprising the steps of arranging in a fluid at least one pair of electrodes capable of forming a non-uniform electric field in the fluid, applying a voltage between the electrodes to produce a jet flow of the fluid between the electrodes and in a shear direction of a flow of the fluid, and controlling flow properties of the fluid by the jet flow.

2. The method as claimed in claim 1, wherein at least one electrode out of the pair of electrodes capable of forming a non-uniform electric field in the fluid is an uneven surface electrode.

3. The method as claimed in claim 1, wherein at least one electrode out of the pair of electrodes capable of forming a non-uniform electric field has a non-smooth surface and the shortest distance between the non-smooth surface of the electrode and the other electrode is in the range of about 5 mm to about 20 µm.

4. The method as claimed in claim 1, wherein the non-smooth surface electrode is a flocked electrode whose surface is flocked with a number of fibers of a fibrous material.

5. The method as claimed in claim 4, wherein the flocked electrode is obtained by flocking a surface of a conductive material with at least one fibrous material selected from the group consisting of an organic fibrous material, an inorganic fibrous material and a metallic fibrous material, and the other electrode is a conductive material electrode.

6. The method as claimed in claim 4, wherein the fibers for forming the flocked electrode have a mean length of about 10 mm to about 50 µm and a fineness of about 0.1 to about 20 deniers, and the number of the fibers for the flocking is about 1,000 to about 50,000 based on 1 cm$^2$.

7. The method as claimed in claim 1, wherein the fluid has a conductivity of not more than about $5 \times 10^{-6}$ S·m$^{-1}$ at its working temperature.

8. An apparatus for controlling flow properties of a moving fluid, said apparatus comprising a fluid having therein at least one pair of electrodes capable of forming a non-uniform electric field, said electrodes being arranged in such manner that a voltage can be applied between the electrodes, and a gap to be filled with the fluid is formed between the electrodes such that a jet flow of fluid is produced between the electrodes and in a shear direction of fluid flow.

9. The apparatus for controlling flow properties of a fluid as claimed in claim 8, wherein one electrode out of the pair of electrodes capable of forming a non-uniform electric field is a flocked electrode whose surface is flocked with fibers of a fibrous material.

10. The apparatus for controlling flow properties of a fluid as claimed in claim 9, wherein the relative positional relation between the flocked electrode and the other electrode is fixed, and the fluid flows between the electrodes.

* * * * *

UNITED STATES PATENT AND TRADEMARK OFFICE
CERTIFICATE OF CORRECTION

PATENT NO. : 6,116,257
DATED : September 12, 2000
INVENTOR(S) : Shinichi Yokota et al.

It is certified that error appears in the above-identified patent and that said Letters Patent is hereby corrected as shown below:

Column 8 Line 22 "FIGS. 31" should read --FIG. 31--.

Column 11 Line 58 "conductivity a" should read --conductivity σ--.

Column 32 Line 18 "shade-memory" should read --shape-memory--.

Column 50 Line 31, Claim 4, "as claimed in claim 1" should read --as claimed in claim 3--.

Signed and Sealed this

First Day of May, 2001

Attest:

NICHOLAS P. GODICI

Attesting Officer

Acting Director of the United States Patent and Trademark Office